United States Patent
Northrup et al.

(10) Patent No.: US 9,733,902 B2
(45) Date of Patent: Aug. 15, 2017

(54) MACHINE VISION SYSTEM PROGRAM EDITING ENVIRONMENT INCLUDING OPERATING CONTEXT AWARE COPY AND PASTE FEATURE

(71) Applicant: Mitutoyo Corporation, Kanagawa-ken (JP)

(72) Inventors: Ryan Northrup, Renton, WA (US); Andy Ye, Redmond, WA (US); Iman Haryadi, Sammamish, WA (US)

(73) Assignee: Mitutoyo Corporation, Kanagawa-ken (JP)

( * ) Notice: Subject to any disclaimer, the term of this patent is extended or adjusted under 35 U.S.C. 154(b) by 343 days.

(21) Appl. No.: 14/276,976

(22) Filed: May 13, 2014

(65) Prior Publication Data

US 2014/0337775 A1 Nov. 13, 2014

Related U.S. Application Data

(60) Provisional application No. 61/822,822, filed on May 13, 2013.

(51) Int. Cl.
*G06F 3/048* (2013.01)
*G06F 9/44* (2006.01)
*G06F 3/0482* (2013.01)

(52) U.S. Cl.
CPC .............. *G06F 8/34* (2013.01); *G06F 3/0482* (2013.01); *G06F 8/33* (2013.01)

(58) Field of Classification Search
CPC ..... G06F 8/34; G06F 8/33; G06F 8/36; G06F 3/0482
See application file for complete search history.

(56) References Cited

U.S. PATENT DOCUMENTS

| | | | |
|---|---|---|---|
| 5,121,498 A | 6/1992 | Gilbert et al. | |
| 5,265,253 A | 11/1993 | Yamada | |

(Continued)

OTHER PUBLICATIONS

International Search Report, mailed Oct. 8, 2014, for International Application No. PCT/US2014/037931, 3 pages.

(Continued)

*Primary Examiner* — Doon Chow
*Assistant Examiner* — Andrew T Chiusano
(74) *Attorney, Agent, or Firm* — Seed IP Law Group LLP

(57) ABSTRACT

A method is provided for copying and pasting a set of machine vision part program operations when editing a part program in a machine vision inspection system. The method includes: a) selecting at least a first instruction representation at a copy location in a displayed part program representation; b) performing copy operations by executing a first subset of modification operations directed to elements that are specific to a first operating context at the copy location, to thereby generate a partially modified selected instruction representation and/or its underlying instruction code; c) defining a paste location in the displayed part program representation; and d) performing paste operations by executing a second subset of modification operations directed to elements that are specific to a second operating context at the paste location, to thereby generate and paste onto the paste location a fully modified selected instruction representation and/or its underlying instruction code.

38 Claims, 45 Drawing Sheets

(56) References Cited

U.S. PATENT DOCUMENTS

| | | | |
|---|---|---|---|
| 5,481,712 A | 1/1996 | Silver et al. | |
| 5,797,013 A | 8/1998 | Mahadevan et al. | |
| 6,026,240 A | 2/2000 | Subramanian | |
| 6,035,125 A | 3/2000 | Nguyen et al. | |
| 6,311,320 B1 | 10/2001 | Jibbe | |
| 6,466,240 B1 * | 10/2002 | Maslov | G06F 8/34 715/234 |
| 6,542,180 B1 | 4/2003 | Wasserman et al. | |
| 6,668,053 B1 | 12/2003 | Doleac et al. | |
| 6,944,821 B1 | 9/2005 | Bates et al. | |
| 7,324,682 B2 | 1/2008 | Wasserman | |
| 7,454,053 B2 | 11/2008 | Bryll et al. | |
| 7,464,370 B2 * | 12/2008 | Barsness | G06F 8/33 715/724 |
| 7,779,356 B2 * | 8/2010 | Griesmer | G06F 3/0482 715/705 |
| 8,111,905 B2 | 2/2012 | Campbell | |
| 8,111,938 B2 | 2/2012 | Bryll et al. | |
| 8,245,186 B2 * | 8/2012 | Gryko | G06F 8/33 715/826 |
| 8,271,895 B2 | 9/2012 | Tseo et al. | |
| 8,312,427 B2 * | 11/2012 | Hutchison | G06F 8/751 717/110 |
| 8,392,380 B2 | 3/2013 | Zhao et al. | |
| 8,429,551 B2 | 4/2013 | Kim et al. | |
| 8,806,430 B1 * | 8/2014 | Bienkowski | G06F 8/72 717/110 |
| 8,910,113 B2 * | 12/2014 | Srinivasaraghavan | G06F 8/34 717/106 |
| 9,081,595 B1 * | 7/2015 | Delarue | G06F 9/44589 |
| 2003/0174168 A1 | 9/2003 | van Leersum | |
| 2005/0229113 A1 | 10/2005 | Martineau et al. | |
| 2006/0133663 A1 | 6/2006 | Delaney | |
| 2007/0156775 A1 | 7/2007 | Fischer | |
| 2007/0234278 A1 * | 10/2007 | Damm | G06F 8/30 717/104 |
| 2008/0034303 A1 * | 2/2008 | Evans | G06F 8/34 715/763 |
| 2008/0058969 A1 * | 3/2008 | Nixon | G05B 19/0426 700/87 |
| 2008/0101682 A1 | 5/2008 | Blanford et al. | |
| 2008/0201656 A1 | 8/2008 | Kim et al. | |
| 2009/0013248 A1 * | 1/2009 | Hutchison | G06F 8/33 715/256 |
| 2010/0162210 A1 * | 6/2010 | Briden | G06F 17/215 717/113 |
| 2011/0231787 A1 | 9/2011 | Tseo et al. | |
| 2012/0005608 A1 | 1/2012 | Wong et al. | |
| 2013/0123945 A1 | 5/2013 | Saylor et al. | |
| 2013/0125044 A1 | 5/2013 | Saylor et al. | |
| 2013/0239090 A1 * | 9/2013 | Hamlin | G06F 8/73 717/123 |
| 2015/0186117 A1 * | 7/2015 | Azrieli | G06F 8/30 717/105 |

OTHER PUBLICATIONS

Mitutoyo Corporation & Micro Encoder Inc., "QVPAK 3D CNC Vision Measuring Machine Operation Guide," Version 2.0, published Sep. 1996, 86 pages.

Mitutoyo Corporation & Micro Encoder Inc.,"QVPAK 3D CNC Vision Measuring Machine User's Guide," Version 7, published Jan. 2003, 329 pages.

U.S. Appl. No. 13/297,232, filed Nov. 15, 2011, entitled "Machine Vision System Program Editing Environment Including Real Time Context Generation Features," 67 pages.

U.S. Appl. No. 13/676,061, filed Nov. 13, 2012, entitled "Machine Vision System Program Editing Environment Including Synchronized User Interface Features," 70 pages.

* cited by examiner

```
<?xml version="1.0" encoding="UTF-8" standalone="yes"?>
<MIML xmlns="urn:MEI-MIML" schemaVersion="10.1" protectType="0" modificationTag="21824" >
  <Main>
    PS <Prologue breakpoint="FALSE" nodeID="{E998874-09BB-4F83-9AAF-09B9E495F887}" returnCode="MIML_OK" blockMarker="FALSE" simulationStatus="good">
      <OptionsDisplayDistanceUnits breakpoint="FALSE" nodeID="{CFCE1088-CA5F-4A27-905F-E96014F62A8E}" returnCode="MIML_OK" blockMarker="FALSE" simulationStatus="good">
        <distanceUnits>MM</distanceUnits>
      </OptionsDisplayDistanceUnits>
      <OptionsDisplayCoordinateMode breakpoint="FALSE" nodeID="{37534E1C-C9B0-4ABB-B940-4D3CA86F853C}" returnCode="MIML_OK" blockMarker="FALSE" simulationStatus="good">
        <coordinateMode>CARTESIAN</coordinateMode>
      </OptionsDisplayCoordinateMode>
      <OptionsDisplayResolutionMode breakpoint="FALSE" nodeID="{B17D7174-7766-428B-B17b-55C3655B4FA2}" returnCode="MIML_OK" blockMarker="FALSE" simulationStatus="good">
        <resolutionMode>PRECISION_5</resolutionMode>
      </OptionsDisplayResolutionMode>
      <OptionsDisplayAngleRange breakpoint="FALSE" nodeID="{73A59312-2921-45E9-8ADA-E14CCF03F94B}" returnCode="MIML_OK" blockMarker="FALSE" simulationStatus="good">
        <angleRange>ZERO_TO_36be/angleRange>
      </OptionsDisplayAngleRange>
      <OptionsDisplayAngleUnits breakpoint="FALSE" nodeID="{698833A2-43AD9-464D-B50F-6B7FB155.87EE}" returnCode="MIML_OK" blockMarker="FALSE" simulationStatus="good">
        <angleUnits>PRECISION_5</angleUnits>
      </OptionsDisplayAngleUnits>
      <OptionsFormattingFeatureTypeInHdr breakpoint="FALSE" nodeID="{D46f0E46-877F-4C99-9594-348C75F2A584}" returnCode="MIML_OK" blockMarker="FALSE" simulationStatus="good">
        <showFeatureTypeInHdr>TRUE</showFeatureTypeInHdr>
      </OptionsFormattingFeatureTypeInHdr>
      <OptionsFormattingFeatureLabelInHdr breakpoint="FALSE" nodeID="{4DDC3A97-B29C-4245-B3F9-31B71188A821}" returnCode="MIML_OK" blockMarker="FALSE" simulationStatus="good">
        <showFeatureLabelInHdr>TRUE</showFeatureLabelInHdr>
      </OptionsFormattingFeatureLabelInHdr>
      <OptionsFormattingFeatureIDInHdr breakpoint="FALSE" nodeID="{8EF171FC-CA4C-4DFD-B122-B8AFB97F8l9A}" returnCode="MIML_OK" blockMarker="FALSE" simulationStatus="good">
        <showFeatureIDInHdr>TRUE</showFeatureIDInHdr>
      </OptionsFormattingFeatureIDInHdr>
      ...
```

*Fig. 20A.*

```xml
<OptionsReportingMessageError breakpoint="FALSE" nodeID="{7B83451-2AA2-4CD8-AE83-1DDC30CB3A7C}" returnCode="MIML_OK"
blockMarker="FALSE" simulationStatus="good">
    <showErrorMsg>TRUE</showErrorMsg>
</OptionsReportingMessageError>
<OptionsReportingData breakpoint="FALSE" nodeID="{7A31F5CC-38B9-4A1D-ACB4-398C8DC43B69}" returnCode="MIML_OK"
blockMarker="FALSE" simulationStatus="good">
    <reportLevel>ALLDATA</reportLevel>
</OptionsReportingData>
<OptionsLoggingFile breakpoint="FALSE" nodeID="{5CCC864C8-6992-428F-9AD9-BBEEAEF88C6F}" returnCode="MIML_OK"
blockMarker="FALSE" simulationStatus="good">
    <logToFile>FALSE</logToFile>
    <fileName>&</fileName>
</OptionsLoggingFile>
<OptionsLoggingCOM1 breakpoint="FALSE" nodeID="{ADD79C84-799B-4923-AF74-FFD1163E0FF}" returnCode="MIML_OK"
blockMarker="FALSE" simulationStatus="good">
    <logToCOM1>FALSE</logToCOM1>
</OptionsLoggingCOM1>
<OptionsLoggingCOM2 breakpoint="FALSE" nodeID="{A9CA10A1-E6F1-4DAF-8D73-23680A1D0F3A}" returnCode="MIML_OK"
blockMarker="FALSE" simulationStatus="good">
    <logToCOM2>FALSE</logToCOM2>
</OptionsLoggingCOM2>
<OptionsRunModeBreakOnErrors breakpoint="FALSE" nodeID="{EE52AD25-E8DA-4B12-B221-8F04794F36}"
returnCode="MIML_OK" blockMarker="FALSE" simulationStatus="good">
    <breakOnErrors>TRUE</breakOnErrors>
</OptionsRunModeBreakOnErrors>
<OptionsRunModeShowImageTools breakpoint="FALSE" nodeID="{6FE98D00-5C99-40AF-8799-7C6146B4C8DA}"
returnCode="MIML_OK" blockMarker="FALSE" simulationStatus="good">
    <showImageTools>TRUE</showImageTools>
</OptionsRunModeShowImageTools>
<OptionsRunModeShowLimitWarnings breakpoint="FALSE" nodeID="{49D7E936-510F-4F77E-8054-3F4B8DA4F70F}"
returnCode="MIML_OK" blockMarker="FALSE" simulationStatus="good">
    <showTravelLimitWarnings>TRUE</showTravelLimitWarnings>
</OptionsRunModeShowLimitWarnings>
<OptionsRunModeAutoRunSmartRecovery breakpoint="FALSE" nodeID="{1AB79553-03AA-4D88-BEBC-A5CC4D8788}"
returnCode="MIML_OK" blockMarker="FALSE" simulationStatus="good">
    <autoRunSmartRecovery>FALSE</autoRunSmartRecovery>
</OptionsRunModeAutoRunSmartRecovery>
<OptionsSmartRecoveryFocus breakpoint="FALSE" nodeID="{61E7370C-3660-4E1C-BF62-186D8CD4F938}" returnCode="MIML_OK"
blockMarker="FALSE" simulationStatus="good">
    <focusPosition>TRUE</focusPosition>
</OptionsSmartRecoveryFocus>
...
```

```xml
<ImageSetContext breakpoint="FALSE" nodeID="{BF2D859F-608C-410B-9046-91A3689CECE8}" returnCode="MIML_OK" blockMarker="FALSE" simulationStatus="good">
    <x>178.243800000</x>
    <y>212.551800000</y>
    <z>9.133400000</z>
    <coax>0</coax>
    <stage>25</stage>
    <ringFront>0</ringFront>
    <ringBack>0</ringBack>
    <ringRight>0</ringRight>
    <ringLeft>0</ringLeft>
    <mirrorLevel>0</mirrorLevel>
    <color>WHITE</color>
    <magnification>5.000000000</magnification>
</ImageSetContext>
<SurfaceFocusWithoutPoint breakpoint="FALSE" nodeID="{210DDA0E-92C2-4A3E-895E-3BB057E0134D}" returnCode="MIML_OK" blockMarker="FALSE" simulationStatus="good">
    <searchType>MEDIUM</searchType>
    <searchRange>0.508438670</searchRange>
    <function>TOP</function>
    <vcs>FALSE</vcs>
    <x>178.265411350</x>
    <y>212.538048367</y>
    <z>9.133100000</z>
    <w>1.074673491</w>
    <h>0.777949533</h>
    <angle>0.000000000</angle>
    <simulationData>
        <SimDataStage x="178.2438" y="212.5518" z="9.1334"/>
    </simulationData>
</SurfaceFocusWithoutPoint>
<CircleTool breakpoint="FALSE" nodeID="{400047F3-9469-4AAE-AA6E-7CD3F8FC3051}" returnCode="MIML_OK" blockMarker="FALSE" simulationStatus="good">
    <vcs>FALSE</vcs>
    <x>178.237905995</x>
    <y>212.543941924</y>
    <z>9.135700000</z>
    <r1>0.398827639</r1>
    <r2>0.202345439</r2>
    <outlier>0.000000000</outlier>
    <th>86.175097276</th>
    <thr>0.545405127</thr>
    <ths>53.000000000</ths>
    <alg>DYNAMIC_THRESH</alg>
    <edgeSlope>RISING</edgeSlope>
    <edgeQuality>STRONG</edgeQuality>
    <filterType>@</filterType>
    <dllName>@</dllName>
    <paramList>@</paramList>
    <scanInterval>20</scanInterval>
    <scanIntervalUnits>DEGREES</scanIntervalUnits>
    <samplingDirection>CLOCKWISE</samplingDirection>
    <simulationData>
        <SimDataPoints>
            <SimDataPoint type="xyz" x="178.5426244698411" y="212.5439419239097" z="9.1357"/>
```

```
                                </SimDataPoints>
                            </simulationData>
MCIRC1E         </CircleTool>
 DCIRC1S        <DefineCircle breakpoint="FALSE" nodeID="{9067646A-F1C1-4481-8BD6-
EE912AD206FC}" returnCode="MIML_OK" blockMarker="FALSE" simulationStatus="good">
                            <featureLabel>Circle-1</featureLabel>
                            <x>178.239198213</x>
                            <y>212.54577263</y>
                            <z>9.135700000</z>
                            <basePlane>XY</basePlane>
                            <nomX>0.000000000</nomX>
                            <nomY>0.000000000</nomY>
                            <nomZ>0.000000000</nomZ>
                            <tolX>@</tolX>
                            <tolY>@</tolY>
                            <tolZ>@</tolZ>
                            <outputX>NONE</outputX>
                            <outputY>NONE</outputY>
                            <outputZ>NONE</outputZ>
                            <useNominals>FALSE</useNominals>
                            <actualDiameter>0.604570103</actualDiameter>
                            <nomDiameter>2.000000000</nomDiameter>
                            <tolDiameter>@</tolDiameter>
                            <outputDiameter>NONE</outputDiameter>
                            <actualRadius>0.302285052</actualRadius>
                            <nomRadius>1.000000000</nomRadius>
                            <tolRadius>@</tolRadius>
                            <outputRadius>NONE</outputRadius>
                            <actualCircularity>0.004521013</actualCircularity>
                            <tolCircularity>@</tolCircularity>
                            <outputCircularity>NONE</outputCircularity>
                            <tolConcentricity>@</tolConcentricity>
                            <outputConcentricity>NONE</outputConcentricity>
                            <tolTruePosition>@</tolTruePosition>
                            <outputTruePosition>NONE</outputTruePosition>
                            <tolRunout>@</tolRunout>
```

*Fig.20E.*

```xml
            <outputRunout>NONE</outputRunout>
                        <tolSymmetry>@</tolSymmetry>
                        <outputSymmetry>NONE</outputSymmetry>
                        <projectionPlane>NONE</projectionPlane>
                        <circleType>UNKNOWN</circleType>
                        <datumType>NONE</datumType>
                        <outlier>0.000000000</outlier>
DCIRCLE     </DefineCircle>
            </Measure>
ALIGNOS     <PcsAlignOrigin breakpoint="FALSE" nodeID="{3E64016A-93A4-4925-B9EC-
7AC50F74ECF8}" returnCode="MIML_OK" blockMarker="FALSE" simulationStatus="good">
                        <featureLabel>Circle-1</featureLabel>
                        <axisMask>ALL</axisMask>
ALIGNOE     </PcsAlignOrigin>
MCIRC2S     <Measure breakpoint="FALSE" nodeID="{8AE3320F-32D0-45DF-9041-1A0EE84F2CCF}"
returnCode="MIML_OK" blockMarker="FALSE" simulationStatus="good">
                        <ImageSetContext breakpoint="FALSE" nodeID="{D0DC0C81-1A29-46B6-A13E-
135501CB872A}" returnCode="MIML_OK" blockMarker="FALSE" simulationStatus="good">
                                <x>15.878901787</x>
                                <y>0.006622737</y>
                                <z>-0.000700000</z>
                                <coax>0</coax>
                                <stage>25</stage>
                                <ringFront>0</ringFront>
                                <ringBack>0</ringBack>
                                <ringRight>0</ringRight>
                                <ringLeft>0</ringLeft>
                                <mirrorLevel>0</mirrorLevel>
                                <color>WHITE</color>
                        </ImageSetContext>
                        <CircleTool breakpoint="FALSE" nodeID="{7C0A7049-EAEE-41D2-AA5D-
9733E851315E}" returnCode="MIML_OK" blockMarker="FALSE" simulationStatus="good">
                                <vcs>FALSE</vcs>
                                <x>15.873007782</x>
                                <y>0.006658218</y>
                                <z>-0.000700000</z>
                                <r1>0.394898303</r1>
                                <r2>0.198416421</r2>
                                <outlier>0.000000000</outlier>
                                <th>83.172932331</th>
                                <thr>0.519229729</thr>
                                <ths>49.000000000</ths>
                                <alg>DYNAMIC_THRESH</alg>
                                <edgeSlope>RISING</edgeSlope>
                                <edgeQuality>STRONG</edgeQuality>
                                <filterType>@</filterType>
                                <dllName>@</dllName>
                                <paramList>@</paramList>
                                <scanInterval>20</scanInterval>
                                <scanIntervalUnits>DEGREES</scanIntervalUnits>
                                <samplingDirection>CLOCKWISE</samplingDirection>
                                <simulationData>
                                    <SimDataPoints>
                                        <SimDataPoint type="xyz" x="16.1745994964029"
y="0.006658218147066464" z="-0.000700000000000145"/>
                                        <SimDataPoint type="xyz" x="16.15376569120747" y="-
0.09578655124369107" z="-0.000700000000000145"/>
                                        <SimDataPoint type="xyz" x="16.10407955032989" y="-
0.18656961700060858" z="-0.000700000000000145"/>
```

```
                </SimDataPoints>
            </simulationData>
MCIRC2E </CircleTool>
DCIRC2S <DefineCircle breakpoint="FALSE" nodeID="{D9035300-812E-468A-B737-
AFD8C4864A1F}" returnCode="MIML_OK" blockMarker="FALSE" simulationStatus="good">
                <featureLabel>Circle-2</featureLabel>
                <x>15.875163670</x>
                <y>0.006569734</y>
                <z>-0.000700000</z>
                <basePlane>XY</basePlane>
                <nomX>0.000000000</nomX>
                <nomY>0.000000000</nomY>
                <nomZ>0.000000000</nomZ>
                <tolX>@</tolX>
                <tolY>@</tolY>
                <tolZ>@</tolZ>
                <outputX>NONE</outputX>
                <outputY>NONE</outputY>
                <outputZ>NONE</outputZ>
                <useNominals>FALSE</useNominals>
                <actualDiameter>0.597231197</actualDiameter>
                <nomDiameter>2.000000000</nomDiameter>
                <tolDiameter>@</tolDiameter>
                <outputDiameter>NONE</outputDiameter>
                <actualRadius>0.298615598</actualRadius>
                <nomRadius>1.000000000</nomRadius>
                <tolRadius>@</tolRadius>
                <outputRadius>NONE</outputRadius>
                <actualCircularity>0.003537133</actualCircularity>
                <tolCircularity>@</tolCircularity>
                <outputCircularity>NONE</outputCircularity>
                <tolConcentricity>@</tolConcentricity>
                <outputConcentricity>NONE</outputConcentricity>
                <tolTruePosition>@</tolTruePosition>
                <outputTruePosition>NONE</outputTruePosition>
                <tolRunout>@</tolRunout>
                <outputRunout>NONE</outputRunout>
                <tolSymmetry>@</tolSymmetry>
```

*Fig.20G.*

```xml
<outputSymmetry>NONE</outputSymmetry>
        <projectionPlane>NONE</projectionPlane>
        <circleType>UNKNOWN</circleType>
        <datumType>NONE</datumType>
        <outlier>0.000000000</outlier>
    </DefineCircle>
DCIRC2E  </Measure>
ALIGNXS  <PcsAlignAxis breakpoint="FALSE" nodeID="{B41333D6-374A-4BB4-8AEC-0151F077E764}" returnCode="MIML_OK"
blockMarker="FALSE" simulationStatus="good">
        <featureLabel>Circle-2</featureLabel>
        <alignmentAxis>X</alignmentAxis>
        <rotationAxis>Z</rotationAxis>
        <direction>POSITIVE</direction>
        <offset>0.000000000</offset>
ALIGNXE  </PcsAlignAxis>
        EPP<EndPartProgram breakpoint="FALSE" nodeID="{E9F4E6C2-A702-49BA-83AB-C3E5B78991877}" returnCode="MIML_OK"
blockMarker="FALSE" simulationStatus="good"/>
    </Main>
</MIML>
```

*Fig.20H.*

```xml
<outputSymmetry>NONE</outputSymmetry>
        <projectionPlane>NONE</projectionPlane>
        <circleType>UNKNOWN</circleType>
        <datumType>NONE</datumType>
        <outlier>0.000000000</outlier>
DCIRC2E </DefineCircle>
    </Measure>
ALIGNXS <PcsAlignAxis breakpoint="FALSE" nodeID="{B4133316-374A-4BB4-8AEC-0151F077E764}" returnCode="MIML_OK" blockMarker="FALSE" simulationStatus="good">
        <featureLabel>Circle-2</featureLabel>
        <alignmentAxis>X</alignmentAxis>
        <rotationAxis>Z</rotationAxis>
        <direction>POSITIVE</direction>
        <offset>0.000000000</offset>
ALIGNXE </PcsAlignAxis>
    LOOPS <StepArray breakpoint="FALSE" nodeID="{D573A7B2-C4E2-4283-B212-CA79E2281B02}" returnCode="MIML_OK" iterations="16" blockMarker="FALSE" simulationStatus="good">
        <loopName>MyLoop</loopName>
        <exceptions>@</exceptions>
        <outerLoopIterations>4</outerLoopIterations>
        <outerLoopBetweenParts>FALSE</outerLoopBetweenParts>
        <outerLoopDX>1.567500000</outerLoopDX>
        <outerLoopDY>0.000000000</outerLoopDY>
        <outerLoopDZ>0.000000000</outerLoopDZ>
        <innerLoopIterations>4</innerLoopIterations>
        <innerLoopBetweenParts>FALSE</innerLoopBetweenParts>
        <innerLoopDX>0.000000000</innerLoopDX>
        <innerLoopDY>1.567500000</innerLoopDY>
        <innerLoopDZ>0.000000000</innerLoopDZ>
        <EndLoop breakpoint="FALSE" nodeID="{C400E1AF-3CB2-4713-9916-8AE82318A363}" returnCode="MIML_OK" blockMarker="FALSE" simulationStatus="questionable"/>
    LOOPE </StepArray>
    EPP <EndPartProgram breakpoint="FALSE" nodeID="{E9FABCC3-A702-49BA-814B-C3E5B7899177}" returnCode="MIML_OK" blockMarker="FALSE" simulationStatus="questionable"/>
    </Main>
</MIML>
```

*Fig.21.*

```
<outputSymmetry>NONE</outputSymmetry>
                    <projectionPlane>NONE</projectionPlane>
                    <circleType>UNKNOWN</circleType>
                    <datumType>NONE</datumType>
                    <outlier>0.000000000</outlier>
                </DefineCircle>
            </Measure>
            <PcsAlignAxis breakpoint="FALSE" nodeID="{B41333D6-374A-4BB4-8AEC-0151F077E764}"
returnCode="MIML_OK" blockMarker="FALSE" simulationStatus="good">
                <featureLabel>Circle-2</featureLabel>
                <alignmentAxis>X</alignmentAxis>
                <rotationAxis>Z</rotationAxis>
                <direction>POSITIVE</direction>
                <offset>0.000000000</offset>
            </PcsAlignAxis>
LOOPS  <StepArray breakpoint="FALSE" nodeID="{D573A7B2-C4E2-4283-B212-CA79E2281B02}"
returnCode="MIML_OK" iterations="16" blockMarker="FALSE" simulationStatus="good">
                <loopName>MyLoop</loopName>
                <exceptions>@</exceptions>
                <outerLoopIterations>4</outerLoopIterations>
                <outerLoopBetweenParts>FALSE</outerLoopBetweenParts>
                <outerLoopDX>1.587500000</outerLoopDX>
                <outerLoopDY>0.000000000</outerLoopDY>
                <outerLoopDZ>0.000000000</outerLoopDZ>
                <innerLoopIterations>4</innerLoopIterations>
                <innerLoopBetweenParts>FALSE</innerLoopBetweenParts>
                <innerLoopDX>0.000000000</innerLoopDX>
                <innerLoopDY>1.587500000</innerLoopDY>
                <innerLoopDZ>0.000000000</innerLoopDZ>
MCIRC2_1S  <Measure breakpoint="FALSE" nodeID="{2087D6DE-A71F-44D1-867F-
4710B9E3D5FD}" returnCode="MIML_OK" blockMarker="FALSE" simulationStatus="questionable">
                <ImageSetContext breakpoint="FALSE" nodeID="{4F6FD547-1E33-4175-BC0B-
4478DA95D8FA}" returnCode="MIML_OK" blockMarker="FALSE" simulationStatus="questionable">
                    <x>15.878901787</x>
                    <y>0.008622737</y>
                    <z>-0.000700000</z>
                    <coax>0</coax>
                    <stage>25</stage>
                    <ringFront>0</ringFront>
                    <ringBack>0</ringBack>
                    <ringRight>0</ringRight>
                    <ringLeft>0</ringLeft>
                    <mirrorLevel>0</mirrorLevel>
                    <color>WHITE</color>
                </ImageSetContext>
                <CircleTool breakpoint="FALSE" nodeID="{8B4027A7-3AEA-402B-AFB7-
A759C2769F5D}" returnCode="MIML_OK" blockMarker="FALSE" simulationStatus="questionable">
                    <vcs>FALSE</vcs>
                    <x>15.873007782</x>
                    <y>0.006658218</y>
                    <z>-0.000700000</z>
                    <r1>0.394898303</r1>
                    <r2>0.198416421</r2>
                    <outlier>0.000000000</outlier>
                    <th>83.172932331</th>
                    <thr>0.519229729</thr>
                    <ths>49.000000000</ths>
```

*Fig.22A.*

```
                              <alg>DYNAMIC_THRESH</alg>
                              <edgeSlope>RISING</edgeSlope>
                              <edgeQuality>STRONG</edgeQuality>
                              <filterType>@</filterType>
                              <dllName>@</dllName>
                              <paramList>@</paramList>
                              <scanInterval>20</scanInterval>
                              <scanIntervalUnits>DEGREES</scanIntervalUnits>
                              <samplingDirection>CLOCKWISE</samplingDirection>
          MCIRC2_1E       </CircleTool>
          DCIRC2_1S       <DefineCircle breakpoint="FALSE" nodeID="{F076592F-BA59-49B2-9AEB-
C61D6BE6F939}" returnCode="MIML_OK" blockMarker="FALSE" simulationStatus="questionable">
                              <featureLabel>Circle-2_1[.]</featureLabel>
                              <x>15.875163670</x>
                              <y>0.006569734</y>
                              <z>-0.000700000</z>
                              <basePlane>XY</basePlane>
                              <nomX>0.000000000</nomX>
                              <nomY>0.000000000</nomY>
                              <nomZ>0.000000000</nomZ>
                              <tolX>@</tolX>
                              <tolY>@</tolY>
                              <tolZ>@</tolZ>
                              <outputX>NONE</outputX>
                              <outputY>NONE</outputY>
                              <outputZ>NONE</outputZ>
                              <useNominals>FALSE</useNominals>
                              <actualDiameter>0.597231197</actualDiameter>
                              <nomDiameter>2.000000000</nomDiameter>
                              <tolDiameter>@</tolDiameter>
                              <outputDiameter>REPORT</outputDiameter>
                              <actualRadius>0.298615598</actualRadius>
                              <nomRadius>1.000000000</nomRadius>
                              <tolRadius>@</tolRadius>
                              <outputRadius>NONE</outputRadius>
                              <actualCircularity>0.003537133</actualCircularity>
                              <tolCircularity>@</tolCircularity>
                              <outputCircularity>REPORT</outputCircularity>
                              <tolConcentricity>@</tolConcentricity>
                              <outputConcentricity>NONE</outputConcentricity>
                              <tolTruePosition>@</tolTruePosition>
                              <outputTruePosition>NONE</outputTruePosition>
                              <tolRunout>@</tolRunout>
                              <outputRunout>NONE</outputRunout>
                              <tolSymmetry>@</tolSymmetry>
                              <outputSymmetry>NONE</outputSymmetry>
                              <projectionPlane>NONE</projectionPlane>
                              <circleType>UNKNOWN</circleType>
                              <datumType>NONE</datumType>
                              <outlier>0.000000000</outlier>
          DCIRC2_1E       </DefineCircle>
                          </Measure>
                          <EndLoop breakpoint="FALSE" nodeID="{C300E1AF-3CB2-4713-9916-8AE82318A363}"
returnCode="MIML_OK" blockMarker="FALSE" simulationStatus="questionable"/>
```

*Fig.22B.*

```
LOOPE </StepArray>
        <EndPartProgram breakpoint="FALSE" nodeID="{E9F4E6C2-A702-49BA-814B-C3E5B7899177}" returnCode="MIML_OK"
blockMarker="FALSE" simulationStatus="questionable"/>
       </Main>
EPP </MIML>
```

*Fig.22C.*

```xml
            <alg>DYNAMIC_THRESH</alg>
            <edgeSlope>RISING</edgeSlope>
            <edgeQuality>STRONG</edgeQuality>
            <filterType>@</filterType>
            <dllName>@</dllName>
            <paramList>@</paramList>
            <scanInterval>20</scanInterval>
            <scanIntervalUnits>DEGREES</scanIntervalUnits>
            <samplingDirection>CLOCKWISE</samplingDirection>
MCIRC2_1E </CircleTool>
DCIRC2_1S <DefineCircle breakpoint="FALSE" nodeID="{F076592F-8A59-49B2-9AEB-C61D6BE6F939}" returnCode="MIML_OK" blockMarker="FALSE" simulationStatus="questionable">
            <featureLabel>Circle-2_1[,]</featureLabel>
            <x>15.875163670</x>
            <y>0.006569734</y>
            <z>-0.000700000</z>
            <basePlane>XY</basePlane>
            <nomX>0.000000000</nomX>
            <nomY>0.000000000</nomY>
            <nomZ>0.000000000</nomZ>
            <tolX>@</tolX>
            <tolY>@</tolY>
            <tolZ>@</tolZ>
            <outputX>NONE</outputX>
            <outputY>NONE</outputY>
            <outputZ>NONE</outputZ>
            <useNominals>FALSE</useNominals>
            <actualDiameter>0.597231197</actualDiameter>
            <nomDiameter>2.000000000</nomDiameter>
            <tolDiameter>@</tolDiameter>
            <outputDiameter>REPORT</outputDiameter>
            <actualRadius>0.298615598</actualRadius>
            <nomRadius>1.000000000</nomRadius>
            <tolRadius>@</tolRadius>
            <outputRadius>NONE</outputRadius>
            <actualCircularity>0.003537133</actualCircularity>
            <tolCircularity>@</tolCircularity>
            <outputCircularity>REPORT</outputCircularity>
            <tolConcentricity>@</tolConcentricity>
            <outputConcentricity>NONE</outputConcentricity>
            <tolTruePosition>@</tolTruePosition>
            <outputTruePosition>NONE</outputTruePosition>
            <tolRunout>@</tolRunout>
            <outputRunout>NONE</outputRunout>
            <tolSymmetry>@</tolSymmetry>
            <outputSymmetry>NONE</outputSymmetry>
            <projectionPlane>NONE</projectionPlane>
            <circleType>UNKNOWN</circleType>
            <datumType>NONE</datumType>
            <outlier>0.000000000</outlier>
DCIRC2_1E </DefineCircle>
        </Measure>
        <EndLoop breakpoint="FALSE" nodeID="{C300E1AF-3CB2-4713-9916-8AE82318A363}" returnCode="MIML_OK" blockMarker="FALSE" simulationStatus="questionable"/>
    </StepArray>
```

*Fig.23A.*

```
LOOPE</StepArray>
    MCIRC2_2S  <Measure breakpoint="FALSE" nodeID="{6314736D-CAAE-4440-B92A-
    294F7AD22CD0}" returnCode="MIML_OK" blockMarker="FALSE" simulationStatus="questionable">
            <ImageSetContext breakpoint="FALSE" nodeID="{C218F681-8AD7-49CF-
    B604-1BC92C372452}" returnCode="MIML_OK" blockMarker="FALSE"
    simulationStatus="questionable">
                    <x>15.878901787</x>
                    <y>0.006622737</y>
                    <z>-0.000700000</z>
                    <coax>0</coax>
                    <stage>25</stage>
                    <ringFront>0</ringFront>
                    <ringBack>0</ringBack>
                    <ringRight>0</ringRight>
                    <ringLeft>0</ringLeft>
                    <mirrorLevel>0</mirrorLevel>
                    <color>WHITE</color>
            </ImageSetContext>
            <CircleTool breakpoint="FALSE" nodeID="{6F7A87C4-300C-4769-B99D-
    C1DB2C9F6AA7}" returnCode="MIML_OK" blockMarker="FALSE" simulationStatus="questionable">
                    <vcs>FALSE</vcs>
                    <x>15.873007782</x>
                    <y>0.006658218</y>
                    <z>-0.000700000</z>
                    <r1>0.394898303</r1>
                    <r2>0.198418421</r2>
                    <outlier>0.000000000</outlier>
                    <th>83.172932331</th>
                    <thr>0.519229729</thr>
                    <ths>49.000000000</ths>
                    <alg>DYNAMIC_THRESH</alg>
                    <edgeSlope>RISING</edgeSlope>
                    <edgeQuality>STRONG</edgeQuality>
                    <filterType>@</filterType>
                    <dllName>@</dllName>
                    <paramList>@</paramList>
                    <scanInterval>20</scanInterval>
                    <scanIntervalUnits>DEGREES</scanIntervalUnits>
                    <samplingDirection>CLOCKWISE</samplingDirection>
    MCIRC2_2E   </CircleTool>
    DCIRC2_2S   <DefineCircle breakpoint="FALSE" nodeID="{84E0F262-6084-440E-B805-
    7861682EF218}" returnCode="MIML_OK" blockMarker="FALSE" simulationStatus="questionable">
                    <featureLabel>Circle-2_2</featureLabel>
                    <x>15.875163670</x>
                    <y>0.006569734</y>
                    <z>-0.000700000</z>
                    <basePlane>XY</basePlane>
                    <nomX>0.000000000</nomX>
                    <nomY>0.000000000</nomY>
                    <nomZ>0.000000000</nomZ>
                    <tolX>@</tolX>
                    <tolY>@</tolY>
                    <tolZ>@</tolZ>
                    <outputX>NONE</outputX>
                    <outputY>NONE</outputY>
                    <outputZ>NONE</outputZ>
                    <useNominals>FALSE</useNominals>
```

*Fig.23B.*

```xml
<actualDiameter>0.597231197</actualDiameter>
    <nomDiameter>2.000000000</nomDiameter>
    <tolDiameter>@</tolDiameter>
    <outputDiameter>REPORT</outputDiameter>
    <actualRadius>1.298615598</actualRadius>
    <nomRadius>1.000000000</nomRadius>
    <tolRadius>@</tolRadius>
    <outputRadius>NONE</outputRadius>
    <actualCircularity>0.003557133</actualCircularity>
    <tolCircularity>@</tolCircularity>
    <outputCircularity>REPORT</outputCircularity>
    <tolConcentricity>@</tolConcentricity>
    <outputConcentricity>NONE</outputConcentricity>
    <tolTruePosition>NONE</tolTruePosition>
    <outputTruePosition>NONE</outputTruePosition>
    <tolRunout>@</tolRunout>
    <outputRunout>NONE</outputRunout>
    <tolSymmetry>@</tolSymmetry>
    <outputSymmetry>NONE</outputSymmetry>
    <projectionPlane>NONE</projectionPlane>
    <circleType>UNKNOWN</circleType>
    <datumType>NONE</datumType>
    <outlier>0.000000000</outlier>
  DCIRC2_2E </DefineCircle>
  </Measure>
  EPP <EndPartProgram breakpoint="FALSE" nodeID="{E9F4E6C2-A702-49BA-814B-C3E5B7899177}" returnCode="MIML_OK" blockMarker="FALSE" simulationStatus="questionable"/>
</Main>
</MIML>
```

```
                    <nomZ>0.000000000</nomZ>
                    <tolX>@</tolX>
                    <tolY>@</tolY>
                    <tolZ>@</tolZ>
                    <outputX>NONE</outputX>
                    <outputY>NONE</outputY>
                    <outputZ>NONE</outputZ>
                    <useNominals>FALSE</useNominals>
                    <actualDiameter>0.597231197</actualDiameter>
                    <nomDiameter>2.000000000</nomDiameter>
                    <tolDiameter>@</tolDiameter>
                    <outputDiameter>REPORT</outputDiameter>
                    <actualRadius>0.298615598</actualRadius>
                    <nomRadius>1.000000000</nomRadius>
                    <tolRadius>@</tolRadius>
                    <outputRadius>NONE</outputRadius>
                    <actualCircularity>0.003537133</actualCircularity>
                    <tolCircularity>@</tolCircularity>
                    <outputCircularity>REPORT</outputCircularity>
                    <tolConcentricity>@</tolConcentricity>
                    <outputConcentricity>NONE</outputConcentricity>
                    <tolTruePosition>@</tolTruePosition>
                    <outputTruePosition>NONE</outputTruePosition>
                    <tolRunout>@</tolRunout>
                    <outputRunout>NONE</outputRunout>
                    <tolSymmetry>@</tolSymmetry>
                    <outputSymmetry>NONE</outputSymmetry>
                    <projectionPlane>NONE</projectionPlane>
                    <circleType>UNKNOWN</circleType>
                    <datumType>NONE</datumType>
                    <outlier>0.000000000</outlier>
DCIRC2_1E          </DefineCircle>
                </Measure>
                <EndLoop breakpoint="FALSE" nodeID="{C300E1AF-3CB2-4713-9916-
8AE82318A363}" returnCode="MIML_OK" blockMarker="FALSE" simulationStatus="questionable"/>
    LOOPE      </StepArray>
    MCIRC2_2S  <Measure breakpoint="FALSE" nodeID="{4CEEE2A2-7652-47D3-B7b3-173179E3997B}"
returnCode="MIML_OK" blockMarker="FALSE" simulationStatus="questionable">
                    <ImageSetContext breakpoint="FALSE" nodeID="{B4DF4864-C375-4954-
A309-BF91ABAFA9B0}" returnCode="MIML_OK" blockMarker="FALSE"
simulationStatus="questionable">
                    <x>15.878901787</x>
                    <y>0.008622737</y>
                    <z>-0.000700000</z>
                    <coax>0</coax>
                    <stage>25</stage>
                    <ringFront>0</ringFront>
                    <ringBack>0</ringBack>
                    <ringRight>0</ringRight>
                    <ringLeft>0</ringLeft>
                    <mirrorLevel>0</mirrorLevel>
                    <color>WHITE</color>
                </ImageSetContext>
                <CircleTool breakpoint="FALSE" nodeID="{856F5A6E-E548-48A5-9D7F-
16EC8500F9D7}" returnCode="MIML_OK" blockMarker="FALSE" simulationStatus="questionable">
                    <vcs>FALSE</vcs>
                    <x>15.874252644</x>
```

```xml
<useNominals>FALSE</useNominals>
<actualDiameter>0.597231197</actualDiameter>
<nomDiameter>2.000000000</nomDiameter>
<tolDiameter>@</tolDiameter>
<outputDiameter>REPORT</outputDiameter>
<actualRadius>0.298615598</actualRadius>
<nomRadius>1.000000000</nomRadius>
<tolRadius>@</tolRadius>
<outputRadius>NONE</outputRadius>
<actualCircularity>0.003537133</actualCircularity>
<tolCircularity>@</tolCircularity>
<outputCircularity>REPORT</outputCircularity>
<tolConcentricity>@</tolConcentricity>
<outputConcentricity>NONE</outputConcentricity>
<tolTruePosition>@</tolTruePosition>
<outputTruePosition>NONE</outputTruePosition>
<tolRunout>@</tolRunout>
<outputRunout>NONE</outputRunout>
<tolSymmetry>@</tolSymmetry>
<outputSymmetry>NONE</outputSymmetry>
<projectionPlane>NONE</projectionPlane>
<circleType>UNKNOWN</circleType>
<datumType>NONE</datumType>
<outlier>0.000000000</outlier>
DCIRC2_2E    </DefineCircle>
    </Measure>
    EPP <EndPartProgram breakpoint="FALSE" nodeID="{E9F4B4C2-A702-49BA-814B-C3E5B78991777}"
returnCode="MIML_OK" blockMarker="FALSE" simulationStatus="questionable"/>
    </Main>
</MIML>
```

*Fig. 24E.*

MACHINE VISION SYSTEM PROGRAM EDITING ENVIRONMENT INCLUDING OPERATING CONTEXT AWARE COPY AND PASTE FEATURE

TECHNICAL FIELD

The invention relates to machine vision inspection systems, and to systems, GUIs and methods embodied in computer-readable media for creating and editing part programs in such systems, including a smart copy and paste features which may be used to generate simplified representations of underlying "computer language" instructions and/or their corresponding underlying instructions to assist a "non-programmer" user in creating a part program.

BACKGROUND

Precision machine vision inspection systems (or "vision systems" for short) can be utilized to obtain precise dimensional measurements of inspected objects and to inspect various other object characteristics. Such systems may include a computer, a camera and optical system, and a precision workstage that is movable in multiple directions to allow the camera to scan the features of a workpiece that is being inspected. One exemplary prior art system that is commercially available is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in their entirety. This series of products, for example, is able to use a microscope-type optical system to provide images of a workpiece at various magnifications, and move the stage as necessary to traverse the workpiece surface beyond the limits of any single video image. A single video image typically encompasses only a portion of the workpiece being observed or inspected, given the desired magnification, measurement resolution, and physical size limitations of such systems.

Machine vision inspection systems generally utilize automated video inspection. U.S. Pat. No. 6,542,180 (the '180 patent) teaches various aspects of such automated video inspection and is incorporated herein by reference in its entirety. As taught in the '180 patent, automated video inspection metrology instruments generally have a programming capability that allows an automatic inspection event sequence to be defined by the user for each particular workpiece configuration. This can be implemented by text-based programming, for example, or through a recording mode which progressively "learns" the inspection event sequence by storing a sequence of machine control instructions corresponding to a sequence of inspection operations performed by a user with the aid of a graphical user interface (GUI), or through a combination of both methods. Such a recording mode is often referred to as "learn mode" or "training mode." Once the inspection event sequence is defined in "learn mode," such a sequence can then be used to automatically acquire (and additionally analyze or inspect) images of a workpiece during "run mode."

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as edge/boundary detection video tools.

In order to facilitate programming by relatively unskilled users, video tools (or "tools" for short) and other GUI features may be set up to accomplish inspection and/or other machine control operations. Video tools' set-up parameters and operations can be recorded during learn mode, in order to create automatic inspection programs, or "part programs," which incorporate measurement/analytical operations to be performed by various video tools. Video tools may include, for example, edge/boundary detection tools, autofocus tools, shape or pattern matching tools, dimension measuring tools, and the like. Other GUI features may include dialog boxes related to data analysis, step and repeat loop programming—as disclosed, for example, in U.S. Pat. No. 8,271,895, (the '895 patent) which is hereby incorporated herein by reference in its entirety—etc. For example, such tools and GUI features are routinely used in a variety of commercially available machine vision inspection systems, such as the QUICK VISION® series of vision systems and the associated QVPAK® software, discussed above.

Editing of a part program by relatively unskilled user may be difficult. In particular, currently there is no convenient method for an unskilled user to perform "operating context-enabled" copy and paste operations. That is, there are no copy and paste operations for part programs for a machine vision system or other automated inspection system, which are useful for editing programs by taking into account that copying instructions that are configured for compatibility with an operating context and/or editing context at one location in a part program require modification before they can provide compatibility with an operating context and/or editing context at a paste location at another location in the part program. For example, copying and pasting instructions from inside to outside a step and repeat loop, or vice versa, may be particularly difficult for unskilled users.

The present invention is directed to providing a system, GUI and method as embodied in a computer-readable medium, which allow the creation and use of intuitive, flexible and robust operations and/or commands for copy and paste editing commands for part programs for precision machine vision inspection systems.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In various embodiments, a machine vision inspection system is provided, which is operable in a learn mode to create a part program and in a run mode to execute a previously-created part program. The system includes an imaging portion, a stage for holding one or more workpieces in a field of view of the imaging portion, a control portion, and a graphical user interface (GUI). The system further includes an editing portion operable to edit part program instructions in the learn mode, the editing portion including an editing interface portion displayable in the GUI.

The system further includes a copy and paste manager portion, which may be implemented in hardware and/or software configured to be operable to generate and define, in the learn mode, copy operations and paste operations in a part program. In some embodiments, the copy and paste commands may be used to paste a set of elements that are substantial replications of the copied elements at a new location in a part program. As used herein, the phrase substantial replication does not necessarily mean a literal or exact replication of all details of the inspection instructions or their representations, although this may be the case in some embodiments. Rather, it means replication of at least the features of the instructions that replicate the essential or fundamental operations of the repeated operations block.

The copied elements may comprise machine-executable code instructions written in a markup language (e.g., HTML, XML or a derivative thereof) and/or associated editable instruction representations that are displayed in the GUI (e.g., in the editing portion). The term copied elements as used herein generally may encompass both of these associated aspects, unless otherwise indicated by description or context. In common with other type of instructions and instruction representations referred to herein, unique identifiers (e.g., node identifiers) may be assigned and used in various embodiments to support certain operating context establishing operations, and/or user interface window synchronization operations, and/or code and representation associations. In one embodiment such associations and features may be implemented as described in co-pending, co-assigned U.S. patent application Ser. No. 13/297,232 (the '232 application), filed Nov. 15, 2011, titled "Machine Vision System Program Editing Environment Including Real Time Context Generation Features" published as U.S. Application Publication No. 2013/0123945 A1, and co-pending, co-assigned U.S. patent application Ser. No. 13/676,061 (the '061 application), filed Nov. 13, 2012, titled "Machine Vision System Program Editing Environment Including Synchronized User Interface Features" published as U.S. Application Publication No. 2013/0125044 A1, which are each hereby incorporated herein by reference in their entirety.

In some embodiments, a part program representation and/or the copied elements (e.g., instruction representations and/or the code instructions) may be arranged in a tree structure including one or more parent nodes having one or more child nodes, or the like. User input to edit instruction representations on the GUI, including the copied elements, may include one or more of adding, deleting, and modifying any of the instruction representations. In some embodiments, some of the nodes correspond to video tools each containing a subset of instructions directed to discrete operation such as a geometry measurement operation or an imaging (e.g., auto-focusing) operation, or an image processing operation, and so on. In various embodiments, each of the copied elements may be assigned a unique node name, variable name, and/or code block name. A name may in some embodiments and or situations be changed when the node or copied element has been edited.

In various embodiments, a computer-readable medium is provided, which includes computer-executable instructions, which are configured to be loaded onto a computer to enable the computer to perform a method corresponding to the features and operations outlined herein.

It should be appreciated that editing a part program for a machine vision inspection system is a more complex task than editing a program for a machine tool or assembly robot or the like. For example, part programs for machine vision inspection systems include later portions that control operations and/or provide image-dependent measurement results that depend at least partially on the results determined by the execution of a previous portion of the program and/or on the particular instance of a workpiece that is being used to provide the images that are essential to the inspection operations. Furthermore, the required lighting and/or exposure time required for a particular image may depend on a particular instance of a workpiece. Furthermore, if a user saves a partially completed part program and recalls the part program at a later time to alter or finish the programming, it may be unknown if certain types of changes have occurred in the interim (e.g., changes in environmental conditions, the part being inadvertently moved on the stage, etc.) that may adversely affect the continuing edits to the part program. Due to such concerns, it has been a standard practice for some such systems to actually execute all of the instructions of a part program from the beginning up to and including any potential additional modifications or additions to the part program instructions, in order to verify that the modifications and/or additions are being programmed based on a realistic set of conditions for their operation. However, the execution of all of the instructions of a part program to provide a realistic operating condition for modifications or additions to the instructions is impractical for a large part programs (e.g., those including a large number of image acquisitions, and/or feature inspections), which is particularly common for machine vision inspection systems that provide microscopic inspection (e.g., micron resolution measurements) on macroscopic objects (e.g., objects spanning tens or hundreds of millimeters).

The '232 application and the '061 application, incorporated herein by reference above, disclose features that can provide an editing environment that can reliably update operating conditions or operating context in a short time (e.g., nearly "real time") during editing operations and to allow more rapid, efficient, intuitive, and flexible and robust creation and editing of part programs for precision machine vision inspection systems. However, there remains a need for copy and paste operations associated with such an editing environment. Known copy and paste methods also do not support the elements and functionality associated with the operations disclosed in the '232 application and the '061 application. The difficulty is that copying and pasting instructions in a machine vision inspection system part program is more complex than cutting and pasting instructions in a text based program that does not actually move physical objects, and is even more complex than cutting and pasting instructions in a program for a machine tool or assembly robot or the like. Copying instructions which are configured according to a proper operating context at one location in a part program and then pasting to another location in the part program cannot be carried out by previously known methods. Previously known text based methods, even if potentially able to perform the required operations, cannot be used by relatively unskilled users who are not computer programmers and who do not understand the computer language that is used to write the fundamental part program that is stored and recalled for later execution to inspect a workpiece. Methods outlined in the '232 application and the '061 application related to an editing environment that enables high speed operating context generation and use, to provide relatively immediate and realistic "program creation and editing results" feedback to relatively unskilled program editors, but have not contemplated the difficulties associated with copying "operating context enabled" program instructions from one portion of a part program and pasting it in another part of the part program. A means for copying and pasting in such an editing environment would be desirable.

According to the considerations outlined above, it would be desirable for a machine vision inspection system to provide copy and paste operations that are compatible with near real time updates to the operating context when editing a part program, in order to verify that, at the time modifications and/or additions are programmed, a realistic set of operating conditions are available as the basis or operating context for the modifications and/or additions. This is particularly important when the part program is created and edited by recording actual control operations input by a user of the machine vision inspection system, in that the user is intuitively selecting the details of their input operations based on the state of the machine vision inspection system and/or the appearance and location of the images that are present at the time that they are providing their input operations, and so on. Thus, the user cannot begin a valid and reliable modification of a part program at an arbitrary location in the part program, without first establishing the system in substantially the same operating context at that location as would be provided by the execution of the previous instructions of the part program during their automatic mode of execution during run mode. Heretofore, no general purpose machine vision inspection system, and particularly no system which records actual user controlled operations in order to create a part program (e.g., as opposed to simple graphical object or text based programming systems), have provided an editing environment which reliably and robustly provides a valid part programming editing operating context for copy and paste operations in near real time, during editing operations.

The copy and paste operations should include at least some automatic operations, such that the copy and paste operations are usable by relatively unskilled users. In various embodiments, the copy and paste operations should appear to a user to act on simple representations of part program instructions that may be edited by a relatively unskilled user, rather than on the underlying text-based language that actually forms the part program instructions that are stored and executed to automatically perform inspection operations. In various embodiments, various meta-data that may be associated with the simple representations that may be edited are included in the underlying part program instructions or code, such that they are hidden. Their presence and/or removal may be invisible to the user in various embodiments, to avoid clutter in the GUI, and to avoid confusion for relatively unskilled users. Surrogated data used for an edit mode of execution may be one such type of metadata. A data format in the form of an array defined for a step-and-repeat program may be another example of metadata. In various embodiments, the copy and paste operations automatically adjust (add, delete, modify) metadata associated with copied representations of part program instructions so that the adjusted metadata may be compatible with the pasted location within the part program. In various embodiments, the pasted representations may not, in themselves, reflect the presence, absence, or alteration of underlying associated instructions or metadata, such as the surrogate data and the like. Rather, the copy and paste commands may include operations structured such that the aspects of the metadata status that are useful for the user to recognize are reflected in a status indicator (e.g., a node identifier, coded cursor state, insertion pointed state, the state of a "color bar" which extends along the margin of a code block to color code its status, as disclosed in the '232 application or the like) that is generally used in the editing interface to perform this function. Thus, the copy and paste operations provide pasted code that is compatible with the operating context that it is pasted into, and that behaves with regard to status indications and run operations, and the like, in a manner that shares many or most operational characteristics with other programming operations, e.g., new operation creation and the like, that the user might perform at the paste location and/or in that operating context, including its behavior in response to editing operations at the paste location, and so on.

Additional considerations arise when the editing environment suppresses the part program instructions as they are written in an underlying programming language (e.g. a mark up language), and instead uses simplified representations of the instructions in an editing interface, to facilitate programming by relatively unskilled users (e.g. user who do not understand mark up language). In such a case, in various embodiments, it may be advantageous for the copy and paste commands to automatically operate on both instructions representations and the underlying programming language, while hiding the underlying program copy and paste operations from the user. It may also be advantageous for the copy and paste commands to automatically expand any parent nodes that are initially collapsed in the instruction representations such that a user can see their child nodes and thereby understand the full scope of the copy and/or paste operations. In addition, the GUI of an editing environment such as that outlined above may comprise an editing context status indicator displayed proximate to a location in the displayed part program representation to indicate the editing context status (the operating context status) at that location. In such a case, it may be advantageous for the copy and/or paste command to operate such that the pasted elements behave in a manner similar to newly created or inserted new instructions despite being copied from the copy location. In such a case the editing context status indicator may conservatively indicate that the operating context and/or editing context at the paste location is questionable or invalid until the instructions corresponding to the pasted elements are executed using the vision system (e.g. in surrogate/simulated and/or actual execution mode). In some embodiments, the editing context status indicator may comprise an instruction pointer that changes color depending on an editing context status corresponding to its location in the displayed part program representation.

The section below titled "OUTLINE OF COPY AND PASTE OPERATIONS, FEATURES, AND IMPLEMENTATIONS", in the context of the present application, is intended to be illustrative of some, but not all possible embodiments, and is not intended to be limiting. Nevertheless, it is intended to encompasses various embodiments that solve the problems outlined above, and that may provide other benefits as well. Various alternative embodiments within the scope of this claim are possible and may be understood or realized by one of ordinary skill in the art having the benefit of various principles taught or disclosed in the materials of this application taken in combination with the teachings of the '232 application and the '061 application incorporated above:

OUTLINE OF COPY AND PASTE
OPERATIONS, FEATURES, AND
IMPLEMENTATIONS

According to an aspect of the invention, a computer-readable medium including computer-executable instructions is provided as below:

1. A computer-readable medium including computer-executable instructions, which are configured to be loaded onto a computer to enable the computer to perform a method for copying and pasting a set of machine vision part program operations when editing a part program in a machine vision inspection system, the machine vision inspection system including: an imaging portion, a stage for holding one or more workpieces in a field of view of the imaging portion, a control portion, an editing portion, a display, a graphical user interface (GUI), and a learn mode configured such that it is operable to receive user input to control operations of the machine vision inspection system and record associated part program instructions corresponding to the controlled operations in order to create a part program, the method to be performed comprising:

provided a copy command and a paste command associated with the editing portion;

providing an editing interface portion of the GUI, the editing interface portion operable to display an editable part program representation of underlying part program instructions, the part program representation comprising instruction representations;

displaying a part program representation of an underlying part program in the editing interface portion;

selecting at least a first instruction representation at a copy location in the displayed part program representation to define a selected instruction representation copy set associated with an underlying selected instruction copy set;

operating the editing interface portion to define a paste location in the displayed part program representation where the selected instruction representation set is to be pasted, the paste location associated with an instruction paste location in the underlying part program;

operating the editing portion such that it performs copy set modification operations directed to at least one of the selected instruction representation copy set and the selected instruction copy set, the copy set modification operations including forming a modified selected instruction representation copy set by operations including at least one of: a) modifying elements and associations of the selected instruction representation copy set that are incompatible with the paste location operating context, b) adding elements and associations to the selected instruction representation copy set that are required for compatibility with the paste location operating context, and c) forming the modified selected instruction representation copy set based on a modified selected instruction copy set formed by operations comprising at least one of c1) modifying elements and associations of the selected instruction copy set that are incompatible with the instruction paste location operating context, and c2) adding elements and associations to the selected instruction copy set that are required for compatibility with the instruction paste location operating context; and operating the editing portion such that it performs paste operations comprising pasting the modified selected instruction representation copy set into the paste location in the displayed part program representation.

The following section discloses various details regarding implementations and detailed features, by way of example and not by way of limitation. As will be understood by one of ordinary skill in the art based on the disclosed materials and the incorporated references, various elements of the computer-readable medium outlined above may encompass the various respective features and or aspects outlined below in various respective embodiments:

At least one of the selected instruction representation copy set and the associated underlying selected instruction copy set may comprise a program node. The program node may comprise a parent node that includes child nodes.

modifying elements and associations of the selected instruction copy set and/or modifying elements and associations of the selected instruction representation copy set may comprise altering a feature name, a tolerance name, a part coordinate system name, a "measurement point buffer" name, or a displayed variable name, or the like associated with such elements (e.g., in a displayed instruction representation and/or in the underlying instruction code). More generally, any "stored element" name may be altered prior to pasting a copy of instructions or representation including the stored element name to a new location. The alteration may preferably be an automatic alteration, or may include an automatically displayed alteration prompt to a user.

modifying elements and associations of the selected instruction copy set and/or modifying elements and associations of the selected instruction representation copy set may comprise altering a unique node identifier associated with such elements (e.g., a unique node identifier associated with an instruction representation, but that is not displayed in the part program representation, and/or a unique node identifier that is included in the underlying instruction code). The alteration may preferably be an automatic alteration, if the selected instruction representation copy set is pasted into a step and repeat loop, modifying elements and associations of the selected instruction copy set and/or modifying elements and associations of the selected instruction representation copy set may comprise altering a feature name, a tolerance name, a part coordinate system name, a "measurement point buffer" name, or a displayed variable name, or the like associated with such elements (e.g., in a displayed instruction representation and/or in the underlying instruction code), which may include altering or adding an element or format consistent with the operating context of the step and repeat loop. In one embodiment, this may include altering a displayed element name (e.g., a feature name) to include an "index bracket" or the like, which is a format element that may be used to hold various array position or loop iteration indices, or the like, in the operating context of a step and repeat loop (e.g., to identify or name results of a "loop operations" iteration at a particular one of the step and repeat locations). More generally, any "stored element" name may be altered or reformatted prior to pasting a copy of instructions or representation including the stored element name to a new location within a step and repeat loop. The alteration may preferably be an automatic alteration, or may include an automatically displayed alteration prompt to a user.

if the selected instruction representation copy set is copied from a step and repeat loop and pasted outside of a step and repeat loop, modifying elements and associations of the selected instruction copy set and/or modifying elements and associations of the selected instruction representation copy set may comprise altering or removing a feature name, a tolerance name, a part coordinate system name, a "measurement point buffer" name, or a displayed variable name, or the like (e.g., in a displayed instruction representation and/or in the underlying instruction code), or format that is specific to the operating context of the step and repeat loop. In one embodiment, this may include altering a displayed element name (e.g., a feature name) to delete an "index bracket" or the like, which is a format element that may be used to hold various array position or loop iteration indices, or the like, in the operating context of a step and repeat loop (e.g., to identify or name results of a "loop operations" iteration at a particular one of the step and repeat locations). More generally, any "stored element" name may be altered and/or reformatted prior to pasting a copy of instructions or representation including the stored element name to a new location outside a step and repeat loop. The alteration may preferably be an automatic alteration, or may include an automatically displayed alteration prompt to a user.

modifying elements and associations of the selected instruction copy set and/or modifying elements and associations of the selected instruction representation copy set may comprise eliminating such elements.

the editing portion may be further operated such that it performs paste operations comprising pasting the modified selected instruction copy set into the instruction paste location in the underlying part program representation the editing portion may be operated to perform the copy set modification operations including operating the GUI to execute the copy command such that it is directed to the selected instruction representation copy set and/or the associated underlying selected instruction copy set.

at least some of the copy set modification operations may be automatically performed in response to execution of the copy command. In one embodiment, such operations comprise removing at least one of a) surrogate data corresponding to the selected instruction representation copy set, and b) an association between the selected instruction representation copy set and any corresponding surrogate data (e.g., the association may be provided by a node identifier which is removed or altered, such that the association is broken, in one embodiment). In one embodiment, such operations may comprise moving a copy of at least one of the selected instruction copy set and the selected instruction representation copy set to a clipboard, after the corresponding surrogate data and/or its association is removed. In one embodiment, Windows clipboard functionality may be used for the clipboard operations. In one embodiment, Windows "private" clipboard functionality may be used.

at least some of the copy set modification operations may be automatically performed in response to execution of the paste command. In one embodiment, such operations comprise adding or altering at least one of a) an association between the selected instruction representation copy set and a corresponding surrogate data storage address or location (e.g., the association may be provided by a node identifier which is added or altered, such that the association is created, in one embodiment), and b) a feature name, a tolerance name, a part coordinate system name, a "measurement point buffer" name, or a displayed variable name, or the like. In one embodiment, such operations may comprise moving a copy of at least one of the selected instruction copy set and the selected instruction representation copy from the clipboard to the paste or instruction paste location. In one embodiment, Windows clipboard functionality may be used for the clipboard operations. In one embodiment, Windows "private" clipboard functionality may be used.

In one embodiment, the copy and/or paste commands may be displayable in the GUI, and the commands are selectable and/or executable by a user to activate the corresponding operations to provide the copy set modification operations directed to the selected instruction representation copy set and/or the associated underlying selected instruction copy set.

In one embodiment, the editing interface portion may be operated to select and/or execute the copy command directed to the selected instruction representation copy set and/or the associated underlying selected instruction copy set and/or their modified counterparts by: selecting the representation copy set and/or the associated underlying selected instruction copy set in the editing interface portion of the GUI; operating the GUI to display a menu including at least the copy command corresponding to the selected instruction representation copy set and/or the associated underlying selected instruction copy set; and selecting the copy command in the displayed menu.

In one embodiment, the editing interface portion may be operated to select and/or execute the paste command directed to the selected instruction representation copy set and/or the associated underlying selected instruction copy set and/or their modified counterparts by: positioning a cursor or other editing location indicator of the GUI at the paste location in the part program representation; operating the GUI to display a menu including at least the paste command corresponding to the selected instruction representation copy set and/or the associated underlying selected instruction copy set or their modified counterparts on the clipboard; and selecting the paste command in the displayed menu.

As is common with programs and routines, the partitioning of various operations between those associated with the "copy" command and those associated with the "paste" command may vary to take various forms in various embodiments. Such various forms may be any form arrived at by one of ordinary skill in the art based on the teachings disclosed herein, so long as that form is operable to provide the features disclosed and/or claimed herein.

In one embodiment, a "representation" (e.g., the part program representation(s) may be interpreted such that it is considered to comprise the underlying machine-executable code instructions written in a markup language as well as the editable instruction representations that are displayed on the GUI, which are associated with their corresponding underlying code instructions. In one embodiment, this interpretation may be so because the representations may be generated from the underlying machine-executable code instructions, for example when recalling a previously created and stored part program, and displaying its representation in the GUI.

the underlying machine-executable code instructions may be written in a markup language. The mark up language may be a custom "XML-like" or "HTML-like" language.

In one embodiment, a method related to the copy and paste operations disclosed herein may include one or more of the following steps:

selecting at least a first instruction representation at a copy location in the displayed part program representation to define a selected instruction representation copy set associated with an underlying selected instruction copy set;

operating the GUI to initiate copy operations that create a copy of at least one of the selected instruction representation copy set and the underlying selected instruction copy set (e.g., by activating a copy command widget directed to the selected instruction representation copy set);

automatically performing copy operations to perform a first subset of the copy set modification operations directed to at least one of the selected instruction representation copy set and the selected instruction copy set (e.g., the first subset of the copy set modification operations may be directed to elements that are specific to the operating context at the copy location, which may comprise for example, eliminating associated surrogate data and/or its association with the copy set(s), and/or providing a new or altered unique node identifier, and/or the like). The partially modified copy set(s) may be stored on a clipboard;

defining a paste location in the displayed part program representation where the selected instruction representation set is to be pasted, the paste location associated with an instruction paste location in the underlying part program;

operating the GUI to initiate paste operations directed to at least one of the partially modified counterparts of the selected instruction representation copy set and the underlying selected instruction copy set (e.g., by activating a paste command widget directed to the paste location);

automatically performing paste operations to perform a second subset of the copy set modification operations directed to the partially modified counterparts of at least one of the selected instruction representation copy set and the selected instruction copy set. For example, the second subset of the copy set modification operations may be directed to elements that are specific to the operating context at the paste location, including at least one of: a) modifying elements and associations of the selected instruction representation copy set that are incompatible with the paste location operating context, b) adding elements and associations to the selected instruction representation copy set that are required for compatibility with the paste location operating context (e.g., a or b may provide a new or altered feature names or the like, in the proper format, and so on,) and c) forming the modified selected instruction representation copy set based on a modified selected instruction copy set formed by operations comprising at least one of c1) modifying elements and associations of the selected instruction copy set that are incompatible with the instruction paste location operating context, and c2) adding elements and associations to the selected instruction copy set that are required for compatibility with the instruction paste location operating context. The partially modified copy set(s) may be automatically retrieved from the clipboard and the second subset of the copy set modification operations performed to create a (fully) modified selected instruction representation copy set and/or (fully) modified selected instruction copy set;

automatically performing paste operations that paste the modified selected instruction representation copy set at the paste location in the part program representation, and/or paste the modified selected instruction representation copy set at the instruction paste location in the underlying part program;

automatically performing operations of the editing interface GUI that indicate that the pasted modified selected instruction representation copy set has the status similar to that of newly created or inserted "new instructions" despite being copied from a location that may have been previously executed.

In one embodiment, the copy operations comprise automatically expanding at least one parent node included in the selected instruction representation copy set to display all of its child nodes included in the selected instruction representation copy set. The nodes included in the selected instruction representation copy set may be highlighted in the GUI, as a further indication of their extent. In some embodiments, all nodes in the selected instruction representation copy set are displayed. In one embodiment, this occurs when the copy command widget is selected or "hovered over", before it is executed.

In one embodiment, the paste operations comprise automatically expanding at least one parent node included in the pasted modified selected instruction representation copy set to display all of its child nodes included in the modified selected instruction representation copy set. The nodes included in the pasted modified selected instruction representation copy set may be highlighted in the GUI, as a further indication of their extent. In some embodiments, all nodes in the pasted modified selected instruction representation copy set are displayed. In one embodiment, this also occurs when the paste copy command widget is selected or "hovered over", before it is executed.

DESCRIPTION OF THE DRAWINGS

FIGS. 20A-24E are diagrams of part program code instructions, or portions thereof, written in a markup language, which correspond to various states and/or operation sequences depicted in the sequence operations represented in FIGS. 3A-19.

DESCRIPTION

Figure 1:
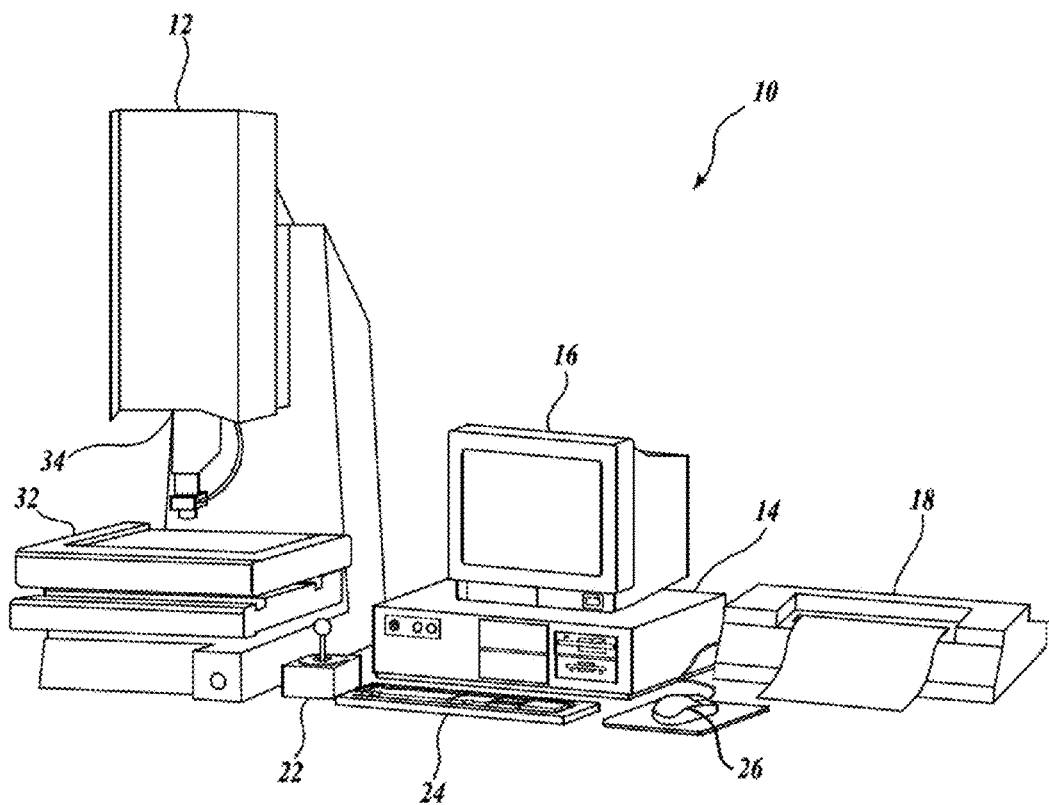
FIG. 1 is a diagram showing various typical components of a general purpose precision machine vision inspection system.

Regarding any of the descriptions and/or figures disclosed herein, many features of the figures, including the hardware and software components and their corresponding operations, GUI features and their corresponding operations, and the like, may be understood based on the descriptions of their substantially similar counterparts in FIG. 1, which is a diagram of one exemplary machine vision inspection system 10 usable in various embodiments of the present invention. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10, such as a GUI for generating and editing a part program including step-and-repeat instructions, including performing cut and paste operations as part of the program generating and editing operations, according to various embodiments of the present invention.

The vision measuring machine 12 includes a moveable workpiece stage 32, and an optical imaging system 34 which may include a zoom lens or interchangeable lenses. The zoom lens or interchangeable lenses generally provide various magnifications for the images provided by the optical imaging system 34. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in commonly assigned U.S. Pat. Nos. 7,454,053, 7,324,682, 8,111,938, and 8,111,905, which are each incorporated herein by reference.

Figure 2A:
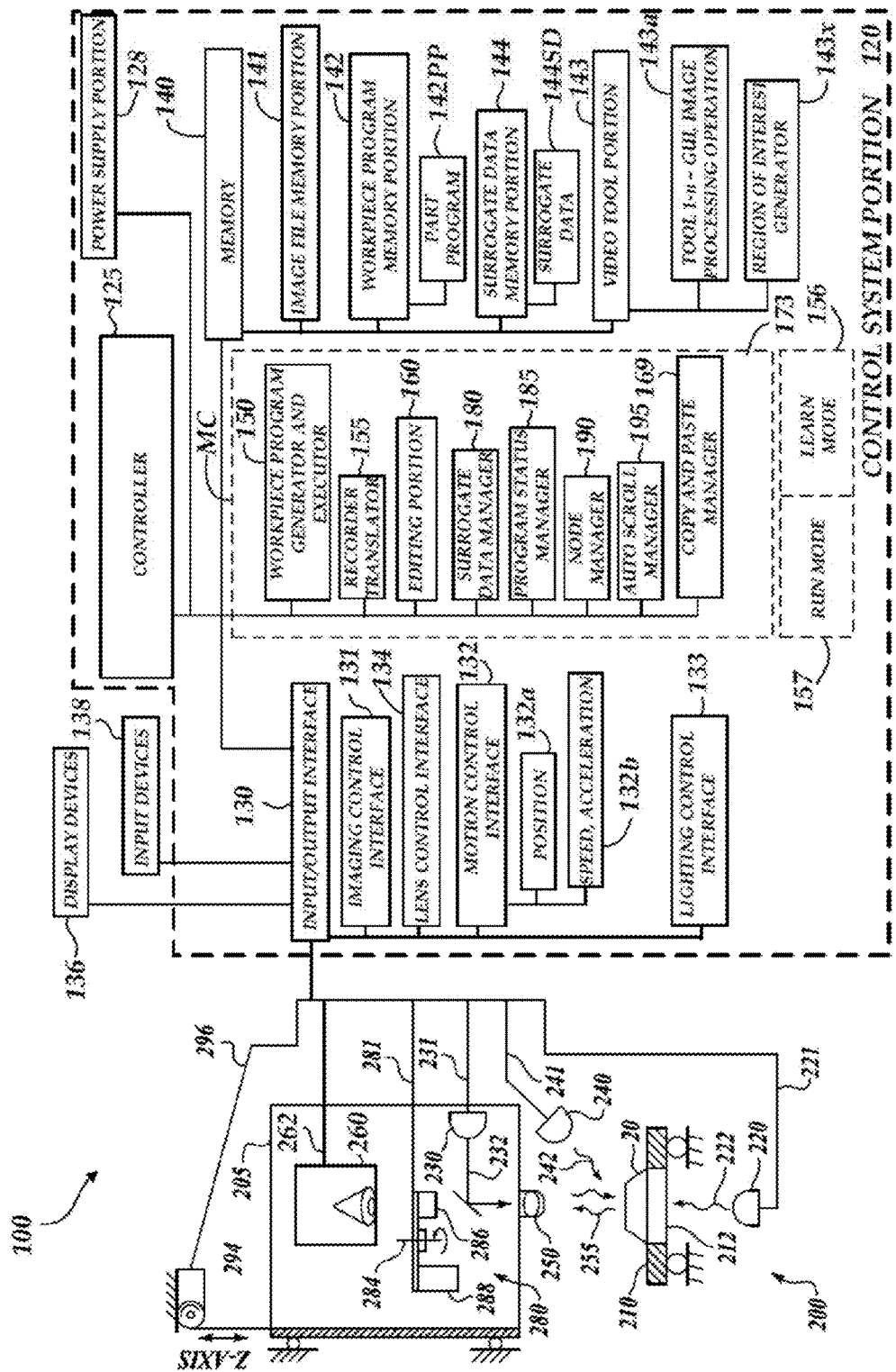
FIGS. 2A and 2B are block diagrams of a control system portion and a vision components portion of a machine vision inspection system similar to that of FIG. 15, including modules and features usable in various embodiments according to this invention.
Figure 2B:
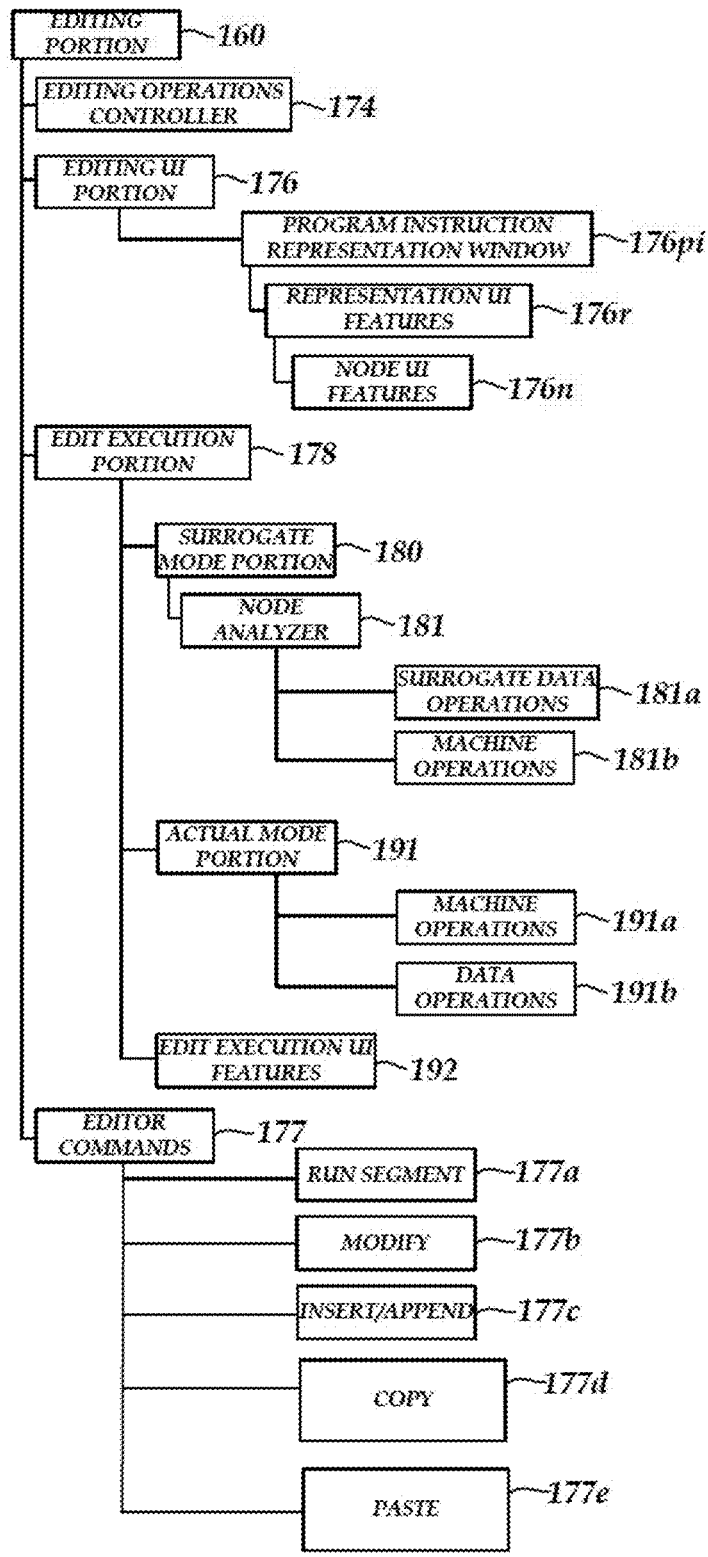

FIGS. 2A and 2B are block diagrams of a control system portion 120 and a vision components portion 200 of a machine vision inspection system 100 similar to the machine vision inspection system 10 of FIG. 1, and the control system portion 120 includes features usable in various embodiments according to the present invention. The control system portion 120 is utilized to control the vision components portion 200. As shown in FIG. 2A, the vision components portion 200 includes an optical assembly portion 205, light sources 220, 230 and 240, and a workpiece stage 210 having a central transparent portion 212. The workpiece stage 210 is controllably movable along X and Y axes that lie in a plane that is generally parallel to the surface of the stage on which a workpiece 20 may be positioned. The optical assembly portion 205 includes a camera system 260, an interchangeable objective lens 250, and may include a turret lens assembly 280 having lenses 286 and 288. Alternatively to the turret lens assembly, a fixed or manually interchangeable magnification-altering lens, or a zoom lens configuration, or the like, may be included. The optical assembly portion 205 is controllably movable along a Z-axis that is generally orthogonal to the X and Y axes, by using a controllable motor 294.

A workpiece 20, or a tray or fixture holding a plurality of workpieces 20, which is to be imaged using the machine vision inspection system 100, is placed on the workpiece stage 210. The workpiece stage 210 may be controlled to move relative to the optical assembly portion 205, such that the interchangeable objective lens 250 moves between locations on a workpiece 20 and/or among a plurality of workpieces 20. One or more of a stage light 220, a coaxial light 230, and a surface light 240 may emit source light 222, 232, or 242, respectively, to illuminate the workpiece or workpieces 20. The source light is reflected or transmitted as workpiece light 255, which passes through the interchangeable objective lens 250 and the turret lens assembly 280 and is gathered by the camera system 260. The image of the workpiece(s) 20, captured by the camera system 260, is output on a signal line 262 to the control system portion 120. The light sources 220, 230, and 240 may be connected to the control system portion 120 through signal lines or busses 221, 231, and 241, respectively. To alter the image magnification, the control system portion 120 may rotate the turret lens assembly 280 along axis 284 to select a turret lens, through a signal line or bus 281.

In various exemplary embodiments, the optical assembly portion 205 is movable in the vertical Z-axis direction relative to the workpiece stage 210 using a controllable motor 294 that drives an actuator, a connecting cable, or the like, to move the optical assembly portion 205 along the Z-axis to change the focus of the image of the workpiece 20 captured by the camera system 260. The term Z-axis, as used herein, refers to the axis that is intended to be used for focusing the image obtained by the optical assembly portion 205. The controllable motor 294, when used, is connected to the input/output interface 130 via a signal line 296.

As shown in FIG. 2A, in various exemplary embodiments, the control system portion 120 includes a controller 125, a power supply portion 128, the input/output interface 130, a memory 140, a workpiece program (part program) generator and executor 150, a recorder translator 155, a learn mode executor 156, a run mode executor 157, an editing portion 160, a surrogate data manager 180, a program status manager 185, a node manager 190, an auto scroll manager 195, and a copy and paste manager 169. Each of these components, as well as the additional components described below, may be interconnected by one or more data/control buses and/or application programming interfaces, or by direct connections between the various elements. As apparent to those skilled in the art, any of these components may be merged together, may consist of multiple sub-components, or any of their respective sub-components may be merged together, depending on each implementation.

The input/output interface 130 includes an imaging control interface 131, a motion control interface 132, a lighting control interface 133, and a lens control interface 134. The motion control interface 132 may include a position control element 132a, and a speed/acceleration control element 132b, although such elements may be merged and/or indistinguishable. The lighting control interface 133 controls, for example, the selection, power (intensity), on/off switch, and strobe pulse timing if applicable, for the various corresponding light sources of the machine vision inspection system 100.

The memory 140 includes an image file memory portion 141, a workpiece program memory portion 142 that may include one or more part programs 142PP, or the like, a video tool portion 143, and in the illustrated embodiment a surrogate data memory portion 144 that may include surrogate data 144SD. The video tool portion 143 includes various video tools (collectively 143a) each including the GUI and image processing operation defined to perform a specific function, such as edge/boundary detection tools, autofocus tools, shape or pattern matching tools and dimension measuring tools. Many known video tools are included in commercially available machine vision inspection systems, such as the QUICK VISION® series of vision systems and the associated QVPAK® software discussed above. The video tool portion 143 also includes a region of interest (ROI) generator 143x that supports automatic, semi-automatic and/or manual operations that define various ROIs that are operable in various video tools included in the video tool portion 143.

The surrogate data memory portion 144 includes surrogate data 144SD. In accordance with some embodiments, when editing a part program, rather than being required to execute all of the steps of the part program from the beginning in order to generate the needed operating context for continuing edits at a certain location in the program, the needed operating context (both in terms of hardware setting and software parameters and values) can be simulated using previously saved data as surrogate data, as described in the previously referenced '232 application.

In general, the memory portion 140 stores data usable to operate the vision system components portion 200 to capture or acquire an image of the workpiece 20 such that the acquired image of the workpiece 20 has desired image characteristics. The memory portion 140 may also store inspection result data, and may further store data usable to operate the machine vision inspection system 100 to perform various inspection and measurement operations on the acquired images (e.g., implemented, in part, as video tools), either manually or automatically, and to output the measurement results through the input/output interface 130. The memory portion 140 may also contain data defining a user interface operable through the input/output interface 130.

The signal lines or busses 221, 231 and 241 of the stage light 220, the coaxial light 230, and the surface light 240, respectively, are all connected to the input/output interface 130. The signal line 262 from the camera system 260 and the signal line 296 from the controllable motor 294 are connected to the input/output interface 130. In addition to carrying image data, the signal line 262 may carry a signal from the controller 125 that initiates image acquisition.

One or more display devices 136 (e.g., the display 16 of FIG. 1) and one or more input devices 138 (e.g., the joystick 22, keyboard 24, and mouse 26 of FIG. 1) can also be connected to the input/output interface 130. The display devices 136 and input devices 138 can be used to display a user interface, which may include various user interface features that are usable to perform inspection operations, to create and/or edit (modify) part programs including performing cut and paste operations as part of the program creation and/or editing process, to view the images captured by the camera system 260, and/or to directly control the vision system components portion 200. In particular, according to various exemplary embodiments of the present invention, the display devices 136 and input devices 138 are used to present various user interface features usable to allow rapid, efficient, intuitive, flexible and robust editing of part programs for the machine vision inspection system 100 including performing cut and paste operations.

The workpiece generator and executor 150, recorder translator 155, learn mode executor 156, run mode executor 157, editing portion 160, surrogate data manager 180, program status manager 185, node manager 190, auto scroll manager 195, and a copy and paste manager 169 may in one embodiment all be considered to be part of a general machine controller block MC that is linked to the controller 125. The workpiece program generator and executor 150 is responsible for creating and executing part programs. It will be appreciated that the terms "workpiece program" and "part program" may be used interchangeably herein. Based on the operations of the workpiece program generator and executor 150, a user utilizes the machine vision inspection system 100 to create a part program for the workpiece 20, either by explicitly coding the instructions automatically, semi-automatically, or manually, using a workpiece programming language, and/or by generating the instructions by operating the machine vision inspection system 100 in a learn mode (e.g., as controlled by the learn mode executor 156) to provide a desired image acquisition training sequence. For example, a training sequence may comprise positioning a workpiece feature in the field of view (FOV), setting light levels, focusing or autofocusing, acquiring an image, and providing an inspection training sequence applied to the image (e.g., using video tools). The learn mode operates such that the "learned" operation sequence(s) are recorded and converted to corresponding part program steps (i.e. instructions). These part program steps, when the part program is executed in a run mode (e.g., as controlled by the run mode executor 157), will cause the machine vision inspection system 100 to reproduce the trained image acquisition and inspection operations to automatically inspect a workpiece or workpieces matching the workpiece used when creating the part program.

The recorder translator 155 is utilized for translating machine operations into part program code. In other words, if a user performs an action (e.g., such as manually altering a video tool that is used to measure a feature on a workpiece), a basic instruction is generated that is translated into a machine readable language to form a part program, and a reverse translation may also be performed. As will be described in more detail below, in various embodiments of the present invention, editable instruction representations are displayed on an editing GUI and the instruction representations point to machine readable code instructions written, for example, in a markup type language. The recorder translator 155 may perform translation between the editable instruction representations and their corresponding code instructions. The editing portion 160 provides or activates various operations and user interface features related to editing a part program, as will be described in more detail below in reference to FIG. 2B.

In some embodiments, the surrogate data manager 180 links to surrogate data, which may be recorded in a part program. In certain implementations, the surrogate data manager 180 is responsible for obtaining the surrogate data from an output where it would normally be generated, and providing the surrogate data to be written into the part program. A point in the part program, at which the surrogate data may be made available, can then use the surrogate data to set up a proper operating context for the purpose of editing at that point, as opposed to having to actually run the part program up to that point to collect actual data for the purpose of providing a proper operating context. The program status manager 185, in one embodiment, manages whether programs are protected or unprotected. In one example embodiment, protected programs are programs for which the editing process has been completed, such as may be utilized in a factory in a run mode. In one implementation, an unprotected part program may include stored surrogate data for use in generating the right operating context for editing purposes. The program status manager 185 is also responsible to ensure that, when a part program is unprotected, the surrogate data remains recorded in the part program and when the part program is recalled by the editing portion 160, the surrogate data is indicated as being available.

In one embodiment, the node manager 190 is responsible for managing node numbers that are assigned to nodes in a part program. In one implementation, within a representation of a part program, each of the instruction representations is assigned a node number. In certain implementations, an organizational tree structure may be utilized that includes parent nodes and child nodes. In certain implementations, every line of a part program representation that is generated by the recorder translator 155 is assigned a node number by the node manager 190. The auto scroll manager 195 utilizes the node numbers assigned by the node manager 190 to display related elements of associated part program elements and corresponding editing functions in different windows at the same time. For example, to allow a user to see which measurements of a workpiece are related to which instruction representations and/or coded instructions in a part program, the auto scroll manager 195 may automatically scroll in the respective windows to the relevant lines in the part program representation and/or coded instructions that correspond to the relevant node number.

The copy and paste manager 169 is responsible for creating/generating copy and paste programming element instructions, and the like, which may correspond to the description in the section titled "OUTLINE OF COPY AND PASTE OPERATIONS, FEATURES, AND IMPLEMENTATIONS" above and which may be used to edit/form part of a workpiece program. The copy and paste manager 169 may also provide an editable representation of the copied and pasted elements in the editing interface portion of the GUI. To that end, the copy and paste manager 169 may access and use any of the functions, operations and user interface features provided by the workpiece program generator and executor 150, recorder translator 155, editing portion 160, surrogate data manager 180, program status manager 185, and auto scroll manager 195. Alternative configurations are possible for the copy and paste manager 169. For example, in some embodiments, the copy and paste manager 169 and one or more of the workpiece program generator and executor 150, recorder translator 155, editing portion 160, surrogate data manager 180, program status manager 185, and auto scroll manager 195 may be merged and/or indistinguishable. Generally, the invention may be implemented in any now known or later-developed form that is operable in conjunction with the machine vision inspection system 100 to provide the user interface features and related programming and other operations disclosed herein.

FIG. 2B illustrates additional components of the editing portion 160 of FIG. 2A. As shown in FIG. 2B, the editing portion 160 includes an editing operations controller 174, an editing user interface portion 176, an editor commands portion 177 and an edit execution portion 178. The editing operation controller 174 controls the operations for the editing functions, and the editing user interface portion 176 provides the user interface features for the editing functions. The editing user interface portion 176 includes a program instruction representation window 176pi, which includes representation user interface features 176r, which includes node user interface features 176n. The program instruction representation window 176pi provides a part program representation, including an editable representation of part program instructions, including the source of copied instructions, and pasted instructions generated by the copy and paste manager 169, as described in the section titled "OUTLINE OF COPY AND PASTE OPERATIONS, FEATURES, AND IMPLEMENTATIONS" above and illustrated in FIGS. 3A-19. In one embodiment, the graphical representation of instructions generated by the copy and paste manager 169 may be provided in a tree structure including parent nodes, each including one or more child nodes. The representation user interface features 176r provides features such as various pull down menus for a user to select among multiple editing options, and a tool bar including various video tools that a user can select and open in order to create and edit various instructions, including instructions generated by the copy and paste manager 169, or the like. The node user interface features 176N, in one embodiment, may include features such as icons and color highlights to indicate if a node corresponding to a certain instruction or block of instructions is being edited or has been edited, etc., e.g., as disclosed in the '232 application and the '061 application and FIGS. 3A-19.

In various embodiments, the edit execution portion 178 is responsible for various edit execution modes during an editing process in the learn mode, including an edit mode of execution that is different from a run mode of execution in the run mode. Generally, the run mode of execution executes a part program from the beginning to acquire and process (e.g., inspect and analyze) actual data obtained from imaging a workpiece. On the other hand, the edit mode of execution in various embodiments is operable to substitute at least some of the actual data with "surrogate data" previously recorded, so that the execution may start at any desired point in the part program using the surrogate data, as opposed to having to start from the beginning of the part program in order to acquire actual data. That is, the edit mode of execution in various embodiments is capable of efficiently generating the right operating context necessary for editing any portion of a part program. It should be noted that editing a part program for a machine vision inspection system is a more complex task than editing a program for a machine tool or assembly robot or the like. For example, part programs for machine vision inspection systems include later (subsequent) portions that control operations and/or provide image-dependent measurement results that depend at least partially on the results achieved/obtained by the execution of a previous portion of the program and/or on the particular instance of a workpiece that is being imaged to be analyzed. Note also that the vision system typically consists of various mechanical, electrical and optical elements that interact with each other in a complex manner to carry out imaging/analytical operations. Thus, editing any portion of a part program, including step-and-repeat instructions, must be done in the right operating context based on a realistic set of conditions, i.e., with various hardware and software elements and parameters of the vision system properly set (based on realistic data) for that portion to be edited. A standard practice for achieving the right operating context for editing a part program is to have a vision system actually execute all of the instructions in a part program from the beginning up to and/or including a portion of the instructions to be edited, which is time-consuming, wasteful, and may be even impractical for a large part program. One solution that provides a vision system editing environment capable of generating the right operating context for a particular node of a part program to be edited, based on use of "surrogate data," is disclosed in the '232 application and the '061 application.

In some embodiments, the edit execution portion 178 includes a surrogate mode portion 180, an actual mode portion 191, and an edit execution user interface features portion 192. The surrogate mode portion 180 includes a node analyzer 181, which includes surrogate data operations 181a and machine operations 181b. When the surrogate mode portion 180 operates a surrogate execution mode, surrogate data is utilized for generating operating context for the continuing editing operations. The node analyzer 181 in one implementation determines whether the part program execution has reached a target node (e.g., where a modification is to be made in the part program). The node analyzer 181 determines whether the surrogate data operations 181A or actual machine operations 181B will be performed, in accordance with the type of node that is involved. In general, once the target node is reached, then actual machine operations are performed, whereas for part program instructions prior to the target node, surrogate data operations may be utilized for generating at least some of the operating context that is needed for the continuing editing operations. If surrogate data is missing, a user may be prompted to allow/perform actual machine operations to generate the needed operating context. In one implementation, each node is analyzed to determine if surrogate data operations are applicable, including whether surrogate data exists, if it is the right type of node for surrogate data operations, or whether actual machine operations need to be utilized, etc. For example, some nodes in a part program may require actual machine operations such as actual movement of the workpiece stage, the imaging portion, etc., to acquire actual data, which cannot be substituted with surrogate data.

The actual mode portion 191 includes operations that are more traditionally performed by prior machine vision systems. It will be appreciated that the actual mode portion 191 may also be called by the surrogate mode portion 180 for performing the machine operations 181b, when appropriate. The actual mode portion 191 includes machine operations 191a and data operations 191b. The machine operations 191a perform actual machine operations (e.g., moving the stage as part of a video tool operation), while the data operations 191b generally output data. The edit execution user interface features 192 provide user interface features for the execution of the editing functions (e.g., indications as to the status of various execution operations, such as color codes indicating what portions of a part program have utilized surrogate data, or have been run through an actual execution, etc.) In various embodiments, such features may be implemented as disclosed in the '232 application and the '061 application.

The editor commands 177 include a run segment portion 177a, a modify portion 177b, an insert/append portion 177c, a copy command 177d and a paste command 177e. The copy and paste commands may activate respective operations of the copy and paste manager 169, and/or various copy and paste operations and methods as outlined in the section titled "OUTLINE OF COPY AND PASTE OPERATIONS, FEATURES, AND IMPLEMENTATIONS" above. As discussed above, in various embodiments, the copy and paste manager 169 may access and use any of the functions and features provided by the editing portion 160 including the editing operations controller 174, editing UI portion 176, edit execution portion 178 and editor commands 177.

In general, the run segment portion 177a performs an actual run of a selected segment of the part program. It will be appreciated that in order to run a selected segment of a part program, the proper operating context up to the selected segment must be established. The proper operating context may be established by utilizing surrogate data.

The modify portion 177b has certain similarities to the operation of the run segment portion 177a. In general, when an instruction representation in a part program is selected to be modified (edited), then the surrogate mode may be utilized for the portions of the part program that precede the instruction to be modified so as to generate the right operating context for the editing purposes. In one embodiment, when the modify command is selected for an instruction representation in a part program, the node for the instruction representation is designated as a target node. Once the target node is reached, the editor switches out of the surrogate mode into the actual execution mode (e.g., as controlled by the actual mode portion 191) and executes the first relevant part program instruction of the target node.

Figure 3A:
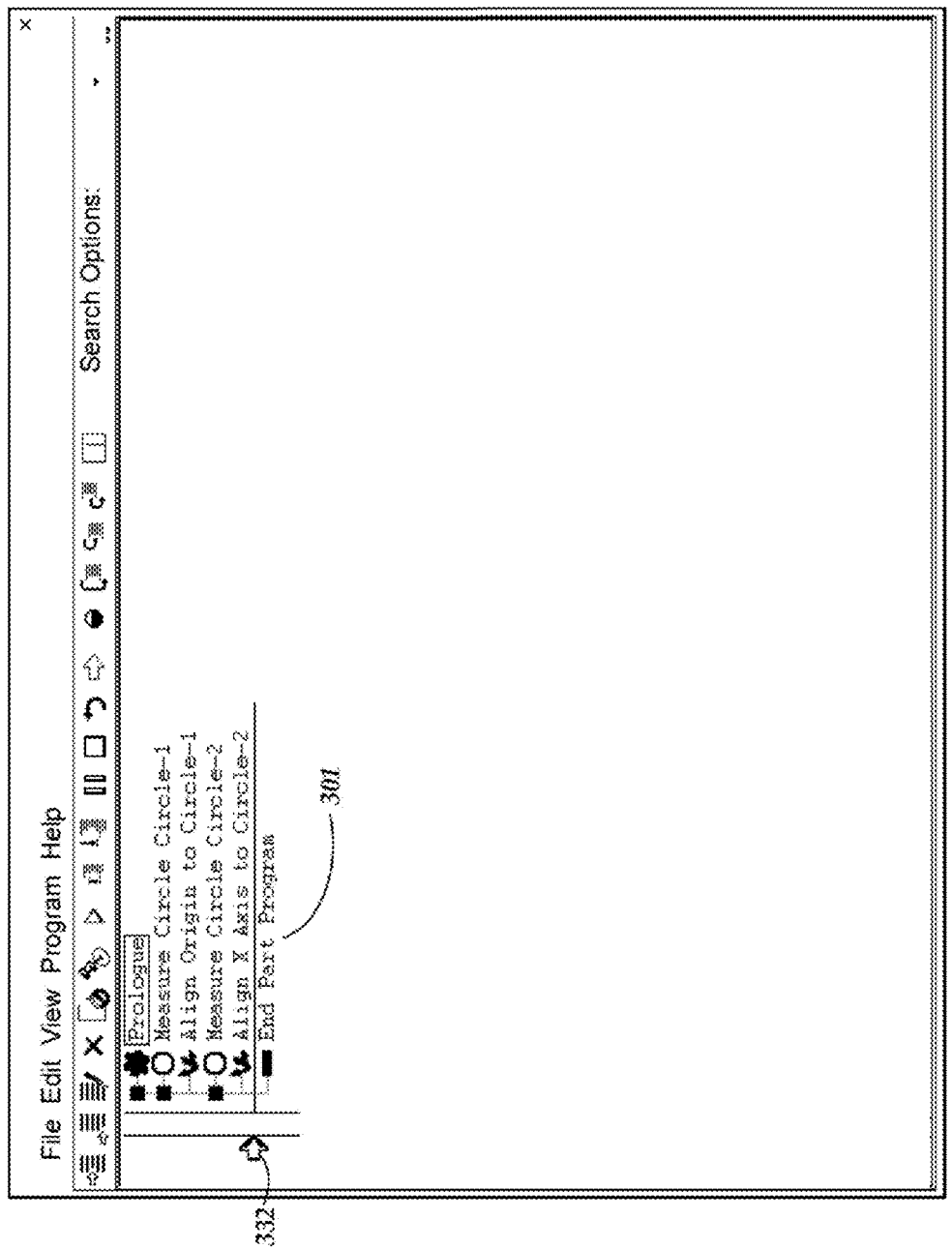
FIGS. 3A-19 are diagrams including an editing interface, or GUI, including a representation of one embodiment of copy and paste operations according to principles disclosed herein, as well as various windows, menus and tool bars configured to assist a user during editing.
Figure 3B:
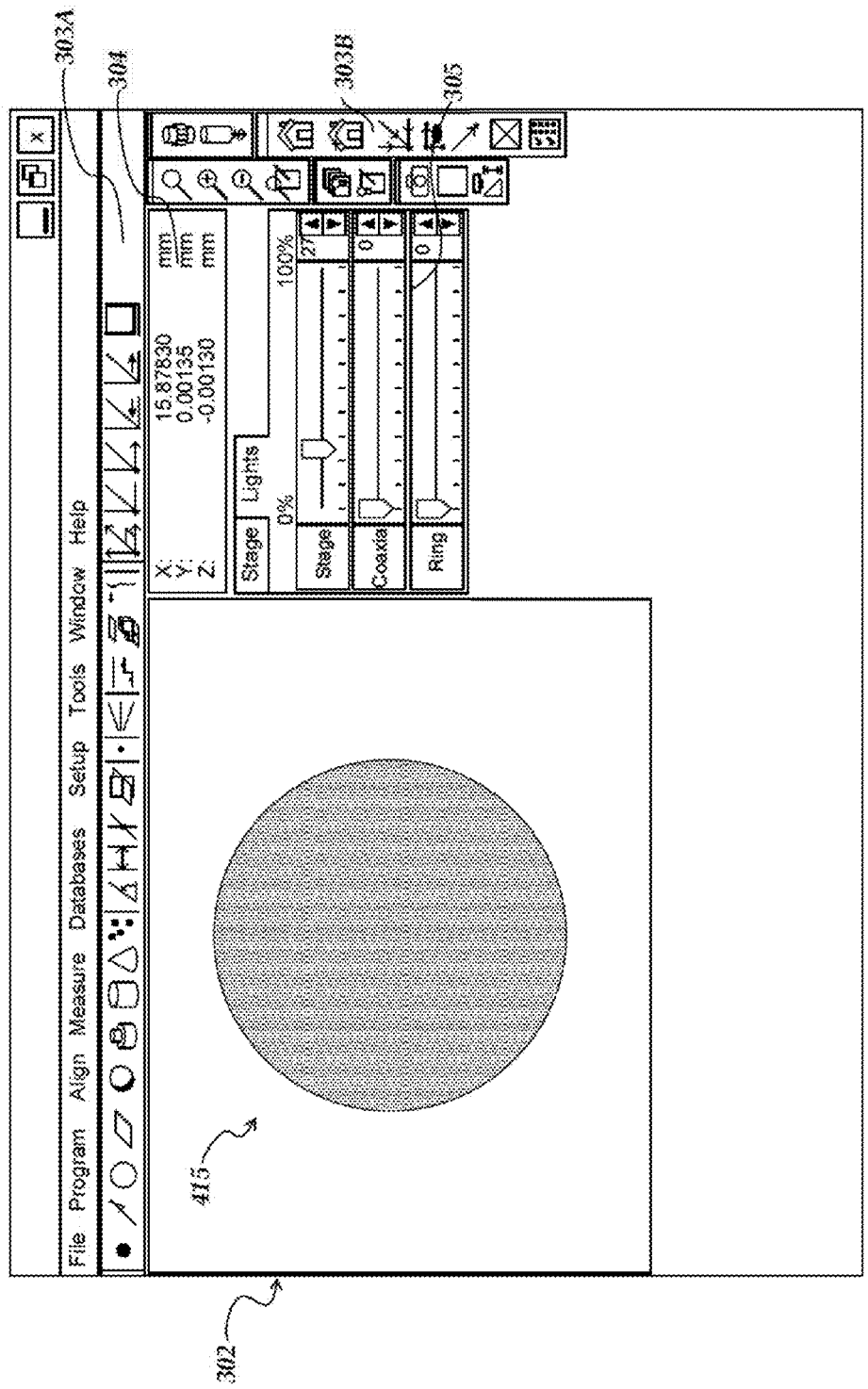

FIGS. 3A and 3B are diagrams of user interface screens including a diagram of an editing interface 301 including a representation of a part program that has a plurality of initial part program instruction representations, which may be displayed on the display device 136 (e.g., the display 16 of FIG. 1). The editing interface permits user generation and editing of a part program including step-and-repeat instructions for a machine vision inspection system. The editing interface also includes various measurement and/or operation selection bars such as the selection bars at the top and sides. FIG. 3B shows an image interface also displayed on the display device 136, including a field of view window 302 that displays a (video) image of a workpiece, on which the part program of FIG. 3A (in the editing interface 301) may be executed. The machine vision system executes a part program on multiple discrete workpieces in some implementations, and on multiple workpiece features in a single workpiece in other implementations, such as multiple holes defined through a surface. Thus, the terms "workpiece" and "workpiece feature" may be used interchangeably herein, in certain contexts. The image interface includes various measurement and/or operation selection bars such as the selection bars 303A, 303B, and a real-time X-Y-Z (position) coordinate window 304 indicating the X-Y-Z position of a workpiece being imaged/analyzed on the workpiece stage in the relevant coordinate system. The coordinate system provides a reference for measurement, and is typically a workpiece coordinate system (e.g., using one corner of a rectangular workpiece as the origin) or a machine coordinate system defined by the linear scales of the workpiece stage. The image interface still further includes a light control window 305.

The part program representation is set up to determine features of a generally circular workpiece feature 415, such as a hole defined through a surface. In one embodiment, each of the part program instruction representations is associated with a node, and is assigned a node number (e.g., as disclosed in the '232 application and the '061 application.) In certain implementations, a tree-structure is utilized, wherein some of the instructions representations are associated with parent nodes, and some are associated with child nodes. For example, the children node instruction representations are respectively associated with their parent node instruction representations of FIGS. 3A-19. As used herein, each of the program instruction representation as displayed on the editing interface 301 (FIG. 3A) may be interchangeably referred to as a "node." It will also be appreciated that, in one embodiment, the instruction representations as displayed on the editing interface comprise icons and labels derived from the markup language instructions (code instructions) of the part program. In some embodiments, the markup language of the part program may comprise XML-like code such as a customized markup language code. The instruction representations thus "point to" or have and association with associated code instructions that are machine-executable.

As shown in the editing interface 301 of FIG. 3A, a "Prologue" node represents a process needed to run a part program in the run mode, which is typically generated when the learn mode is entered. The "Prologue" node is a parent node, which may include child nodes: e.g., a "Set Lights" node and a "Move Stage" node. The "Set Lights" node defines what type of lighting is used at what intensity level, which a user can readily set and adjust using the sliding bars included in the light control window 305. The "Move Stage" node defines the position of the stage that holds the workpiece, as manually set by the user according to various implementations. In FIG. 1, the subsequent instructions/representations ("Measure Circle Circle-1" "Align Origin to Circle-1" "Measure Circle Circle-2" and "Align X axis to Circle-2") operate to set the workpiece coordinate system by aligning the coordinate system with the measured features of the circular feature 415 of FIG. 3B. The operations of the instruction representations therefore establish the correct location and orientation of the workpiece in the relevant coordinate system for performing additional measurements. FIG. 3A also shows an instruction pointer 332. In various embodiments the instruction pointer 332 may change color depending on an editing context status corresponding to its location in the displayed part program representation. That is, the color of the instruction pointer may indicate whether a valid or questionable (or invalid) editing context (e.g. a valid and complete execution or simulation of the part program operation) has established all the expected data and operating conditions up to the location in the part program. As described in further below, in various embodiments, it may be advantageous in relation to elements newly pasted as disclosed herein, if the editing context status indicator conservatively automatically indicates that newly pasted elements (e.g. a modified selected instruction representation copy set) corresponds to an editing context status similar to that of newly created or inserted new instructions, despite being copied from a copy location where the original copy set corresponded to a valid editing context status. In some cases, the instruction pointer may be referred to as an insertion pointer. However, in various embodiments, insertions and copy and paste locations and the like are determined in relation to selected and/or highlighted instruction representations, which need not be at the same location as the instruction pointer.

Figure 4:
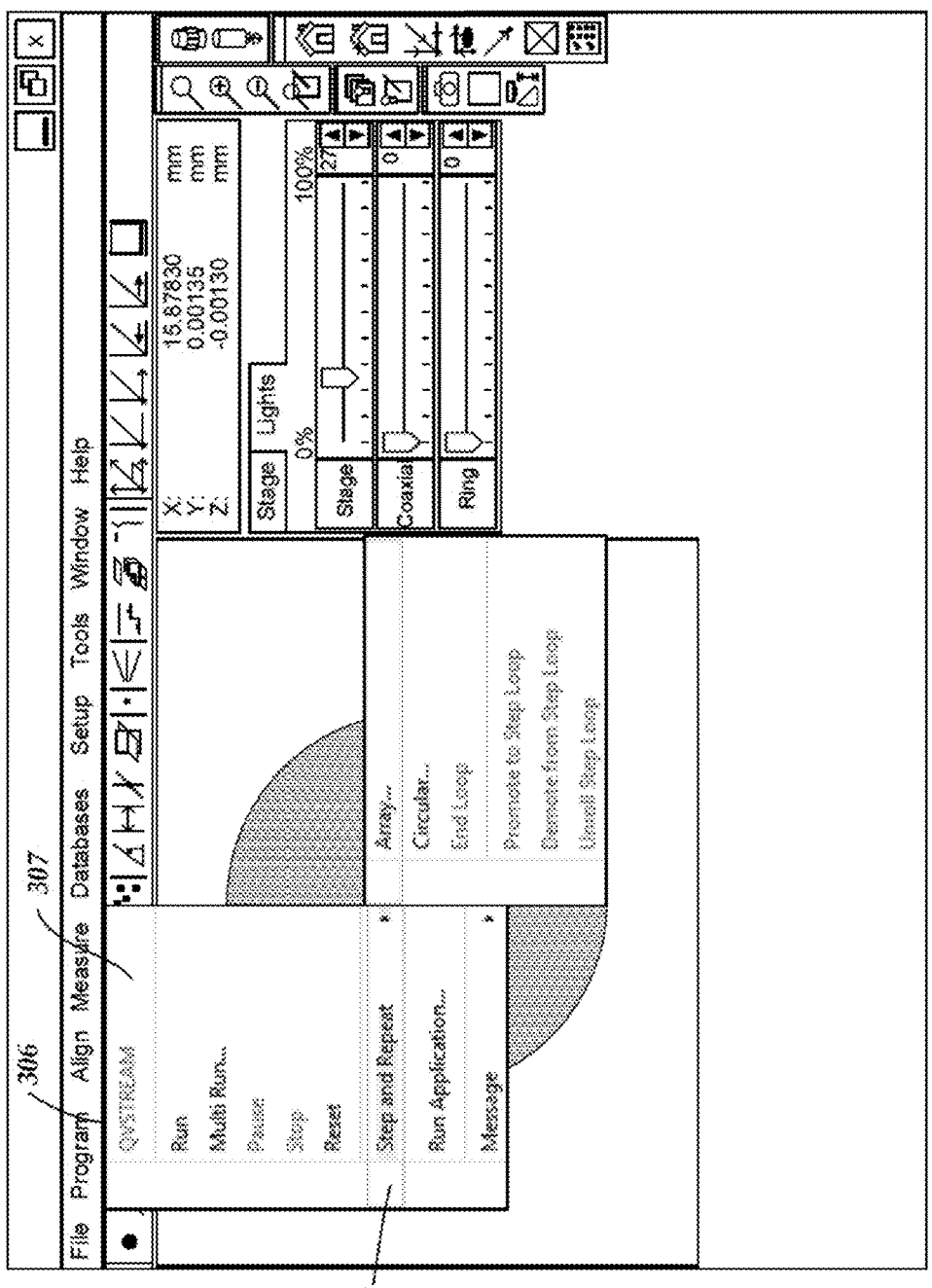

Referring to FIG. 4, a user may define step-and-repeat instructions using various GUI features according to embodiments of the present invention. Specifically, when a user places a selector (e.g., cursor) over a "Program" option 306, a pull down menu 307 may appear, which includes a "Step and Repeat" option 308. User selection of the "Step and Repeat" option displays another pull down menu, which includes an "Array" option. The user may select the "Array" option to start defining the instructions of a step-and-repeat programming element, e.g., as disclosed in U.S. Pat. No. 8,271,895, which is hereby incorporated herein by reference in its entirety.

Figure 5:
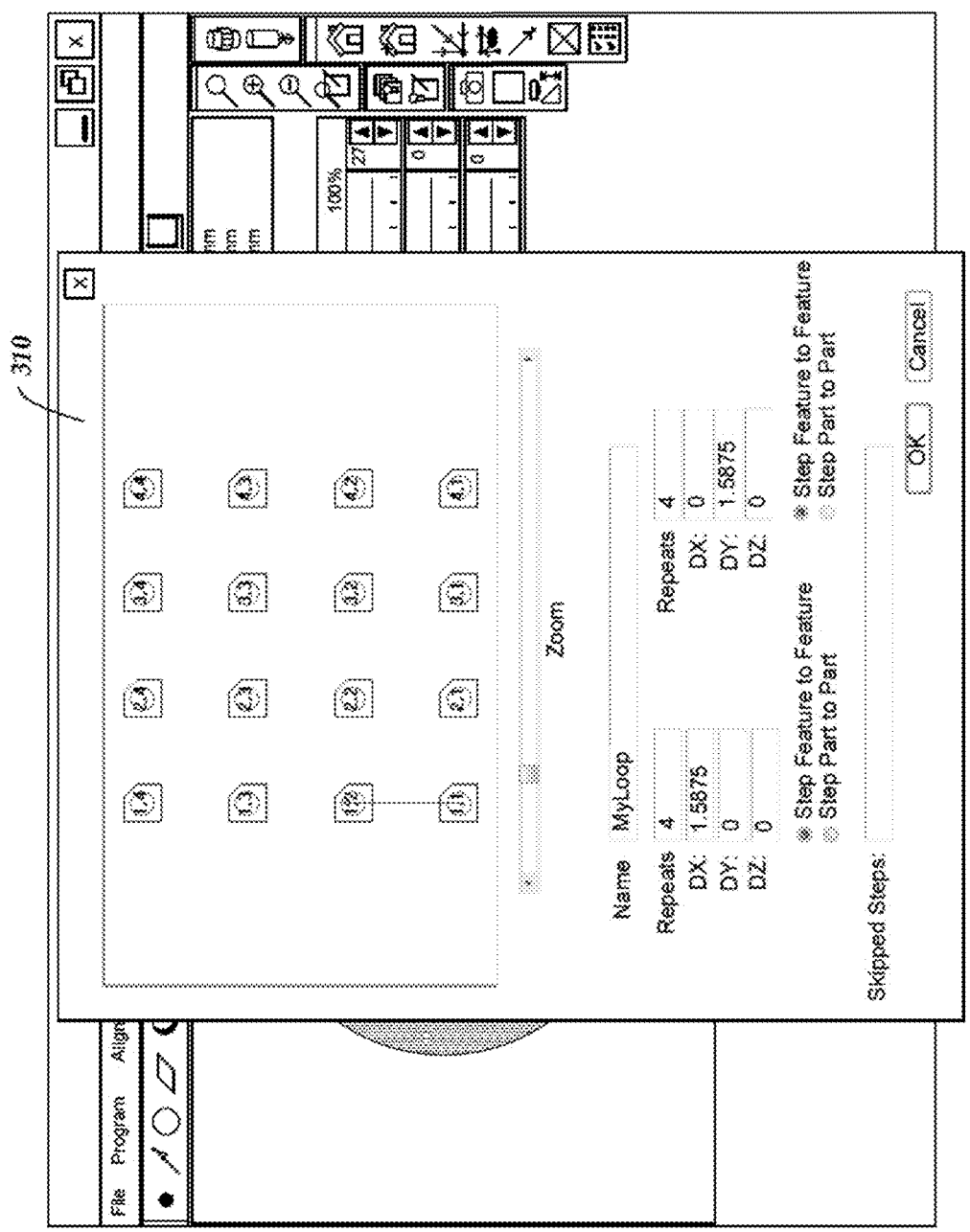

Referring to FIG. 5, in the illustrated embodiment, upon user selection of the "Array" option as described above, an "Array Step and Repeat" window 310 may appear on the display screen, to prompt the user to define the overall arrangement and structure of an array. In some embodiments, the user may enter the name of the array in a name box, in which the user has entered "MyLoop" in the illustrated example. The user further defines the number of repeats to be made along one axis (e.g., X axis) in a first repeats box, and defines the interval distance between the repeats along the same axis in a "DX" box. Similarly, the user defines the number of repeats to be made along another axis (e.g., Y axis) in a second repeats box, and defines the interval distance between the repeats along that axis in a "DY" box. In the illustrated example, the user has defined that a basic set of step-and-repeat instructions is to be repeated 4 times along the X axis with the interval of 1.5875 and to be repeated 4 times along the Y axis with the interval of 1.5875, as graphically represented by icons that are respectively numbered [X,Y]. When the user finishes defining the locations of the array, the user selects an OK button to save the defined locations.

Figure 6:
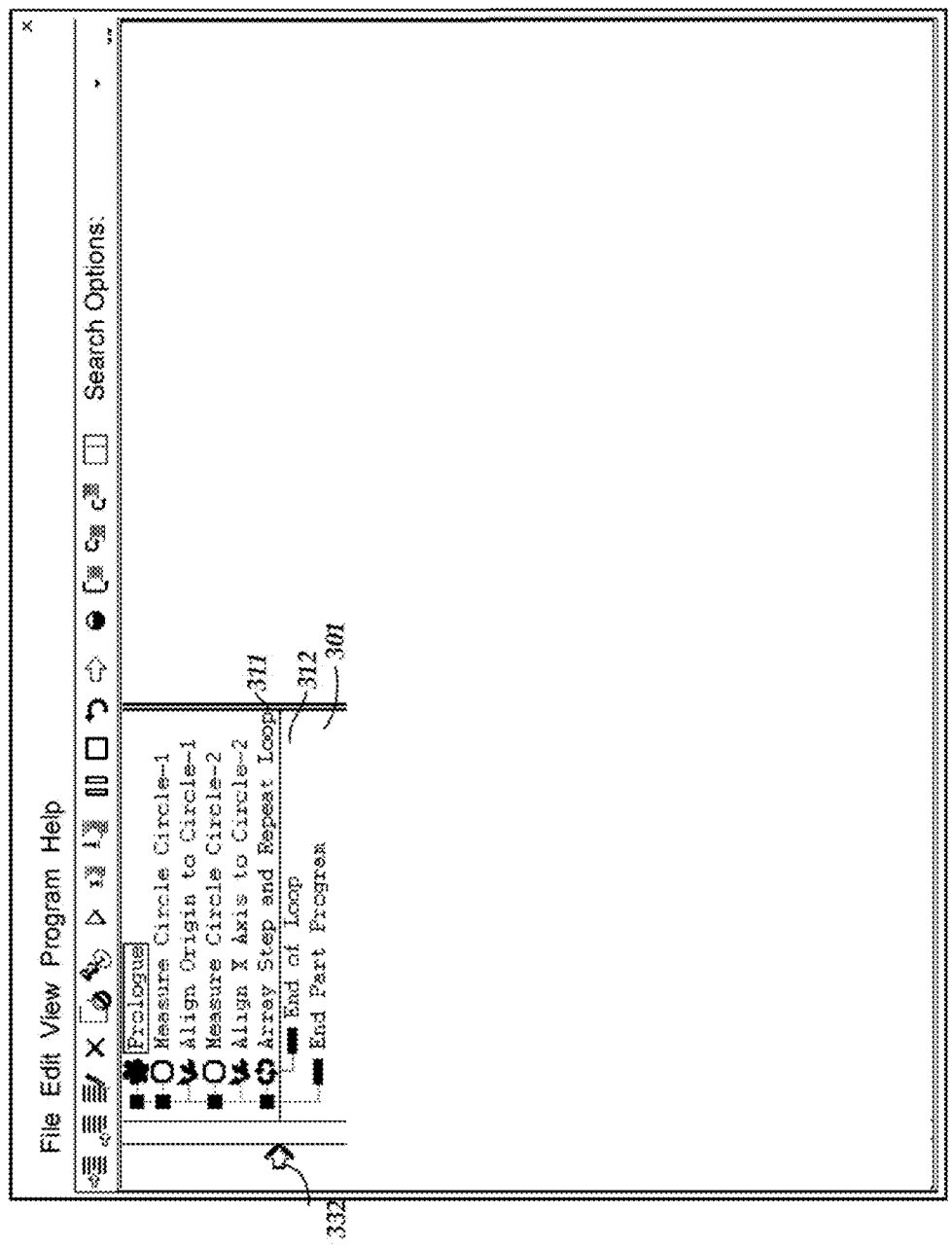

FIG. 6 shows the editing interface 301 including the part program instruction representation associated with the previously outlined array step and repeat loop operations. The part program instruction representation now includes an "Array step and Repeat Loop" node 311 including an "End of Loop" child node 312.

Figure 7A:
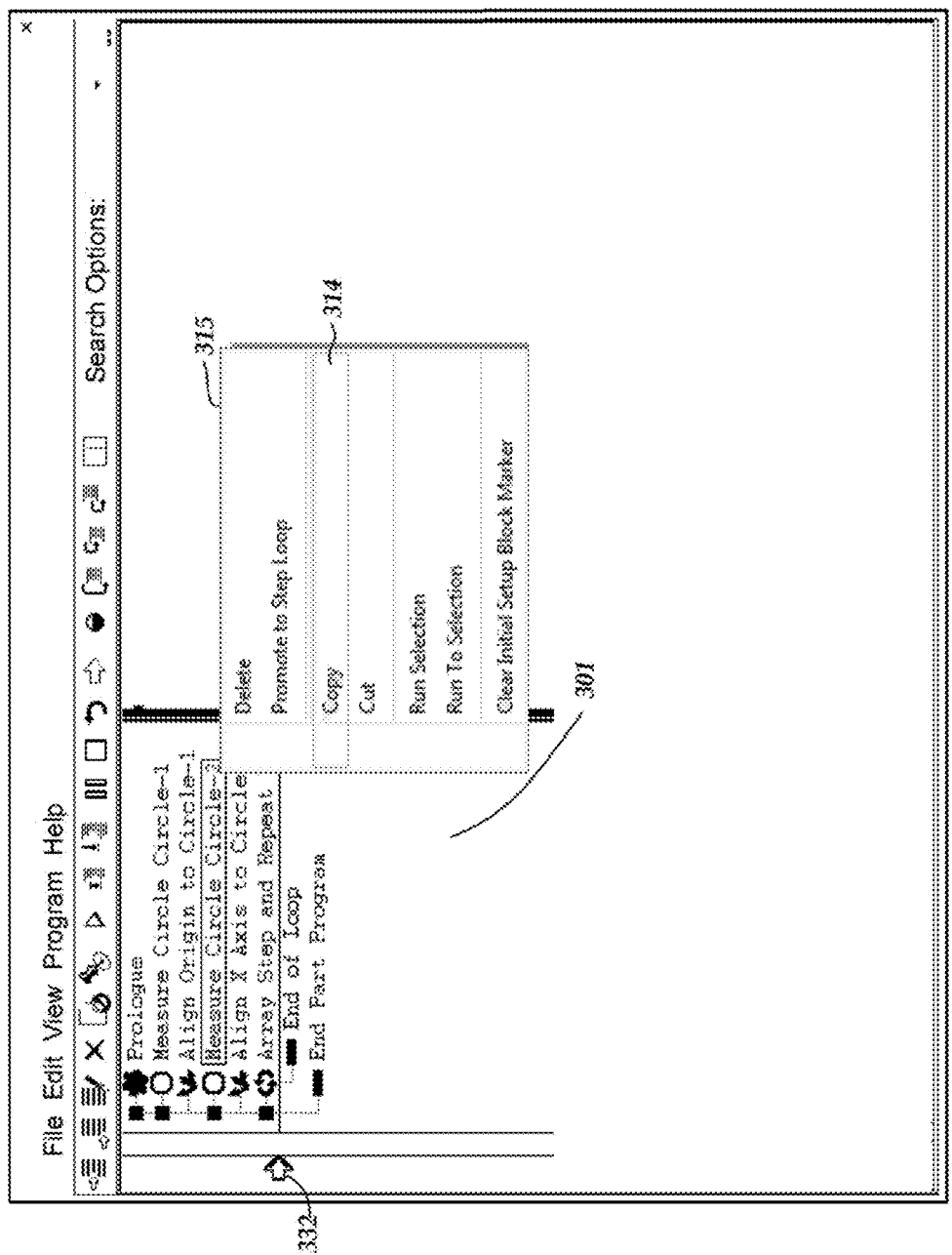

FIG. 7A shows the editing interface 301 including the part program instruction representation associated with one embodiment of a COPY command 314 that performs operations as outlined in the section titled "OUTLINE OF COPY AND PASTE OPERATIONS, FEATURES, AND IMPLEMENTATIONS" above. For example, the COPY command 314 may be used in connection with the following non-limiting examples of operations:

selecting at least a first instruction representation at a copy location in the displayed part program representation to define a selected instruction representation copy set associated with an underlying selected instruction copy set;

operating the GUI to initiate copy operations that create a copy of at least one of the selected instruction representation copy set and the underlying selected instruction copy set (e.g., by activating a copy command widget 314 directed to the selected instruction representation copy set); and automatically performing copy operations to perform a first subset of the copy set modification operations directed to at least one of the selected instruction representation copy set and the selected instruction copy set (e.g., the first subset of the copy set modification operations may be directed to elements that are specific to the operating context at the copy location, which may comprise for example, eliminating associated surrogate data and/or its association with the copy set(s), and/or providing a new or altered unique node identifier, feature name, tolerance name, part coordinate system name, measurement point buffer name, displayed variable name, or the like). The partially modified copy set(s) may be stored on a clipboard.

In the illustrated example, the user has selected the "Measure Circle Circle-2" representation.

Figure 7B:
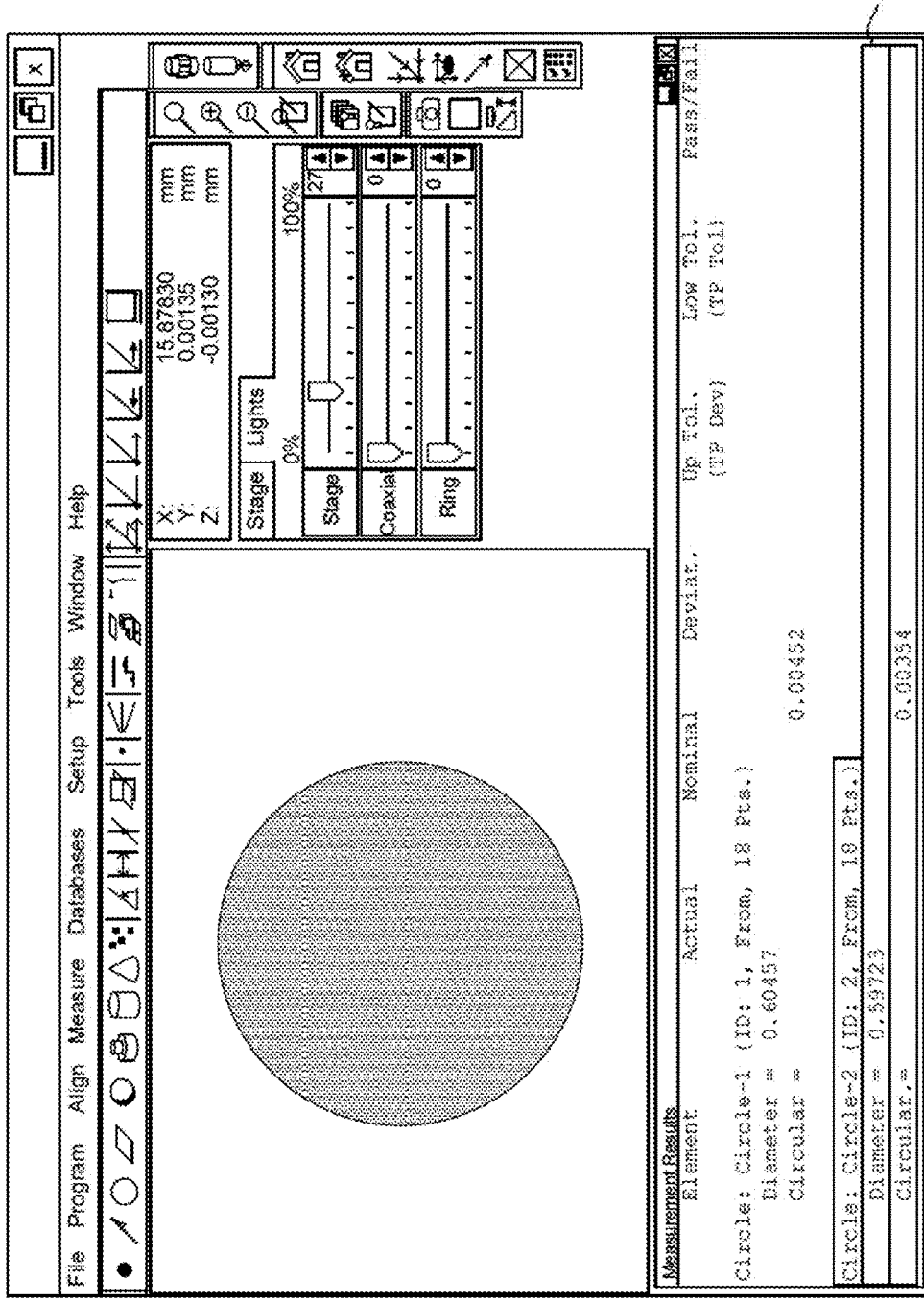
Figure 8:
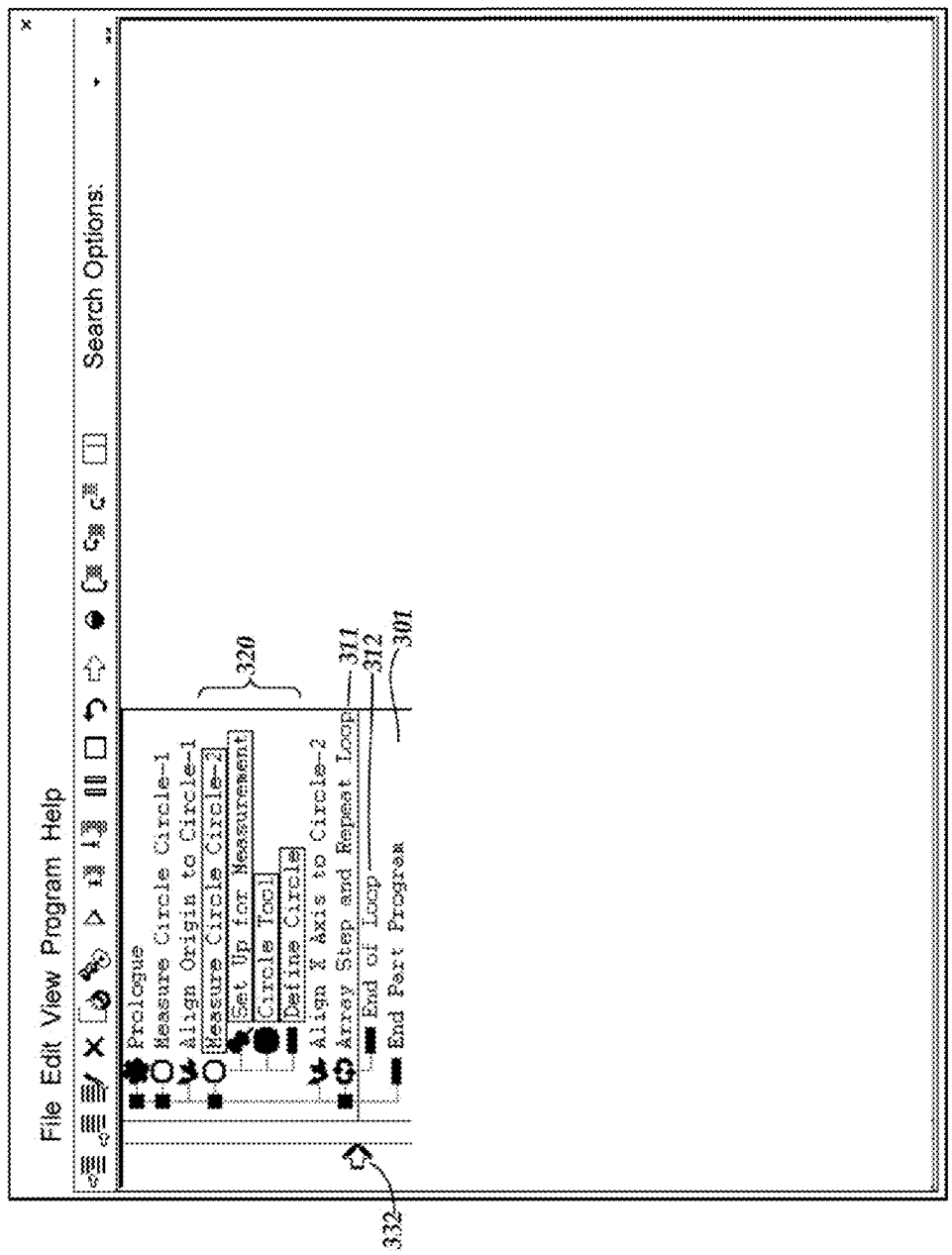

FIG. 7B shows the interface status for a window or pane including "Measurement Results" 316 synchronized with FIG. 7A, wherein the measurement results 318 corresponding to the selected (copied) "Measure Circle Circle-2" are highlighted, as disclosed in the '061 application. In one embodiment, when a representation is displayed in the editing interface portion of the GUI, the user may select that representation (e.g., placing a cursor over it on the editing interface), and/or right click on the selected representation, and a menu window 315 may appear including various options/selections directed to the selected representation, such as an "COPY" command option 314, which is one embodiment of a copy command including various operations as disclosed herein. When the user selects and/or executes the "Copy" command option 314, the copy and paste manager 169 in the control system portion 120 (see FIG. 2A) executes operations of that command as outlined in the section titled "OUTLINE OF COPY AND PASTE OPERATIONS, FEATURES, AND IMPLEMENTATIONS" above. In various embodiments, the copy and paste manager 169 also executes operations of that command that automatically perform element deletion and/or modification as outlined in the section titled "OUTLINE OF COPY AND PASTE OPERATIONS, FEATURES, AND IMPLEMENTATIONS", to eliminate elements that are specific to the operating context at the location of the selected and copied representations. In various embodiments, the copy and paste manager 169 executes operations of that command that eliminate surrogate date copy of instructions that underlie the selected and copied representations, and that are placed on a clipboard for pasting at a later time. In various embodiments, the COPY command 314 automatically expands a collapsed parent node in a copied representation to show its child nodes, as shown in FIG. 8, where all of the 3 child nodes of the selected "Measure Circle Circle-2" node are displayed, as indicated in 320. FIG. 8 also shows the highlighting of the copied and expanded nodes.

Figure 9:
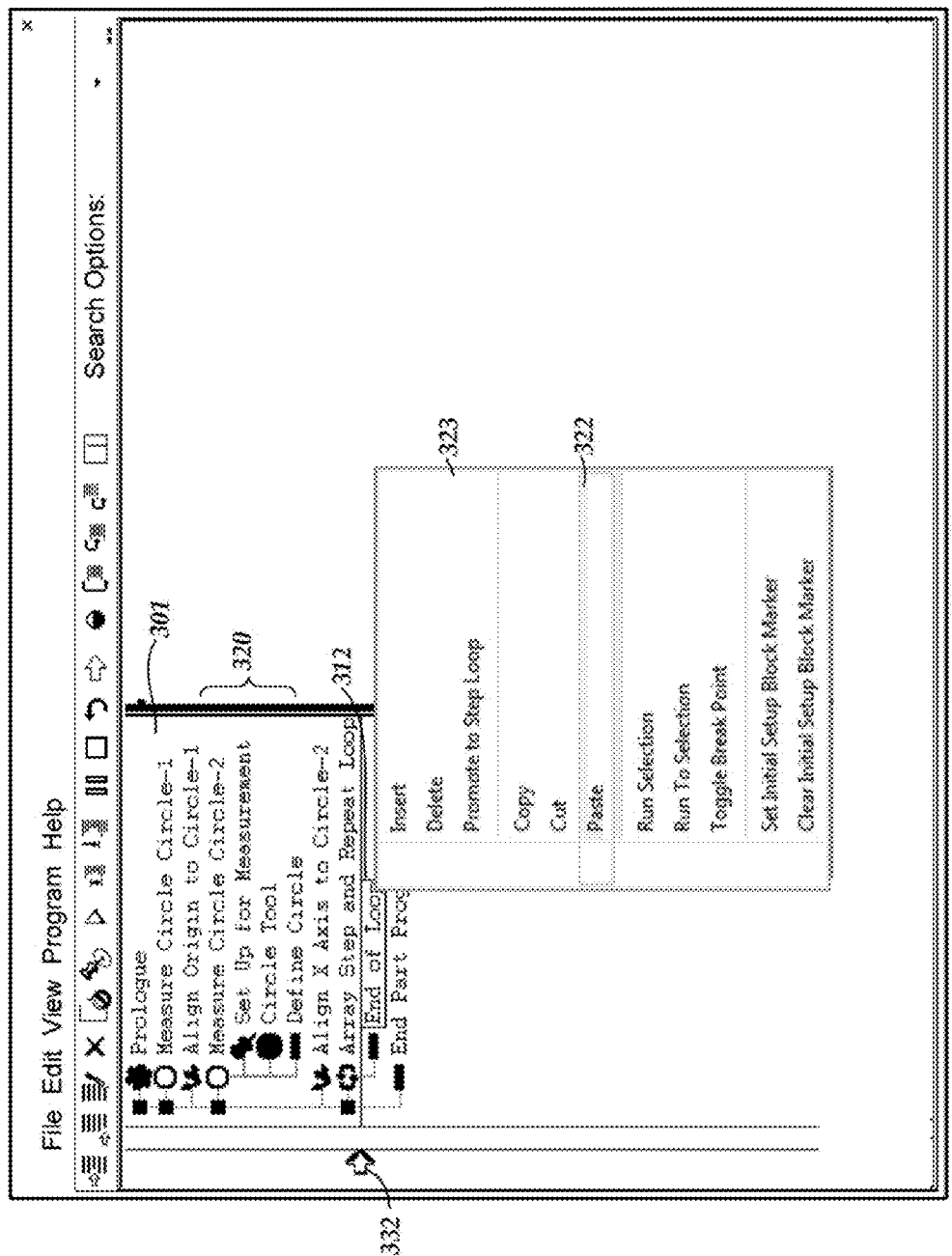

FIG. 9 shows the editing interface 301 including the part program instruction representation associated with one embodiment of a PASTE command 322 that performs operations as outlined in the section titled "OUTLINE OF COPY AND PASTE OPERATIONS, FEATURES, AND IMPLEMENTATIONS" above. For example, the PASTE command 322 may be used in connection with the following non-limiting examples of operations:

defining a paste location in the displayed part program representation where the selected instruction representation set is to be pasted, the paste location associated with an instruction paste location in the underlying part program;

operating the GUI to initiate paste operations directed to at least one of the partially modified counterparts of the selected instruction representation copy set and the underlying selected instruction copy set (e.g., by activating a paste command widget 322 directed to the paste location);

automatically performing paste operations to perform a second subset of the copy set modification operations directed to the partially modified counterparts of at least one of the selected instruction representation copy set and the selected instruction copy set. For example, the second subset of the copy set modification operations may be directed to elements that are specific to the operating context at the paste location, including at least one of: a) modifying elements and associations of the selected instruction representation copy set that are incompatible with the paste location operating context, b) adding elements and associations to the selected instruction representation copy set that are required for compatibility with the paste location operating context (e.g., a or b may provide a new or altered feature names or the like, in the proper format, and so on,) and c) forming the modified selected instruction representation copy set based on a modified selected instruction copy set formed by operations comprising at least one of c1) modifying elements and associations of the selected instruction copy set that are incompatible with the instruction paste location operating context, and c2) adding elements and associations to the selected instruction copy set that are required for compatibility with the instruction paste location operating context. The partially modified copy set(s) may be automatically retrieved from the clipboard and the second subset of the copy set modification operations performed to create a (fully) modified selected instruction representation copy set and/or (fully) modified selected instruction copy set; and automatically performing paste operations that paste the modified selected instruction representation copy set at the paste location in the part program representation, and/or paste the modified selected instruction representation copy set at the instruction paste location in the underlying part program.

Figure 10:
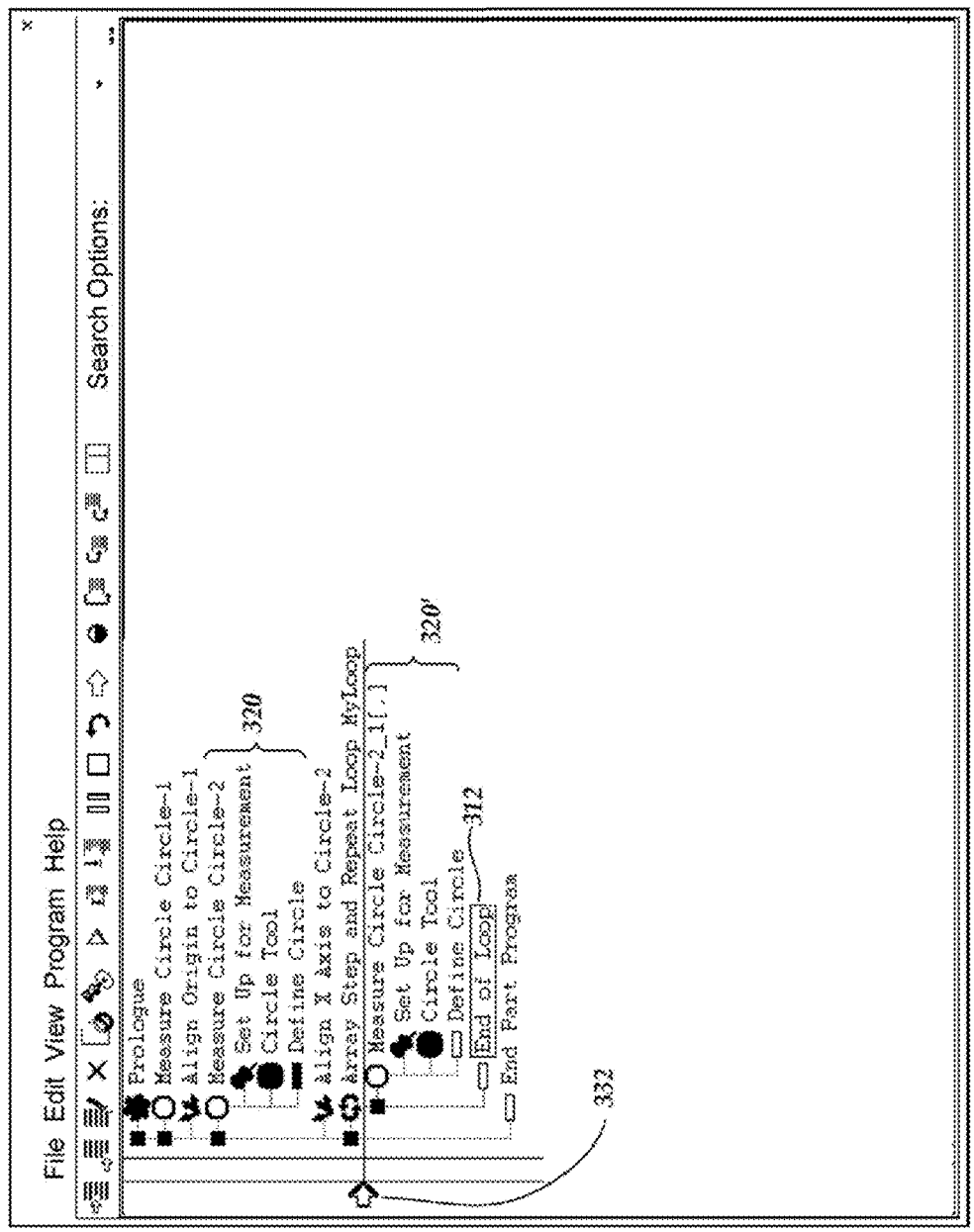

In the illustrated example of FIG. 9, the user has positioned the cursor/insertion pointer under (inside) the Array Step and Repeat Loop representation (on the "End of Loop" node 312 in the illustrated example). In one embodiment, the user may then right click, and a menu window 323 may appear including various options/selections directed to the selected location, such as the "PASTE" command option 322, which is one embodiment of a paste command including various operations as disclosed herein. When the user selects and/or executes the "Paste" command option 322, the copy and paste manager 169 in the control system portion 120 (see FIG. 2A) executes operations of that command as outlined in the section titled "OUTLINE OF COPY AND PASTE OPERATIONS, FEATURES, AND IMPLEMENTATIONS." In various embodiments, the copy and paste manager 169 also executes operations of that command that automatically perform element addition and/or modification as outlined in the section titled "OUTLINE OF COPY AND PASTE OPERATIONS, FEATURES, AND IMPLEMENTATIONS" to provide elements that are required for the operating context at the location of the pasted representations. In various embodiments, the copy and paste manager 169 executes operations of that command that automatically expands the pasted representation to show its child nodes, as shown in FIG. 10, where the copied and pasted "Measure Circle Circle-2" node 320' is expanded to show all of its 3 child nodes. FIG. 10 also shows that the copy and/or paste operations include operations such that feature name in the pasted representation has been modified to distinguish it from the feature in the copied source representation and also to make the paste elements compatible with the paste location. In the example, the added brackets [,] in the feature name "Measure Circle Circle-2_1 [,]" in 320' indicate/make it compatible with its operating context in the step and repeat loop where it has been pasted, and the "_1" (underscore 1) in the feature name distinguishes it from the copied source feature in 320.

Figure 11:
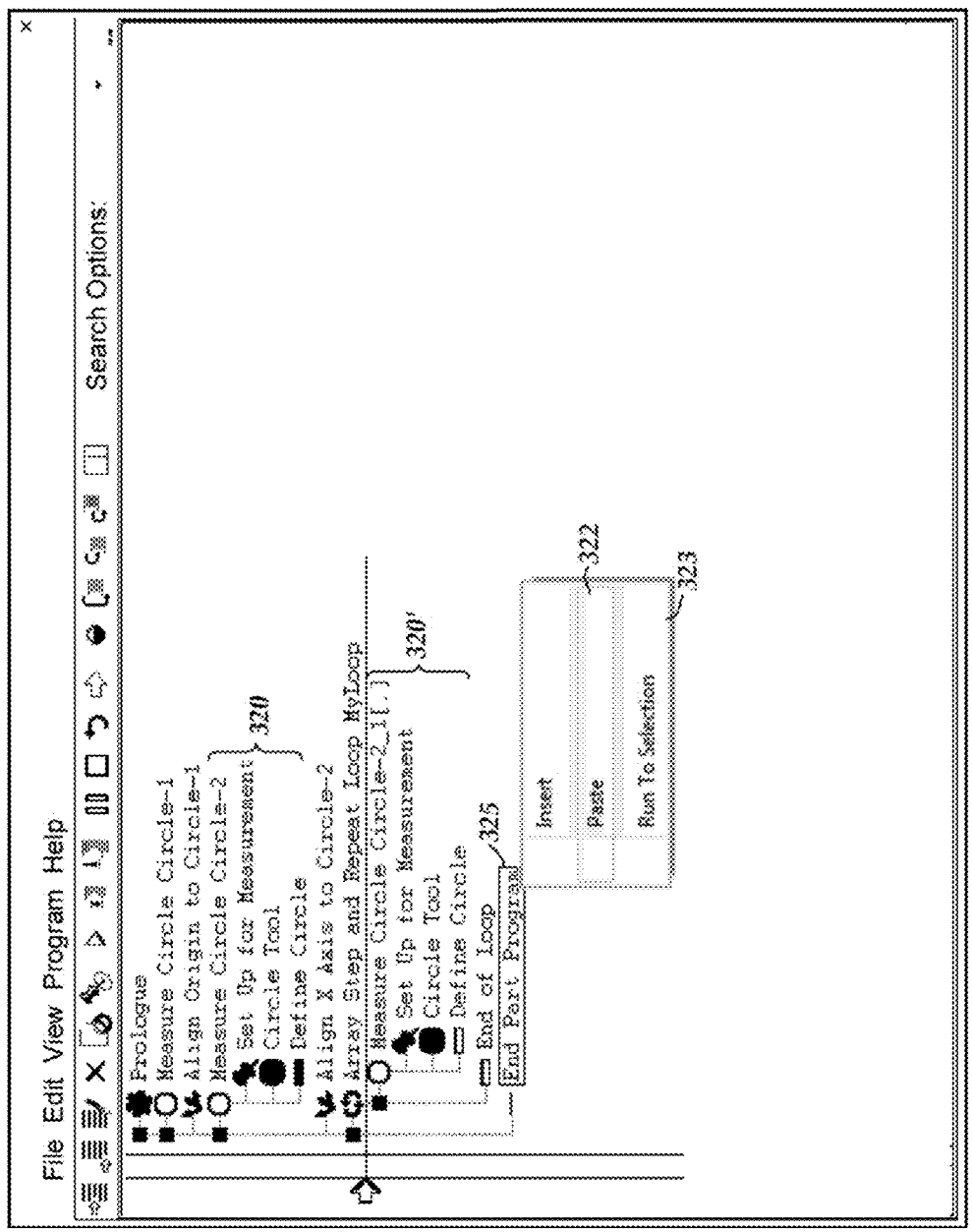
Figure 12:
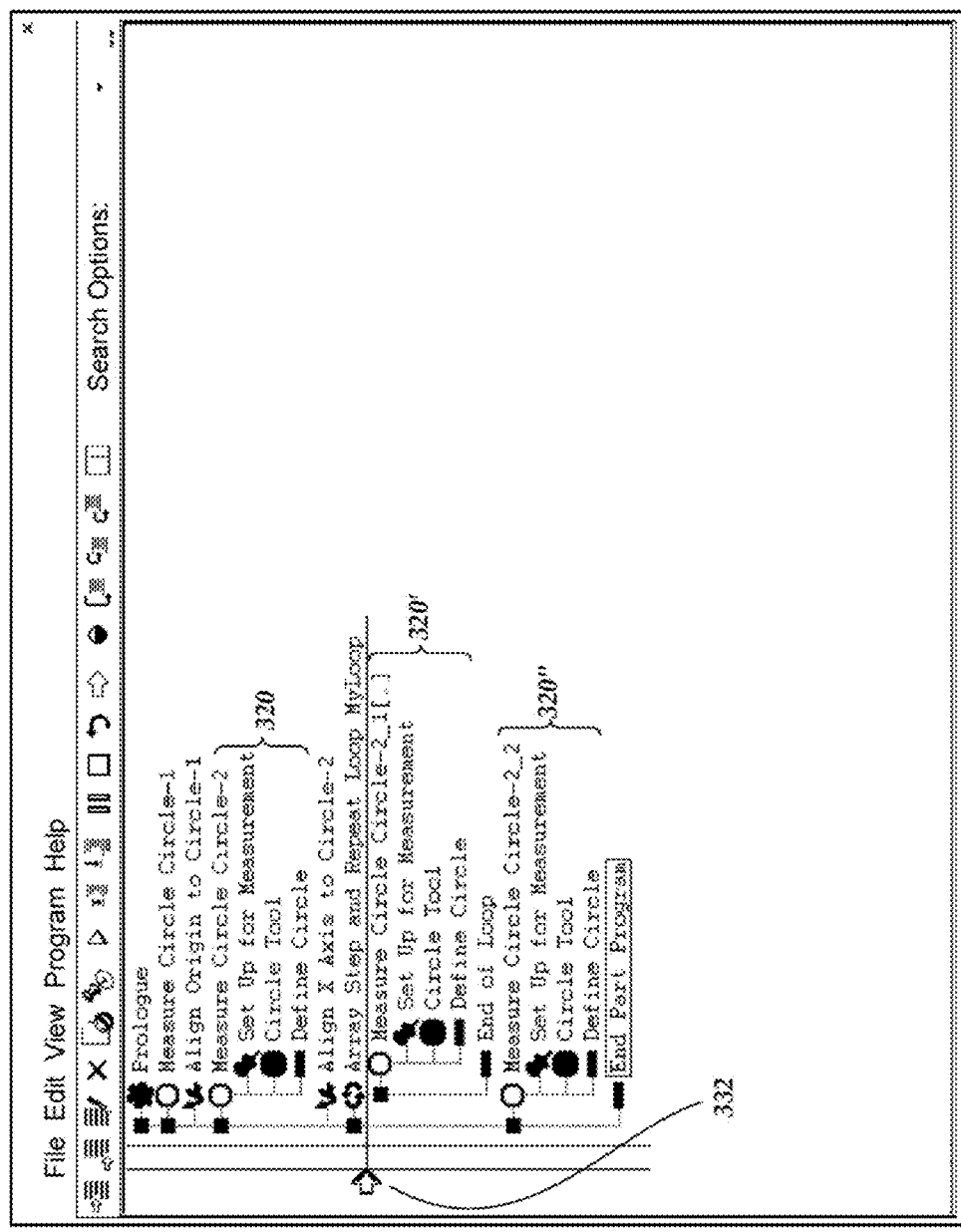

FIG. 11 shows that the user has elected to initiate another paste operation of the copied elements, but this time outside of the step and repeat loop (e.g., the "End Part Program" representation 325 has been selected, and the paste operation will occur preceding that selected node, which is below the "End of Loop" representation). As before, in one embodiment, the user may right click after the selection of the insertion point, and a menu window 323 may appear including various options/selections directed to the selected location, such as the "PASTE" command option 322. When the user selects and/or executes the "Paste" command option, the copy and paste manager 169 in the control system portion 120 (see FIG. 2A) executes operations of that command as outlined in the section titled "OUTLINE OF COPY AND PASTE OPERATIONS, FEATURES, AND IMPLEMENTATIONS." In various embodiments, the copy and paste manager 169 also executes operations of that command that automatically perform element addition and/or modification as outlined in the section titled "OUTLINE OF COPY AND PASTE OPERATIONS, FEATURES, AND IMPLEMENTATIONS" to provide elements that are specific to the operating context at the location of the pasted representations. In various embodiments, the copy and paste manager 169 executes operations of that command that automatically expands the pasted representation to show its child nodes, as shown in FIG. 12, where a second instance of the copied and pasted "Measure Circle Circle-2" node 320" is expanded to show all of its 3 child nodes. FIG. 12 also shows that the copy and/or paste operations include operations such that feature name in the pasted representation has been modified to distinguish it from the feature in the copied source representation 320, as well as the previously pasted instance of the copied elements that include a similar feature name 320', and also to make the paste elements compatible with the paste location. In the example, there are no added brackets in the feature name "Measure Circle Circle-2_2" in 320", which is different than the previously pasted instance of the copied elements 320', because brackets [,] would be incompatible with a operating context outside of a step and repeat loop (e.g., where it has been previously pasted). Also, the "_2" (underscore 2) in the feature name 320" distinguishes it from the copied source feature name 320, and the feature name 320' in the previously pasted instance of the copied elements.

Figure 13A:
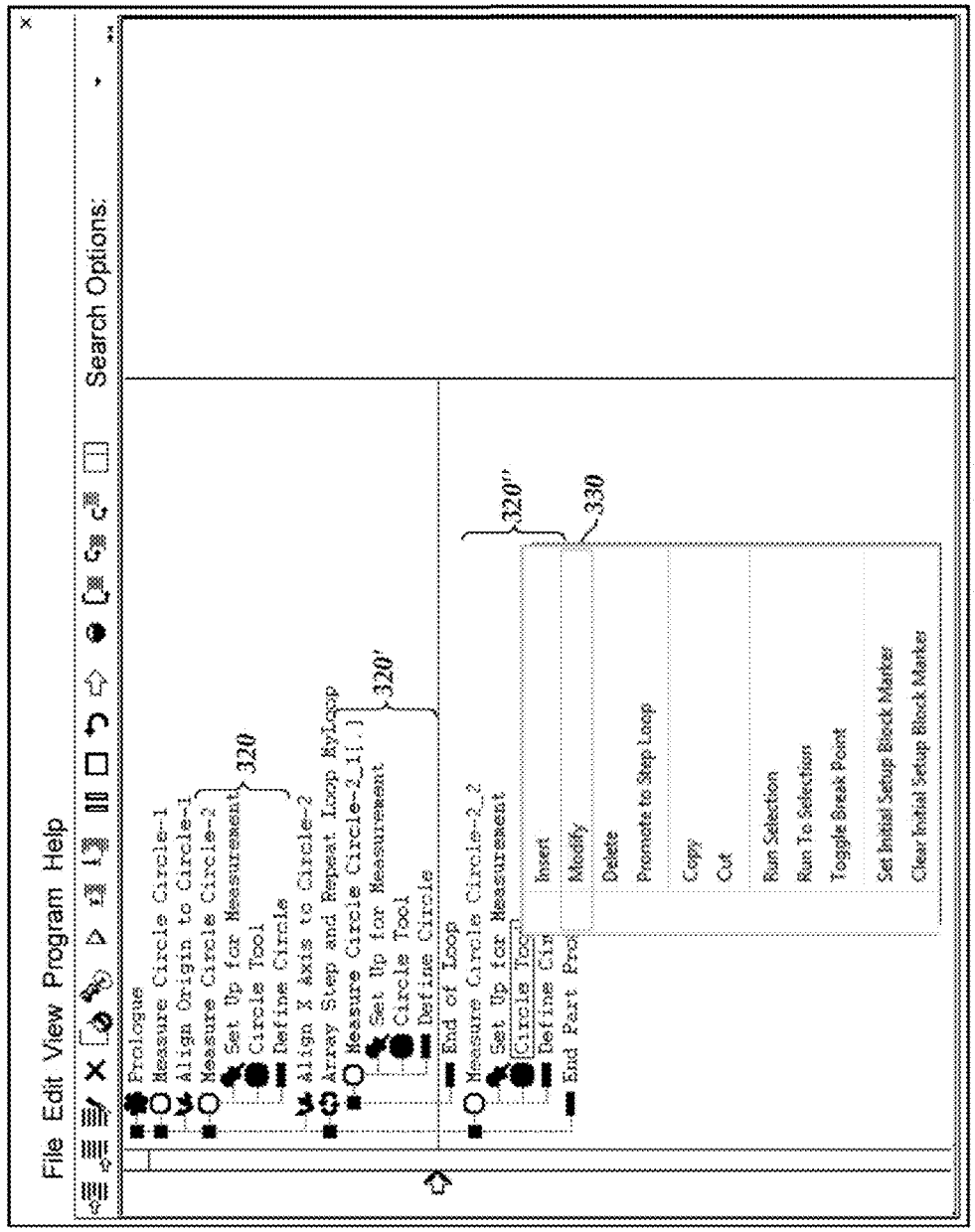
Figure 17:
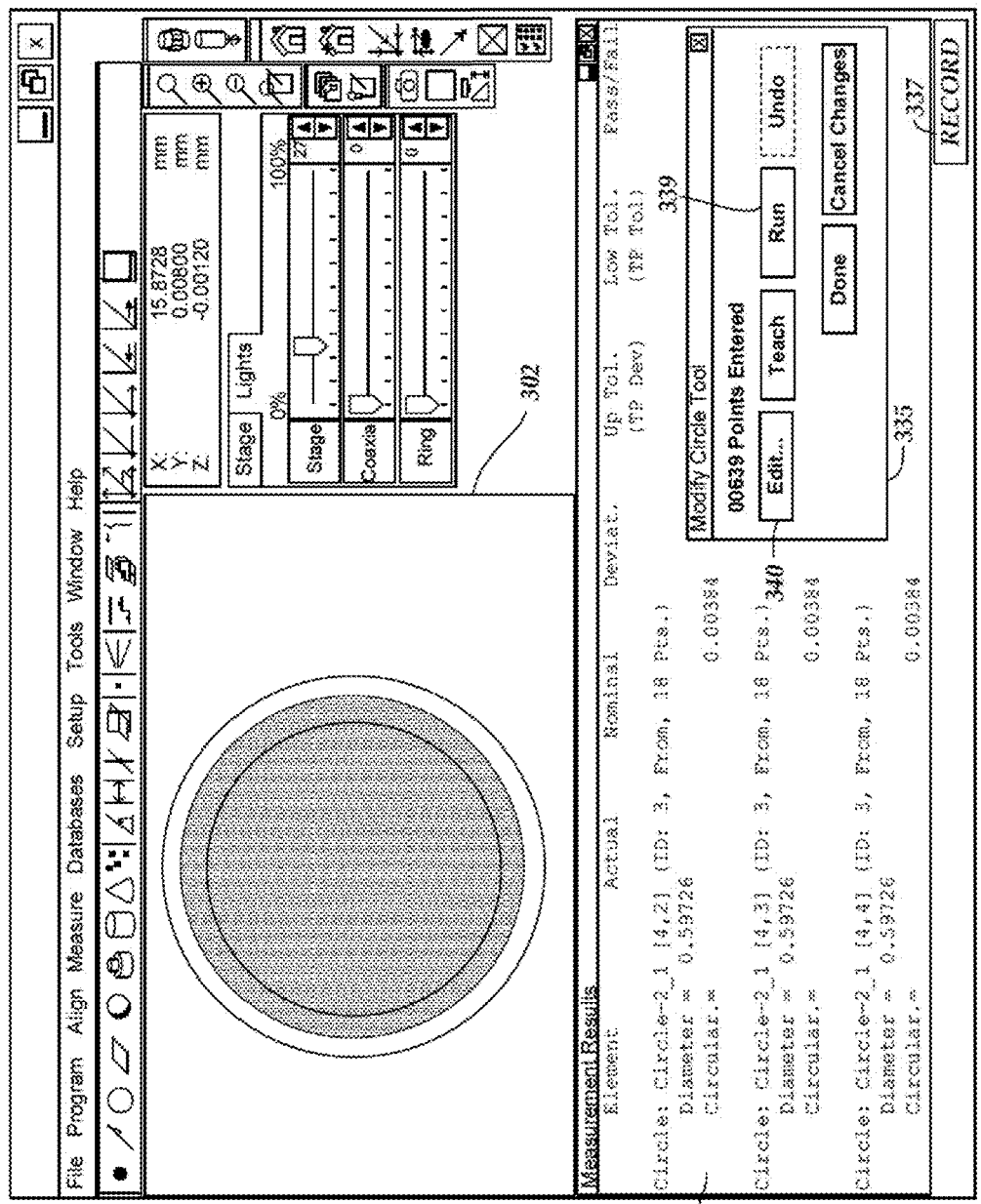
Figure 18:
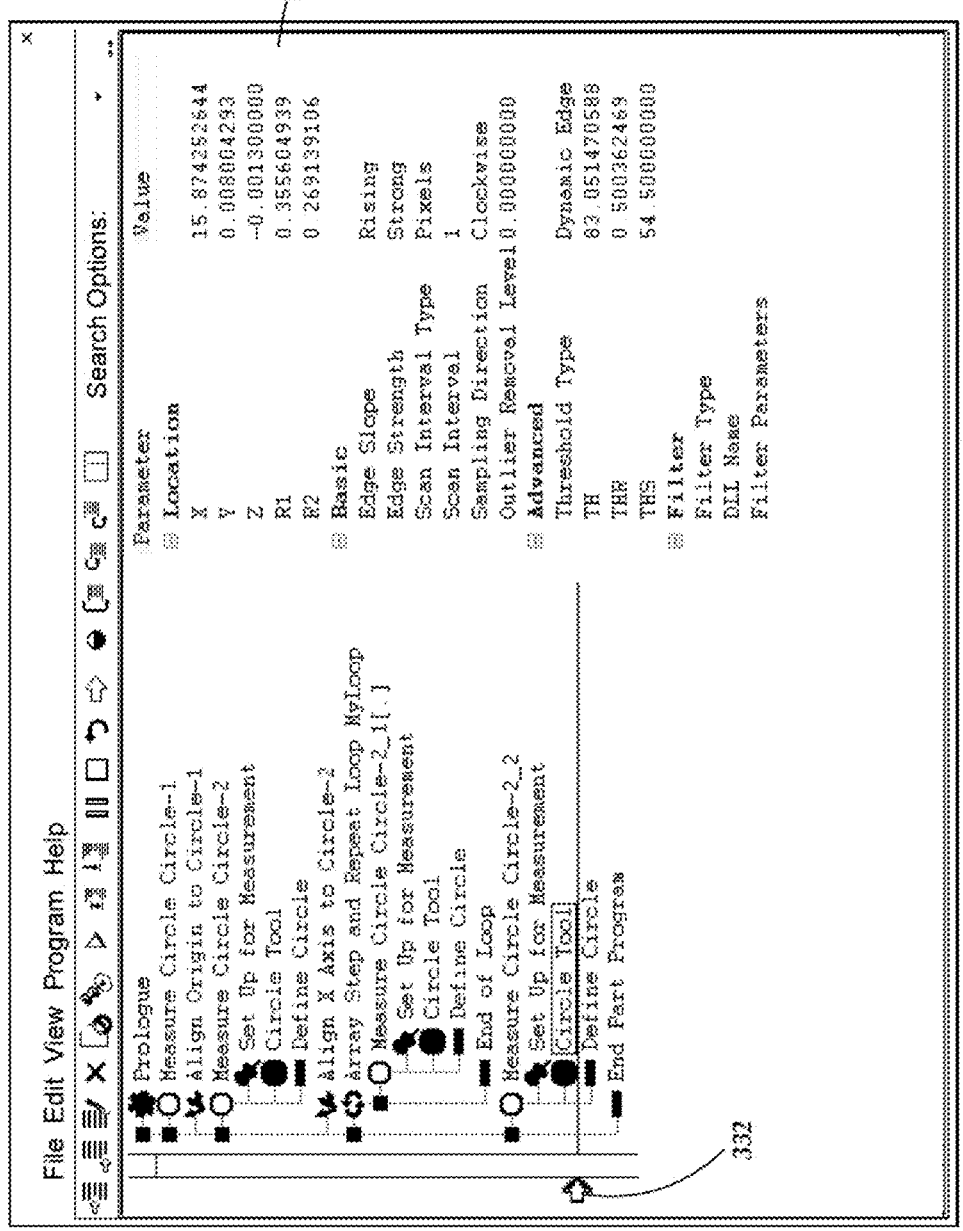

FIG. 13A incidentally shows that several attributes of the pasted copy of the "Circle Tool" 327 retain the values of the copied source element, as indicated by a list of attributes/parameters 329 that define the "Circle Tool" 327 as included in the second instance of the copied elements 320", provided that those elements are not incompatible (in a programming sense) with the paste location. It should be appreciated that "incompatible" in the programming sense is not the same as "inappropriate" according to the desired part program behavior. For example, the retained attributes (e.g., the circle tool location parameters) may be inappropriate, in that the user expects to edit them (e.g., as indicated by the highlighted "Modify" command 330 in FIG. 13A), but they are not "incompatible" in that they will have an unintended effect on the editing operations or cause the resulting part program to crash or behave in an unexpected manner. Perhaps most importantly in various embodiments, they are not incompatible in the sense that a user must perform editing of the underlying instructions that are written in a computer language, in order to make the pasted representations or their underlying instructions operate in the part program and/or the editing environment. The copy and/or paste command will automatically perform all the context-related operations that are required for compatibility such that the user may edit the part program using the copy and paste operations at the level of the part program representation that is displayed in the editing portion of the GUI (e.g., in the editing interface 301), and or related GUI windows and menus, in at least some embodiments. In some embodiments, if the copy and paste command cannot perform such operations automatically in a particular case of copied and/or pasted representations/instructions, then a related error message will be displayed. In FIG. 13A, the "Modify" command has been selected in relation to the selected "Circle Tool" instruction representation under the Measure Circle Circle-2_2 node. The parameters of that circle tool that are available for modification are displayed in the attributes/parameters pane 329. In this particular example, the user will modify the "copied" parameters "scan interval=20" and "Scan Interval Type=Degrees", to a scan interval of "1", and a scan interval type of "Pixels", as seen in FIGS. 17 and 18 below.

Figure 13B:
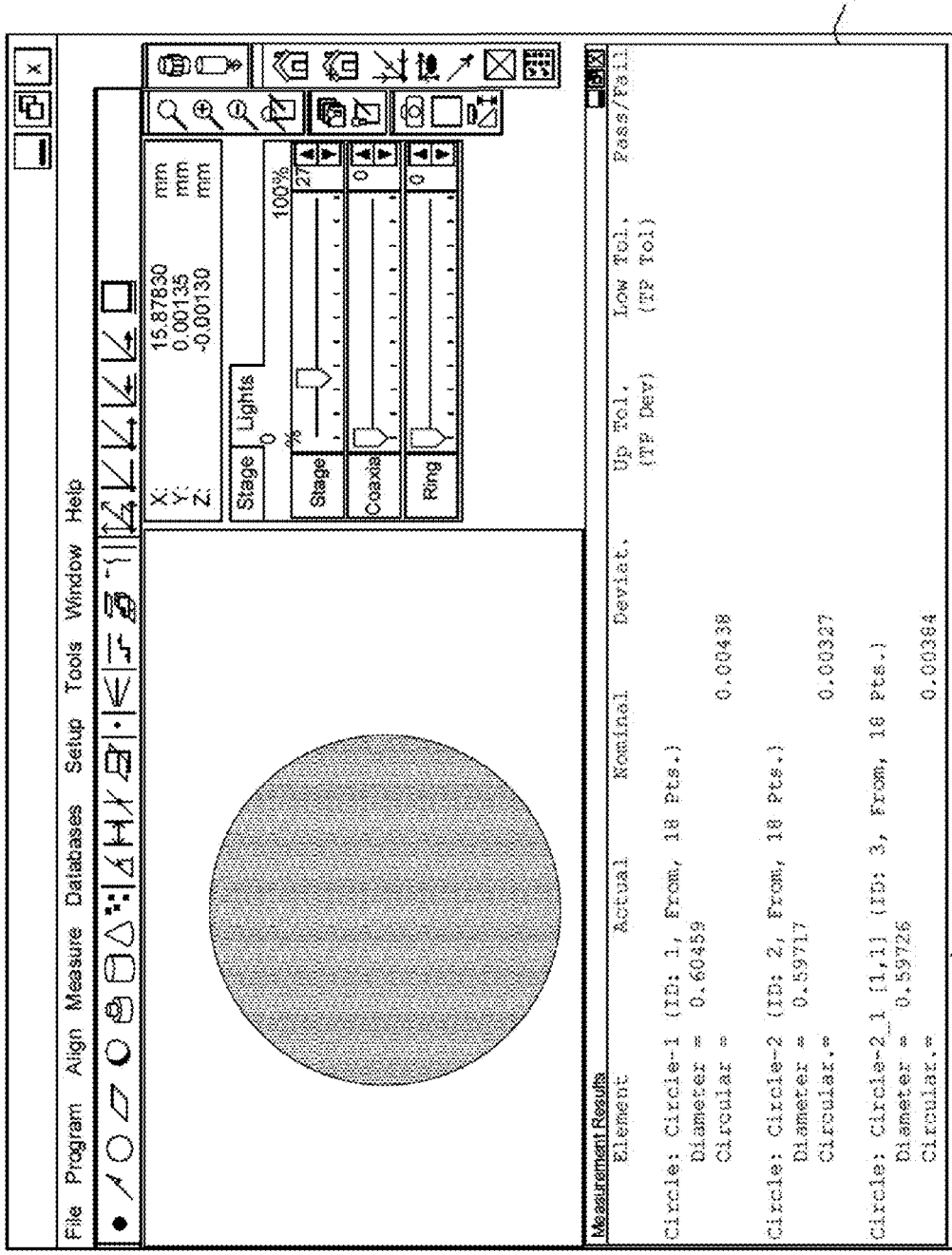

FIG. 13B shows the interface status for a window or pane including "Measurement Results" 316 synchronized with FIG. 13A, wherein the "Measurement Results" window 316 indicates the measurement results of the source "Measure Circle Circle-2" 320 and of the first pasted instance "Measure Circle Circle-2_1 [1,1]" 320', but not of the second pasted instance of "Measure Circle Circle-2_2" 320" which is to be modified in the illustrated example.

Figure 14:
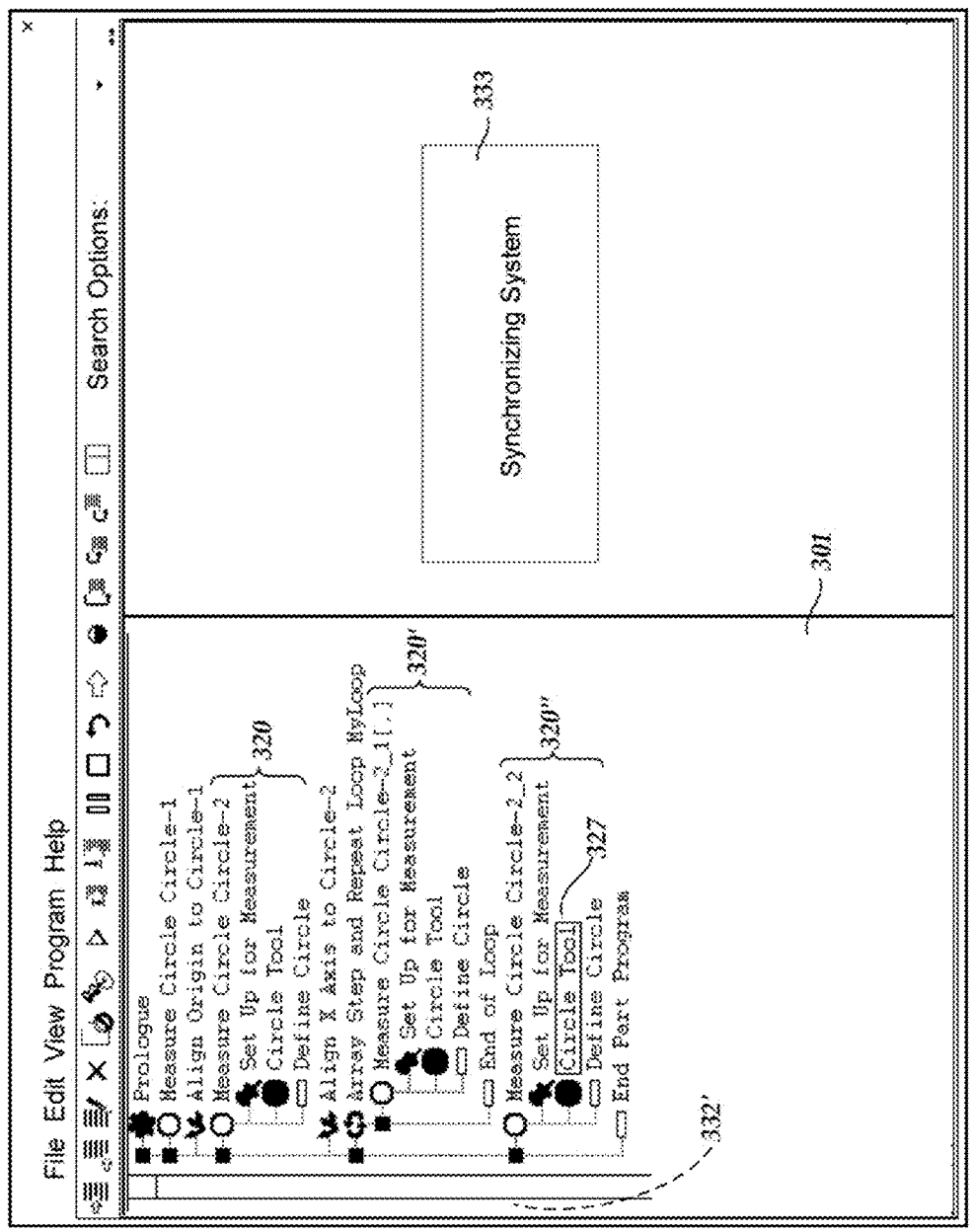

FIG. 14 shows that in preparation for the selected/highlighted circle tool 327 to be modified by user input, the proper machine and or editing operating context must be established (e.g., as disclosed in the '232 application) at that location in the part program, and the necessary operations are automatically performed (e.g., as disclosed in the '232 application) as indicated by the change in the insertion pointer (and editing context status indicator) 332/332' (suppressed as 332' during execution of the necessary operations, as opposed to being valid and visible in FIG. 13A), and the greyed out representation of instructions in the editing interface 301 and the synchronizing message box 333, which indicates that the system is analyzing and/or executing at least a portion of the part program to establish the proper machine operating context.

Figure 15:
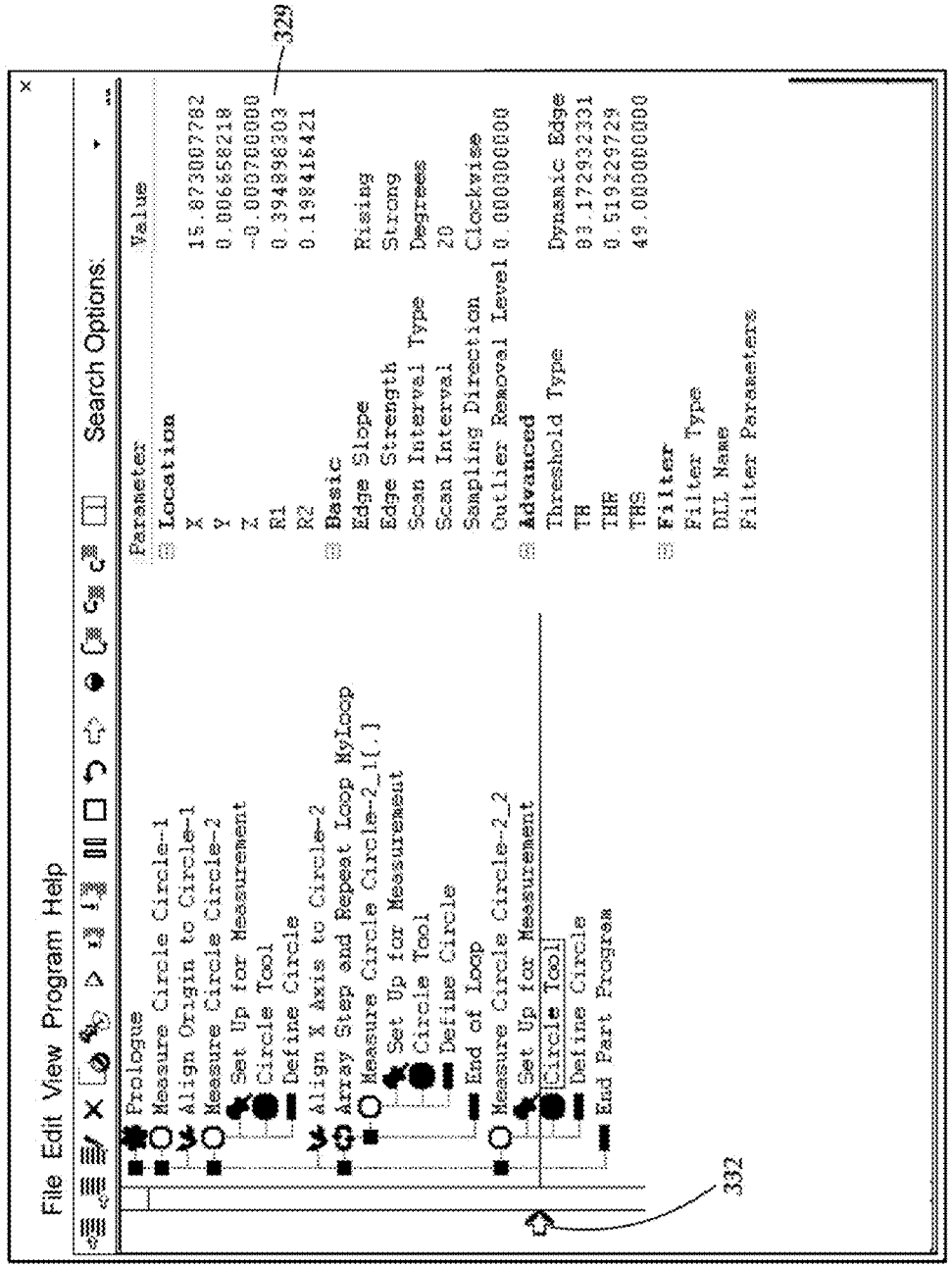

FIG. 15 shows the GUI state at the completion of the synchronizing operations of FIG. 14, at which point a valid operating or editing context is established for the purpose of modifying (editing) the part program.

Figure 16:
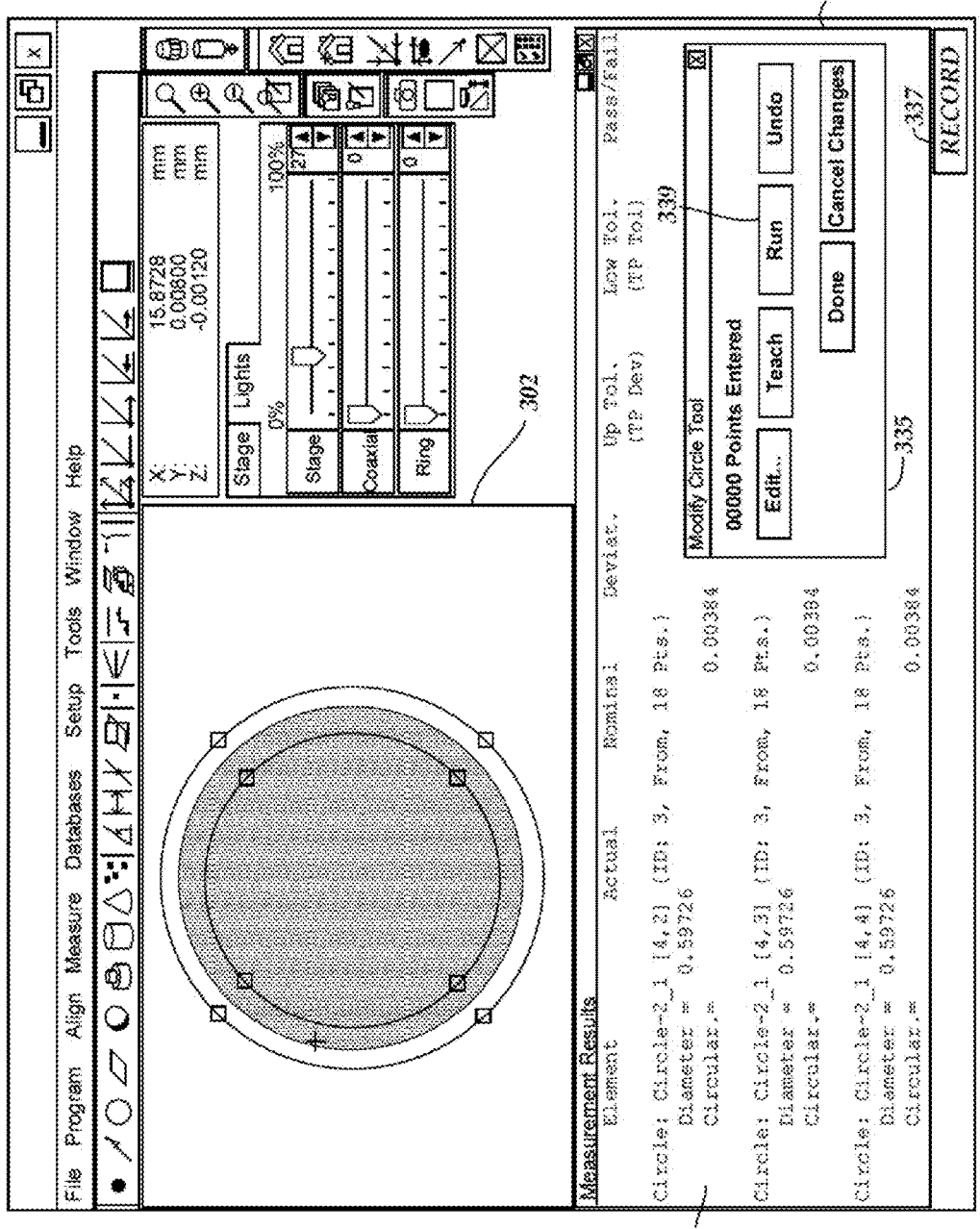

FIG. 16 reflects modification operations that follow after the operations described in previous FIGS. 13A-15. Note the "Modify Circle Tool" dialog box 335, which appears after the user select the "Modify" command 330 in FIG. 13A, and modified the "copied" parameters "scan interval=20" and "Scan Interval Type=Degrees", to a scan interval of "1", and a scan interval type of "Pixels" as outlined above. Note the red "record" status indicator 337, which indicates that the machine vision inspection system is in "record" or learn mode to generate and record a part program. The Run command 339, which is one of the selectable commands in the "Modify Circle Tool" dialog box 335, has not yet been executed. To validate the foregoing parameter modifications, the circle tool may be run. FIG. 16 also shows the interface status including the "Measurement Results" 316 of the first pasted instance of "Measure Circle Circle-2_1" at [3,4], [4,1], [4,2], [4,3], [4,4], which can be readily scrolled up and down.

FIG. 17 shows the GUI after the Run command 339 is executed to run the modified Circle Tool. As a result of the modified Circle Tool being RUN, the "Modify Circle Tool" dialog box 335 indicates that 639 edge points have been located (see 340) and the located edge points are indicated inside the video tool in the video display window (the field of view window) 302.

Figure 19:
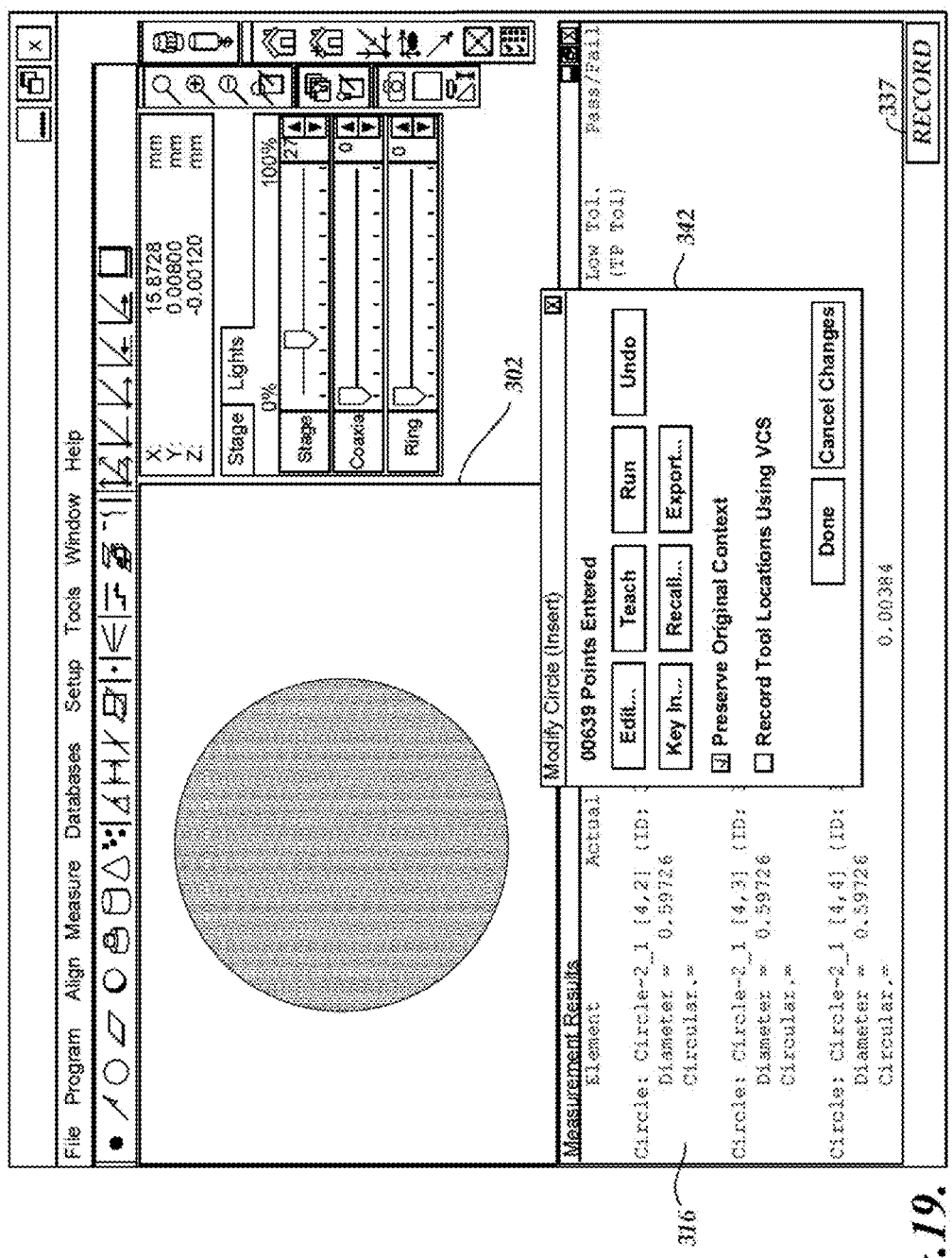

FIG. 18 shows updated parameters in the list of attributes/parameters 329 resulting from executing the Run command for the modified Circle Tool, including showing the validated modified parameters: a scan interval of "1", and a scan interval type of "Pixels", as compared to the previous parameters of the Circle Tool as listed in FIG. 15. FIG. 19 shows the interface status for a window or pane including "Measurement Results" 316 synchronized with FIG. 18, including an additional dialog box 342 which can be used to accept (by pressing "done") the results and configuration of the circle tool that was pasted and modified to produce the with the detected edge points best seen in FIG. 17 and the result circle measurement and parameter shown in FIG. 18.

FIGS. 20A-24E are diagrams of code instructions written in a markup language, which correspond to various states and/or operation sequences depicted in the sequence operations represented in FIGS. 3A-19. The correspondence between states may be determined by one skilled in the art by careful examination of the instructions illustrated in FIGS. 20A-24E, in relation to the representations shown in FIGS. 3A-19, in combination with understanding based on the disclosed features and operations described herein, including the '232 application and the '061 application, as well as the incorporated references. Approximately speaking, FIGS. 20A-20H show part program instructions resulting from the operations described or implied in relation to FIG. 3A-3B. Various instructions are annotated with reference designations, to aid the reader in understanding the relationship of instructions to their corresponding instruction representations in the preceding figures. For example PS and PE approximate the start and end, respectively of instructions related to the "Prologue" instruction representation. MCIRC1S and MCIRC1E approximate the start and end, respectively of instructions related to the "Measure Circle Circle-1" instruction representation. DCIRC1S and DCIRC1E approximate the start and end, respectively of instructions related to a "Define Circle" instruction representation for Circle-1 . . . ALIGNOS and ALIGNOE approximate the start and end, respectively of instructions related to the "Align Origin" instruction representation . . . MCIRC2S and MCIRC2E approximate the start and end, respectively of instructions related to the "Measure Circle Circle-2" instruction representation. DCIRC2S and DCIRC2E approximate the start and end, respectively of instructions related to a "Define Circle" instruction representation for Circle-2. ALIGNXS and ALIGNXE approximate the start and end, respectively of instructions related to the "Align X Axis" instruction representation. EPP relates to the "End Part Program" instruction representation. These annotations are consistent with those in FIGS. 21-24, such that the locations of the program segments in those figures can be related to where they would be located (e.g. inserted) relative to the part program shown in FIG. 20.

Approximately speaking, FIG. 21 shows part program instructions resulting from the operations described or implied in relation to FIGS. 4-6. It may be seen that LOOPS and LOOPE approximate the start and end, respectively of instructions related to the "Array Step and Repeat Loop" instruction representation shown in FIG. 6. Approximately speaking, FIGS. 22A-22C show part program instructions resulting from the operations described or implied in relation to FIGS. 7A-10. It may be seen that MCIRC2_1S and MCIRC2_1E approximate the start and end, respectively of instructions related to the "Measure Circle Circle-2_1 [.]" instruction representation shown pasted into "MyLoop" in FIG. 10. Similarly, DCIRC2_1S and DCIRC2_1E approximate the start and end, respectively of instructions related to the corresponding "Define Circle" instruction representation. Approximately speaking, FIGS. 23A-23C show part program instructions resulting from the operations described or implied in relation to FIGS. 11-12. It may be seen that MCIRC2_2S and MCIRC2_2E approximate the start and end, respectively of instructions related to the "Measure Circle Circle-2_2" instruction representation shown pasted after the End of Loop in FIG. 12. Similarly, DCIRC2_2S and DCIRC2_2E approximate the start and end, respectively of instructions related to the corresponding "Define Circle" instruction representation. Approximately speaking, FIGS. 24A-24E show part program instructions and data resulting from the operations described or implied in relation to FIGS. 13A-19. For example, in FIG. 24C it may be seen MOD1 shows the modified scan interval and scan interval type parameters shown in FIG. 18. CIRC2_2-SURROS and CIRC2_2-SURROE approximate the start and end, respectively, of new data related to executing instructions on the vision machine related to the "Measure Circle Circle-2_2" representation (e.g. within the annotations MCIRC2_2S and MCIRC2_2E which approximate the start and end, respectively of instructions related to the "Measure Circle Circle-2_2" instruction representation). That data provides the basis for the operational editing context status represented in FIG. 18 by the element 332 (in contrast to FIG. 15, for example, where an operational editing context status had not yet been established for the pasted and modified elements related to "Measure Circle Circle-2_2".

Overall, it maybe be seen that the FIGS. 1-25B depict one embodiment that exhibits many of the features, operations and correspondences as outlined in the section titled "OUTLINE OF COPY AND PASTE OPERATIONS, FEATURES, AND IMPLEMENTATIONS" above, and/or in the claims below.

It should be appreciated that in contrast to known copy and paste program editing operations as may be performed in a text based program editing environment, or even program editing that is aware of context that is indicated within programming language features, or the like, which may expedite typing and/or program editing by a user skilled in a programming language, the copy and/or paste commands disclosed herein are available in a GUI to be operated by a relatively unskilled user (e.g., for the purpose of editing, augmenting, replacing, or deleting operations at individual locations). In contrast to known copy and paste operations, the command operations disclosed herein may completely automate the context adjustment operations necessary for the target programming elements in the underlying programming language instructions, such that the user may reliably edit and/or run the part program using the copy and paste operations at the level of the part program representation that is displayed in the editing portion of the GUI, and or related GUI windows and menus, in at least some embodiments.

In various exemplary embodiments, as previously outlined, a part program including copied and pasted instructions and/or the instructions generated by the copy and paste manager 169 is written in a markup-type language, such as Extensible Markup Language (XML) or a similar customized markup language. That is, the editable instruction representations displayed in the editing interface 301 point to corresponding code instructions (machine-executable instructions) written in a markup-type language.

Figure 25A:
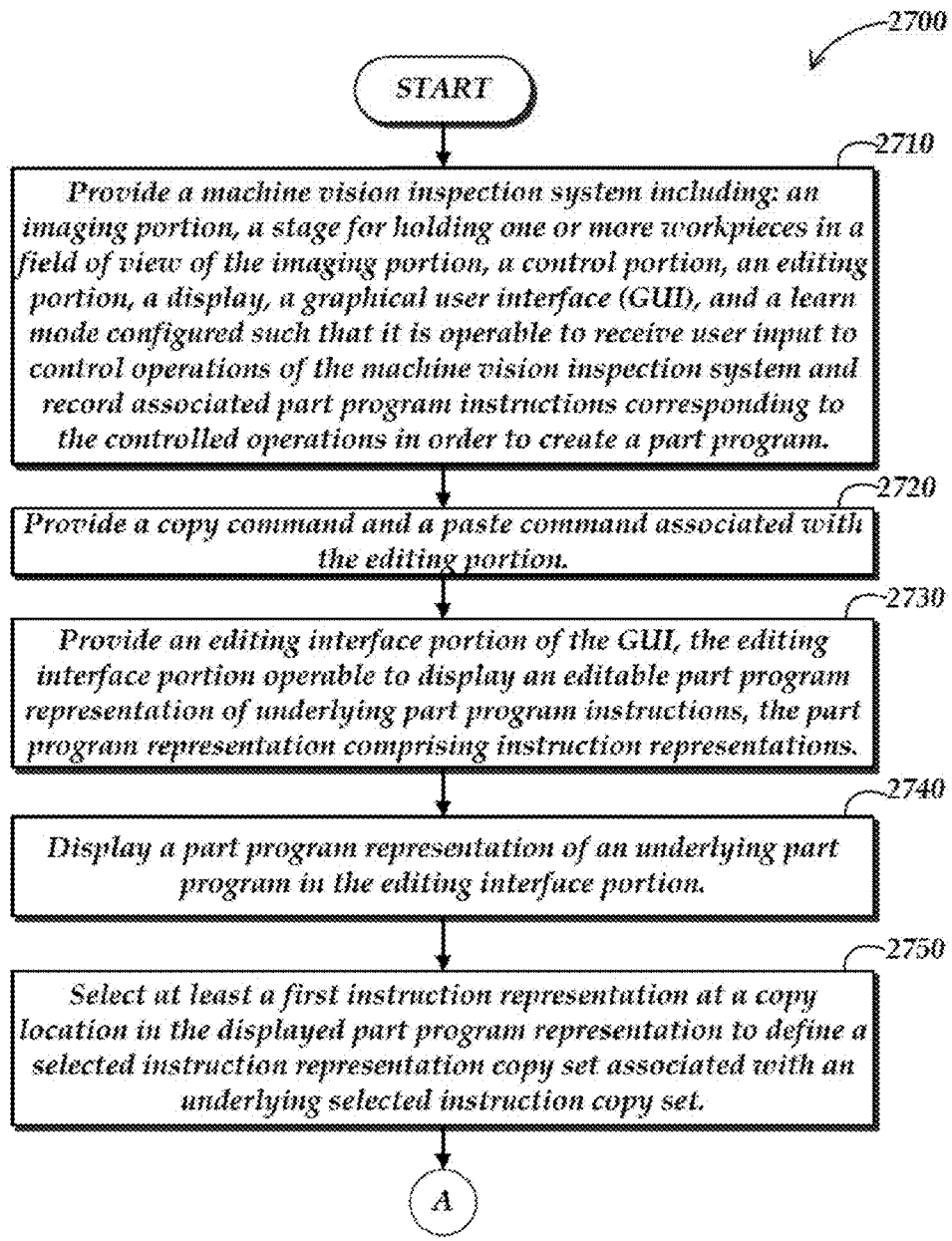
FIGS. 25A and 25B show a flow diagram illustrating one example of a routine for copying and pasting a set of machine vision part program operations when editing a part program in a machine vision inspection system, according to principles disclosed herein.
Figure 25B:
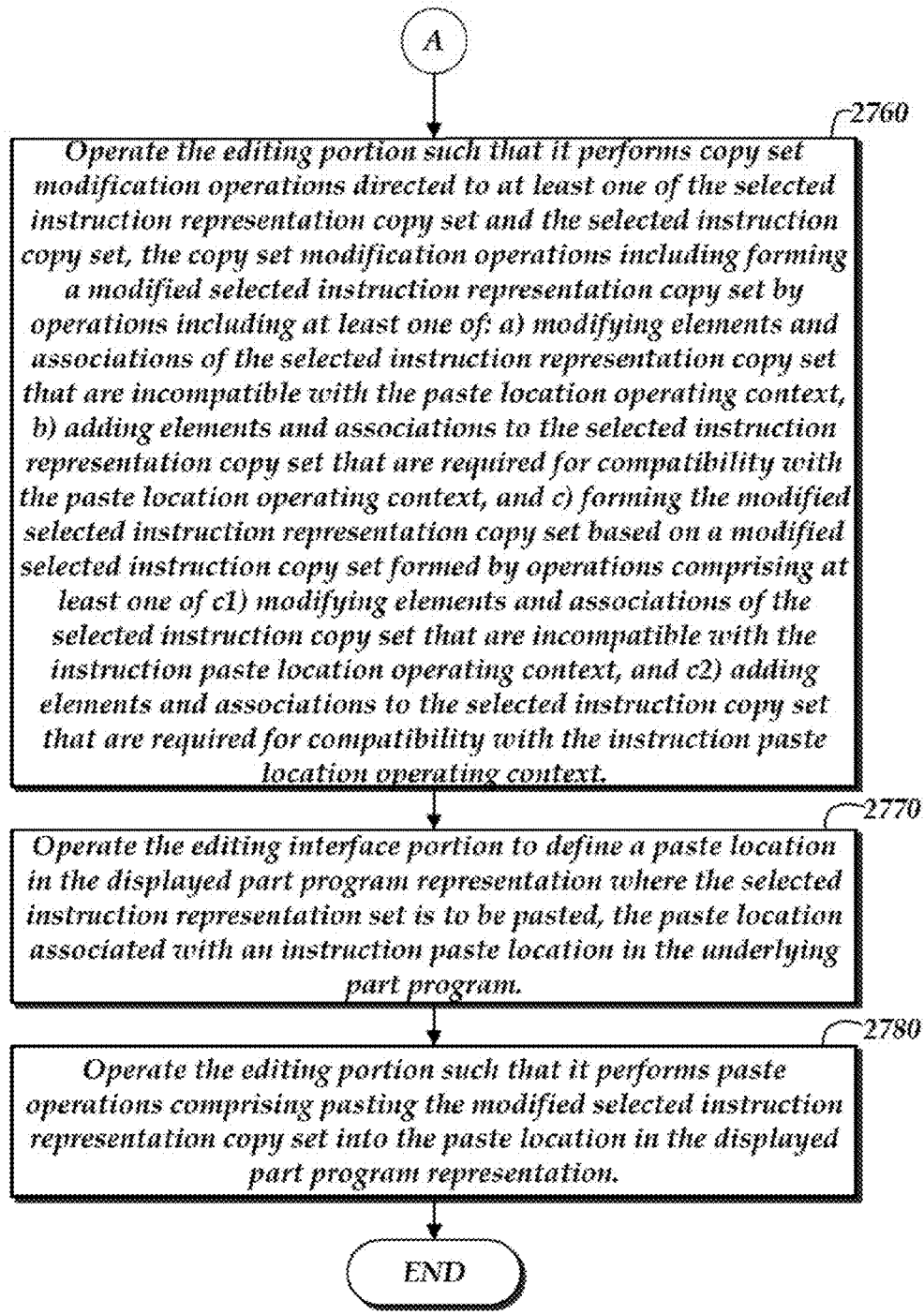

FIGS. 25A and 25B represent a flow diagram showing a method for copying and pasting a set of machine vision part program operations when editing a part program in a machine vision inspection system, wherein the machine vision inspection system includes: an imaging portion, a stage for holding one or more workpieces in a field of view of the imaging portion, a control portion, an editing portion, a display, a graphical user interface (GUI), and a learn mode configured such that it is operable to receive user input to control operations of the machine vision inspection system and record associated part program instructions corresponding to the controlled operations in order to create a part program. At a block 2710, a machine vision inspection system is provided including: an imaging portion, a stage for holding one or more workpieces in a field of view of the imaging portion, a control portion, an editing portion, a display, a graphical user interface (GUI), and a learn mode configured such that it is operable to receive user input to control operations of the machine vision inspection system and record associated part program instructions corresponding to the controlled operations in order to create a part program. At a block 2720, a copy command and a paste command associated with the editing portion is provided. At a block 2730, an editing interface portion of the GUI is provided, the editing interface portion being operable to display an editable part program representation of underlying part program instructions, the part program representation comprising instruction representations. At a block 2740, a part program representation of an underlying part program in the editing interface portion is displayed. At a block 2750, at least a first instruction representation is selected at a copy location in the displayed part program representation to define a selected instruction representation copy set associated with an underlying selected instruction copy set. At a block 2760, the editing portion is operated such that it performs copy set modification operations directed to at least one of the selected instruction representation copy set and the selected instruction copy set, the copy set modification operations including forming a modified selected instruction representation copy set by operations including at least one of: a) modifying elements and associations of the selected instruction representation copy set that are incompatible with the paste location operating context, b) adding elements and associations to the selected instruction representation copy set that are required for compatibility with the paste location operating context, and c) forming the modified selected instruction representation copy set based on a modified selected instruction copy set formed by operations comprising at least one of c1) modifying elements and associations of the selected instruction copy set that are incompatible with the instruction paste location operating context, and c2) adding elements and associations to the selected instruction copy set that are required for compatibility with the instruction paste location operating context. At a block 2770, the editing interface portion is operated to define a paste location in the displayed part program representation where the selected instruction representation set is to be pasted, the paste location being associated with an instruction paste location in the underlying part program. At a block 2780, the editing interface portion is operated to define a paste location in the displayed part program representation where the selected instruction representation set is to be pasted, the paste location being associated with an instruction paste location in the underlying part program. After the block 2780, the method ends.

The various embodiments described above can be combined to provide further embodiments. All of the U.S. patents and U.S. patent applications referred to in this specification are incorporated herein by reference, in their entirety. Aspects of the embodiments can be modified, if necessary to employ concepts of the various patents and applications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A non-transitory computer-readable medium including computer-executable instructions, which are configured to be loaded onto a computer to enable the computer to perform a method for copying and pasting a set of machine vision part program operations when editing a part program in a machine vision inspection system, the machine vision inspection system including: an imaging portion, a stage for holding one or more workpieces in a field of view of the imaging portion, a control portion, an editing portion, a display, a graphical user interface (GUI), and a learn mode configured such that it is operable to receive user input to control operations of the machine vision inspection system and record associated part program instructions corresponding to the controlled operations in order to create a part program, the method to be performed comprising:

providing a copy command and a paste command associated with the editing portion;

providing an editing interface portion of the GUI, the editing interface portion operable to display an editable part program representation of underlying part program instructions, the part program representation comprising instruction representations;

displaying a part program representation of an underlying part program in the editing interface portion;

displaying an editing context status indicator configured to indicate a status of operating context of the machine vision inspection system at a location in the displayed part program representation;

selecting at least a first instruction representation at a copy location in the displayed part program representation to define a selected instruction representation copy set associated with an underlying selected instruction copy set, the editing context status indicator indicating that the selected representation copy set corresponds to a valid editing context status;

operating the editing interface portion to define a paste location in the displayed part program representation where the selected instruction representation copy set is to be pasted, the paste location associated with an instruction paste location in the underlying part program;

operating the editing portion such that it performs copy set modification operations directed to at least one of the selected instruction representation copy set or the selected instruction copy set, the copy set modification operations including forming a modified selected instruction representation copy set that is different than the selected instruction representation copy set by operations including at least one of: a) modifying elements and associations of the selected instruction representation copy set that are incompatible with the paste location operating context, b) adding elements and associations to the selected instruction representation copy set that are required for compatibility with the paste location operating context, or c) forming the modified selected instruction representation copy set based on a modified selected instruction copy set formed by operations comprising at least one of c1) modifying elements and associations of the selected instruction copy set that are incompatible with the instruction paste location operating context, or c2) adding elements and associations to the selected instruction copy set that are required for compatibility with the instruction paste location operating context;

operating the editing portion such that it performs paste operations comprising pasting the modified selected instruction representation copy set that is different than the selected instruction representation copy set into the paste location in the displayed part program representation; and automatically operating the editing context status indicator, in response to pasting the modified selected instruction representation copy set, to indicate that the modified selected instruction representation copy set corresponds to at least one of a questionable or invalid editing context status.

2. The non-transitory computer-readable medium of claim 1, wherein the editing context status indicator comprises an instruction pointer that changes color depending on an editing context status corresponding to its location in the displayed part program representation.

3. The non-transitory computer-readable medium of claim 1, wherein the copy command comprises operations that automatically expand at least one parent node included in the selected instruction representation copy set to display all of its child nodes included in the selected instruction representation copy set.

4. The non-transitory computer-readable medium of claim 3, wherein the displayed child nodes included in the selected instruction representation copy set are displayed at the copy location during at least one of a) when a copy command GUI element is hovered over in the GUI, or b) when the copy command is executed.

5. The non-transitory computer-readable medium of claim 3, wherein operating the editing portion such that it performs the copy set modification operations comprises executing the copy command.

6. The non-transitory computer-readable medium of claim 1, wherein pasting the modified selected instruction representation copy set into the paste location comprises operations that automatically expand at least one parent node included in the pasted modified selected instruction representation copy set to display all of its child nodes included in the modified selected instruction representation copy set.

7. The non-transitory computer-readable medium of claim 6, wherein pasting the modified selected instruction representation copy set into the paste location comprises executing the paste command.

8. The non-transitory computer-readable medium of claim 1, wherein at least some of the copy set modification operations are automatically performed in response to execution of the copy command.

9. The non-transitory computer-readable medium of claim 8, wherein the copy set modification operations comprise removing at least one of a) surrogate data corresponding to the selected instruction representation copy set, or b) an association between the selected instruction representation copy set and any corresponding surrogate data.

10. The non-transitory computer-readable medium of claim 9, wherein the copy set modification operations comprise moving a copy of at least one of the selected instruction copy set or the selected instruction representation copy set to a clipboard, after the corresponding surrogate data and/or its association is removed.

11. The non-transitory computer-readable medium of claim 1, wherein at least one of the selected instruction representation copy set or the associated underlying selected instruction copy set comprises a program node.

12. The non-transitory computer-readable medium of claim 1, wherein the copy set modification operations include forming a modified selected instruction representation copy set by operations including at least one of step c1) of modifying elements and associations of the selected instruction copy set or step a) of modifying elements and associations of the selected instruction representation copy set, and the included at least one of step c1) or step a) comprises altering a feature name, a tolerance name, a part coordinate system name, a measurement point buffer name, or a displayed variable name associated with such elements in an underlying instruction code and/or in a displayed instruction representation.

13. The non-transitory computer-readable medium of claim 12, wherein the alteration is an automatic alteration or includes an automatically displayed alteration prompt to a user.

14. The non-transitory computer-readable medium of claim 1, wherein the copy set modification operations include forming a modified selected instruction representation copy set by operations including at least one of step c1) of modifying elements and associations of the selected instruction copy set or step a) of modifying elements and associations of the selected instruction representation copy set, and the included at least one of step c1) or step a) comprises altering a unique node identifier associated with such elements.

15. The non-transitory computer-readable medium of claim 1, wherein the copy set modification operations include forming a modified selected instruction representation copy set by operations including at least one of step c1) of modifying elements and associations of the selected instruction copy set or step a) of modifying elements and associations of the selected instruction representation copy set, and when the selected instruction representation copy set is pasted into a step and repeat loop the included at least one of step c1) or step a) comprises altering a feature name, a tolerance name, a part coordinate system name, a measurement point buffer name, or a displayed variable name associated with such elements in at least one of an underlying instruction code or in a displayed instruction representation, said altering further comprising at least one of altering or adding at least one of an element or format consistent with an operating context of the step and repeat loop.

16. The non-transitory computer-readable medium of claim 15, wherein the included at least one of step c1) or step a) comprises altering a displayed element name to include an index bracket, which is a format element used to hold various array position or loop iteration indices in the operating context of the step and repeat loop.

17. The non-transitory computer-readable medium of claim 16, wherein the alteration is an automatic alteration or includes an automatically displayed alteration prompt to a user.

18. The non-transitory computer-readable medium of claim 1, wherein the copy set modification operations include forming a modified selected instruction representation copy set by operations including at least one of step c1) of modifying elements and associations of the selected instruction copy set or step a) of modifying elements and associations of the selected instruction representation copy set, and when the selected instruction representation copy set is copied from a step and repeat loop and pasted outside of a step and repeat loop the included at least one of step c1) or step a) comprises altering or removing a feature name, a tolerance name, a part coordinate system name, a measurement point buffer name, or a displayed variable name associated with such elements, or a format that is specific to the operating context of the step and repeat loop, in at least one of an underlying instruction code or in a displayed instruction representation.

19. The non-transitory computer-readable medium of claim 18, wherein the included at least one of step c1) or step a) further comprises altering a displayed element name to delete an index bracket, which is a format element used to hold various array position or loop iteration indices in the operating context of the step and repeat loop.

20. The non-transitory computer-readable medium of claim 1, wherein the copy set modification operations include forming a modified selected instruction representation copy set by operations including at least one of step c1) of modifying elements and associations of the selected instruction copy set or step a) of modifying elements and associations of the selected instruction representation copy set, and the included at least one of step c1) or step a) comprises eliminating such elements.

21. The non-transitory computer-readable medium of claim 1, wherein the editing portion is configured to perform paste operations comprising pasting the modified selected instruction copy set into the instruction paste location in the underlying part program.

22. The non-transitory computer-readable medium of claim 1, wherein the editing portion is configured to operate the GUI to execute the copy command such that the copy command is directed to the selected instruction representation copy set and/or the associated underlying selected instruction copy set.

23. The non-transitory computer-readable medium of claim 1, wherein at least some of the copy set modification operations are automatically performed in response to execution of the paste command.

24. The non-transitory computer-readable medium of claim 23, wherein the copy set modification operations comprise adding or altering at least one of a) an association between the selected instruction representation copy set and a corresponding surrogate data storage address or location, or b) a feature name, a tolerance name, a part coordinate system name, a measurement point buffer name, or a displayed variable name.

25. The non-transitory computer-readable medium of claim 23, wherein the copy set modification operations comprise moving a copy of at least one of the selected instruction copy set or the selected instruction representation copy from a clipboard to the paste or instruction paste location.

26. The non-transitory computer-readable medium of claim 1, wherein the copy and/or paste commands are displayable in the GUI, and the commands are selectable and/or executable by a user to activate the corresponding operations to provide the copy set modification operations directed to the selected instruction representation copy set and/or the associated underlying selected instruction copy set.

27. The non-transitory computer-readable medium of claim 1, wherein the editing interface portion is operable to select and/or execute the copy command directed to the selected instruction representation copy set and/or the associated underlying selected instruction copy set and/or their modified counterparts by: selecting the representation copy set and/or the associated underlying selected instruction copy set in the editing interface portion of the GUI; operating the GUI to display a menu including at least the copy command corresponding to the selected instruction representation copy set and/or the associated underlying selected instruction copy set; and selecting the copy command in the displayed menu.

28. The non-transitory computer-readable medium of claim 1, wherein the editing interface portion is operable to select and/or execute the paste command directed to the selected instruction representation copy set and/or the associated underlying selected instruction copy set and/or their modified counterparts by: positioning a cursor or other editing location indicator of the GUI at the paste location in the part program representation; operating the GUI to display a menu including at least the paste command corresponding to the selected instruction representation copy set and/or the associated underlying selected instruction copy set or their modified counterparts on the clipboard; and selecting the paste command in the displayed menu.

29. The non-transitory computer-readable medium of claim 1, wherein the underlying part program instructions are written in a markup language.

30. The non-transitory computer-readable medium of claim 1, wherein the method to be performed further comprises:
    selecting, in response to pasting the modified selected instruction representation copy set, the modified selected instruction representation copy set for further modification;
    determining, in response to selecting the modified selected instruction representation copy set for further modification, whether execution of the part program has reached the modified selected instruction representation copy set; and
    generating operating context for the further modification using surrogate data in response to determining that execution of the part program has not reached the modified selected instruction representation copy set.

31. A method for copying and pasting a set of machine vision part program operations when editing a part program in a machine vision inspection system, the machine vision inspection system including: an imaging portion, a stage for holding one or more workpieces in a field of view of the imaging portion, a control portion, an editing portion, a display, a graphical user interface (GUI), and a learn mode configured such that it is operable to receive user input to control operations of the machine vision inspection system and record associated part program instructions corresponding to the controlled operations in order to create a part program, the GUI including an editing context status indicator configured to indicate a status of operating context of the machine vision inspection system at a location in a displayed part program representation, the method comprising:
    selecting at least a first instruction representation at a copy location in the displayed part program representation to define a selected instruction representation copy set associated with an underlying selected instruction copy set, the editing context status indicator indicating that the selected representation copy set corresponds to a valid editing context status;
    operating the GUI to initiate copy operations that create a copy of at least one of the selected instruction representation copy set or the underlying selected instruction copy set;
    automatically performing copy operations to perform a first subset of the copy set modification operations directed to at least one of the selected instruction representation copy set or the selected instruction copy set, to thereby generate partially modified counterparts of at least one of the selected instruction representation copy set or the underlying selected instruction copy set, the first subset of the copy set modification operations directed to elements that are specific to a first operating context at the copy location and comprising at least one of: a) eliminating at least one of associated surrogate data or its association with at least one of the copy sets, or b) providing a new or altered unique node identifier;
    defining a paste location in the displayed part program representation where the selected instruction representation copy set is to be pasted, the paste location associated with an instruction paste location in the underlying part program;
    operating the GUI to initiate paste operations directed to at least one of the partially modified counterparts of the selected instruction representation copy set or the underlying selected instruction copy set; and automatically performing paste operations to perform a second subset of the copy set modification operations directed to the partially modified counterparts of at least one of the selected instruction representation copy set or the selected instruction copy set, to thereby generate at least one of a fully modified selected instruction representation copy set that is different than the selected instruction representation copy set or a fully modified selected instruction copy set that is different than the selected instruction copy set, the second subset of the copy set modification operations directed to elements that are specific to a second operating context at the paste location and comprising at least one of: a) modifying elements and associations of the selected instruction representation copy set that are incompatible with the paste location operating context, b) adding elements and associations to the selected instruction representation copy set that are required for compatibility with the paste location operating context, or c) forming the modified selected instruction representation copy set based on a modified selected instruction copy set formed by operations comprising at least one of c1) modifying elements and associations of the selected instruction copy set that are incompatible with the instruction paste location operating context, or c2) adding elements and associations to the selected instruction copy set that are required for compatibility with the instruction paste location operating context; and automatically operating the editing context status indicator, in response to performing the paste operations, to indicate that the fully modified selected instruction representation copy set corresponds to at least one of a questionable or invalid editing context status.

32. The method of claim 31, wherein operating the GUI to initiate the copy operations comprises activating a copy command widget directed to the selected instruction representation copy set, and operating the GUI to initiate the paste operations comprises activating a paste command widget directed to the paste location.

33. The method of claim 31, wherein the partially modified counterparts of the selected instruction representation copy set or the underlying selected instruction copy set resulting from the first subset of the copy set modification operations are stored on a clipboard, and are automatically retrieved from the clipboard by the second subset of the copy set modification operations.

34. The method of claim 31, wherein the step of automatically performing paste operations further includes pasting the fully modified selected instruction representation copy set at the paste location in the part program representation, and/or pasting the fully modified selected instruction copy set at the instruction paste location in the underlying part program.

35. The method of claim 31, wherein the copy operations comprise automatically expanding at least one parent node included in the selected instruction representation copy set to display all of its child nodes included in the selected instruction representation copy set.

36. The method of claim 35, wherein the nodes included in the selected instruction representation copy set are highlighted in the GUI.

37. The method of claim 35, wherein all nodes in the selected instruction representation copy set are displayed when a copy command widget is selected or hovered over but before the copy command widget is executed.

38. The method of claim 31, wherein the paste operations comprise automatically expanding at least one parent node included in the pasted fully modified selected instruction representation copy set to display all of its child nodes included in the fully modified selected instruction representation copy set.

* * * * *